US008523354B2

(12) United States Patent
Haddock et al.

(10) Patent No.: US 8,523,354 B2
(45) Date of Patent: Sep. 3, 2013

(54) ELECTRO-ACTIVE DIFFRACTIVE LENS AND METHOD FOR MAKING THE SAME

(75) Inventors: Joshua N. Haddock, Roanoke, VA (US); William Kokonaski, Gig Harbor, WA (US); Roger Clarke, Cambridge (GB); Philip Rawlins, Orwell (GB); Peter Crossley, Comberton (GB); James John, Cambridge (GB)

(73) Assignee: PixelOptics Inc., Roanoke, VA (US)

( * ) Notice: Subject to any disclaimer, the term of this patent is extended or adjusted under 35 U.S.C. 154(b) by 562 days.

(21) Appl. No.: 12/408,973

(22) Filed: Mar. 23, 2009

(65) Prior Publication Data

US 2009/0256977 A1 Oct. 15, 2009

Related U.S. Application Data

(60) Provisional application No. 61/044,205, filed on Apr. 11, 2008, provisional application No. 61/152,913, filed on Feb. 16, 2009.

(51) Int. Cl.
*G02C 7/06* (2006.01)
*G02F 1/1339* (2006.01)

(52) U.S. Cl.
USPC .................. 351/169; 349/13; 349/201

(58) Field of Classification Search
None
See application file for complete search history.

(56) References Cited

U.S. PATENT DOCUMENTS

| | | | | |
|---|---|---|---|---|
| 5,124,836 A | * | 6/1992 | Kikuchi | 359/422 |
| 6,219,126 B1 | * | 4/2001 | Von Gutfeld | 349/153 |
| 7,268,850 B2 | * | 9/2007 | Liao | 349/153 |
| 2004/0125247 A1 | * | 7/2004 | Seshan et al. | 349/13 |
| 2005/0231677 A1 | | 10/2005 | Meredith | |
| 2006/0126698 A1 | | 6/2006 | Blum et al. | |
| 2007/0109489 A1 | * | 5/2007 | Nomura et al. | 349/200 |
| 2007/0159562 A1 | | 7/2007 | Haddock | |
| 2007/0216862 A1 | | 9/2007 | Blum et al. | |
| 2007/0242173 A1 | | 10/2007 | Blum et al. | |
| 2008/0123048 A1 | * | 5/2008 | Volk | 351/169 |
| 2010/0265456 A1 | * | 10/2010 | Matsui | 351/158 |
| 2012/0267045 A1 | * | 10/2012 | Honda | 156/285 |
| 2013/0037202 A1 | * | 2/2013 | Ando et al. | 156/99 |

FOREIGN PATENT DOCUMENTS

| | | | | |
|---|---|---|---|---|
| JP | 55-76323 | A | * | 6/1980 |
| JP | 3-263014 | A | * | 11/1991 |
| JP | 7-56177 | A | * | 3/1995 |
| JP | 2010-266551 | A | * | 11/2010 |
| WO | WO 2007/146265 | | | 12/2007 |

OTHER PUBLICATIONS

Fowler et al., "Liquid crystal lens review", Ophthal. Physiol. Opt., 1990, vol. 10, pp. 186-194.

(Continued)

*Primary Examiner* — M. Stahl
(74) *Attorney, Agent, or Firm* — Sterne, Kessler, Goldstein & Fox P.L.L.C.

(57) ABSTRACT

Aspects of the present invention provide an electro-active lens and method for manufacturing the same that encapsulates liquid crystal using solid transparent optical material using an improved liquid crystal seal feature. The seal feature greatly reduces the visibility of the liquid crystal seal feature in an assembled electro-active lens. The seal feature is also structurally robust such that the electro-active lens can be processed to fit a spectacle frame without disturbing containment of the liquid crystal and without disrupting electrical connectivity to the lens used to alter the refractive index of the liquid crystal, thereby ensuring fabrication of a commercially viable electro-active lens.

18 Claims, 63 Drawing Sheets

(56) References Cited

OTHER PUBLICATIONS

The International Search Report and Written Opinion corresponding to the PCT/US09/40300 application.
U.S. Appl. No. 12/166,526, filed Jul. 2, 2008.
U.S. Appl. No. 12/118,226, filed May 9, 2008.
U.S. Appl. No. 12/246,543, filed Oct. 7, 2008.
U.S. Appl. No. 12/135,587, filed Jun. 9, 2008.
U.S. Appl. No. 12/042,643, filed Mar. 3, 2008.
U.S. Appl. No. 12/101,264, filed Apr. 11, 2008.
U.S. Appl. No. 12/018,048, filed Jan. 22, 2008.
U.S. Appl. No. 12/054,313, filed Mar. 24, 2008.
European Search Report in EP 11193376 application.

\* cited by examiner

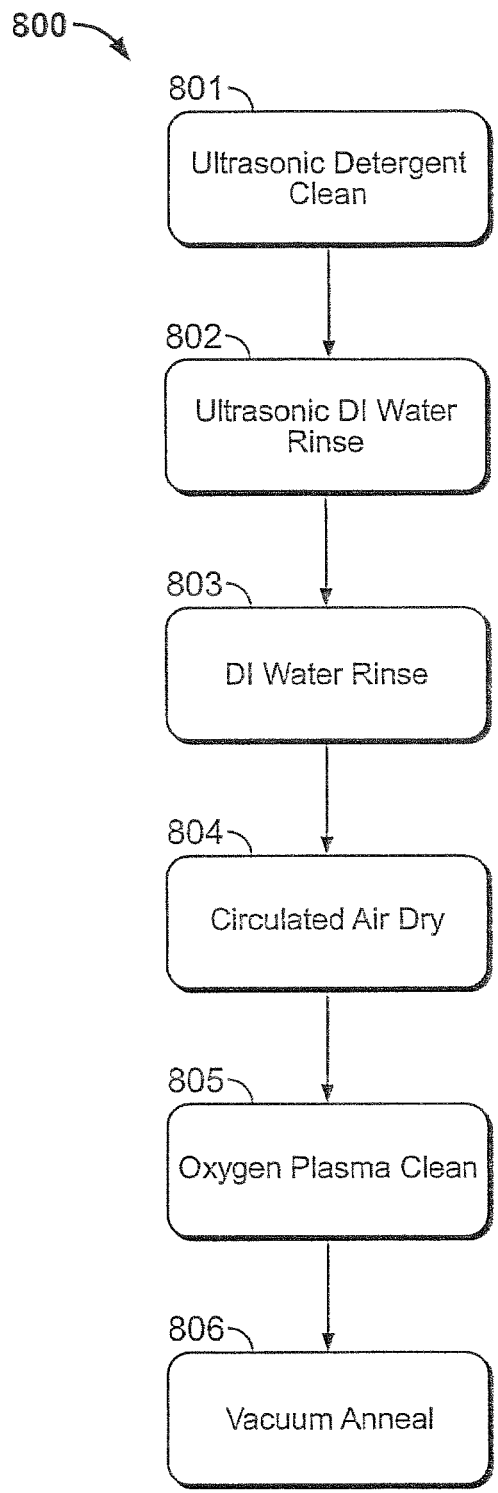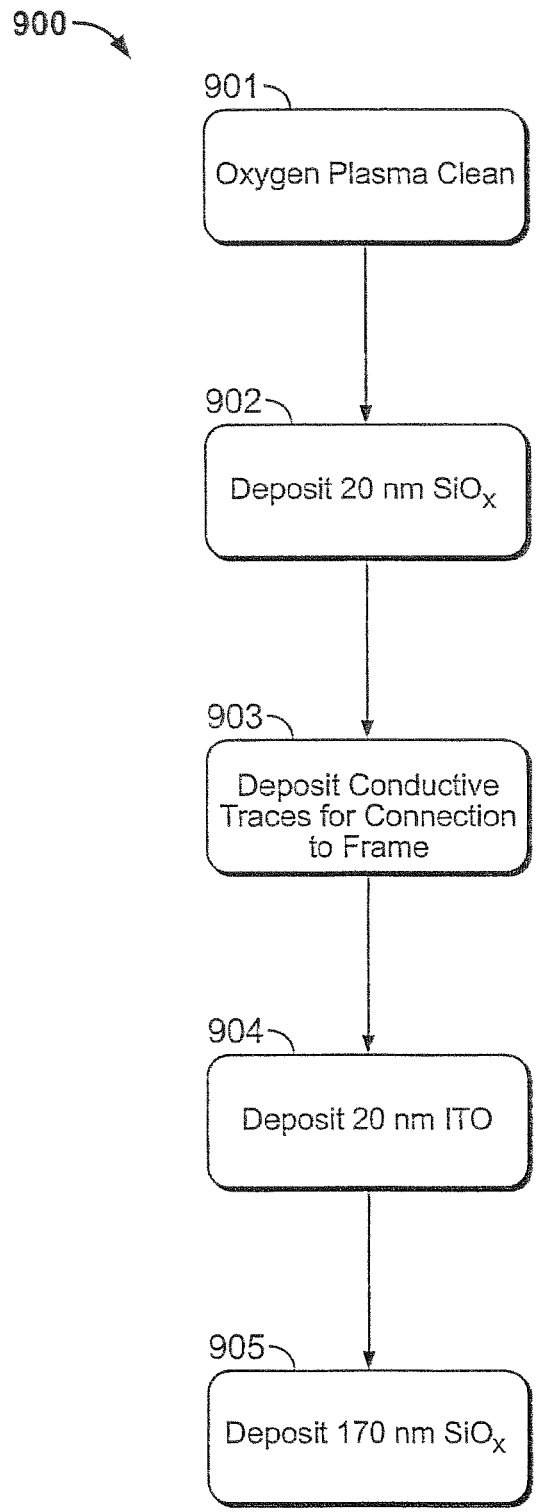
FIG. 8
FIG. 9

Section A-A'

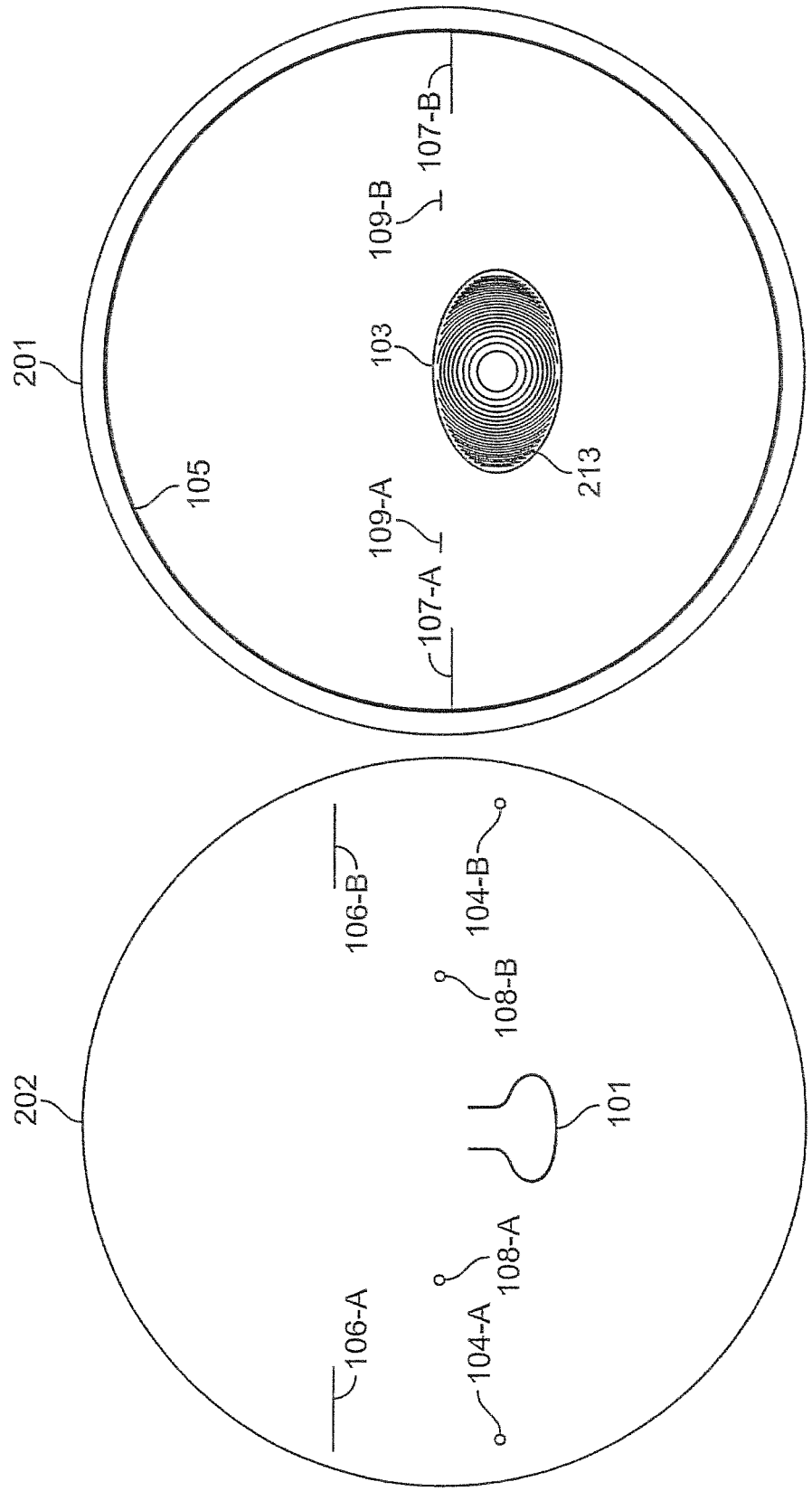

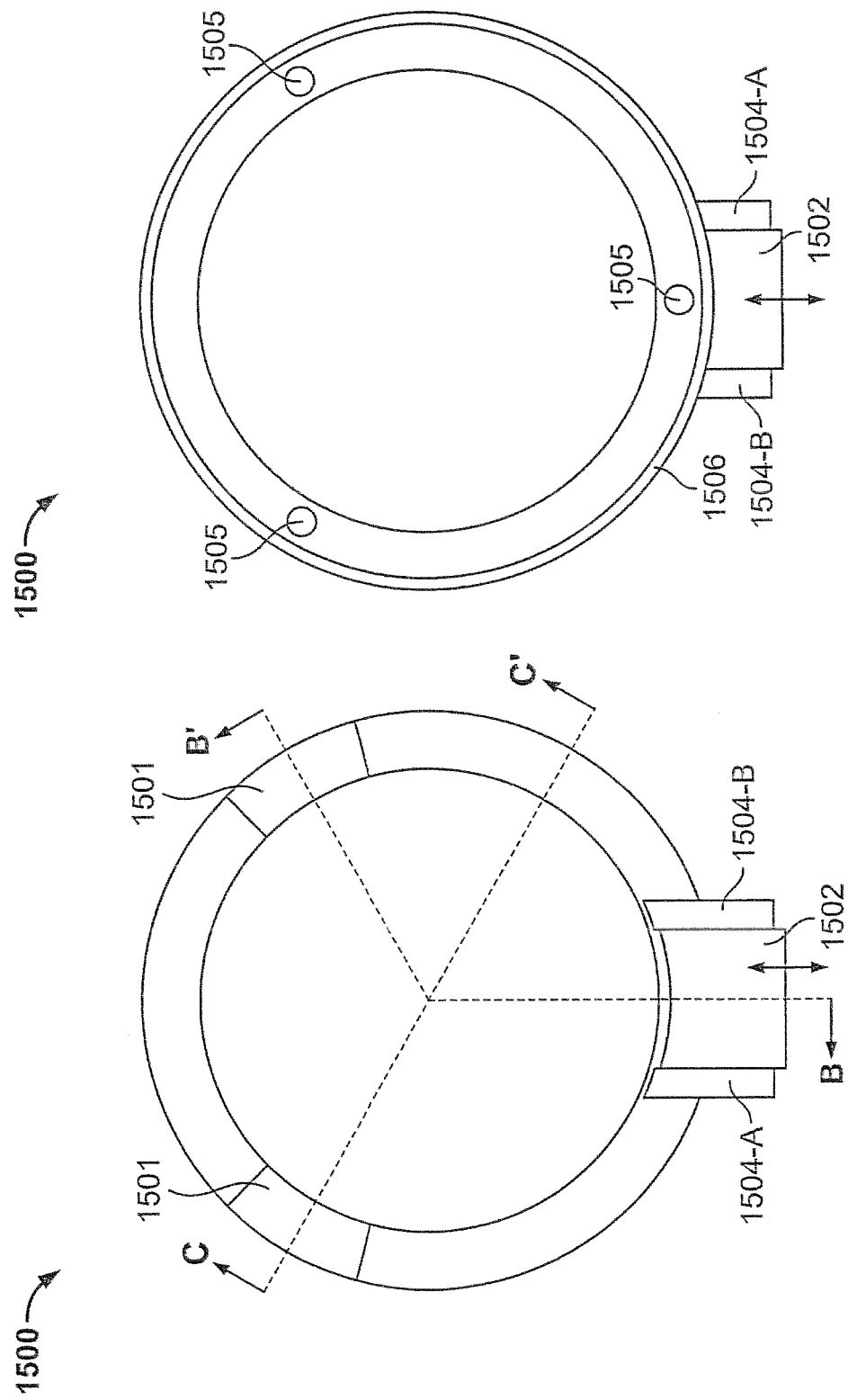

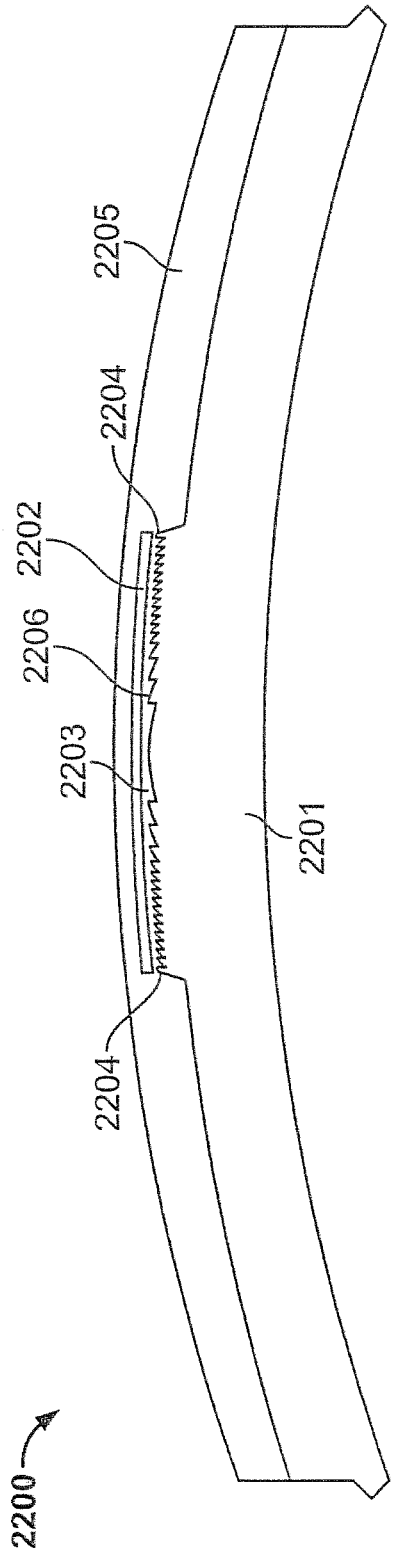
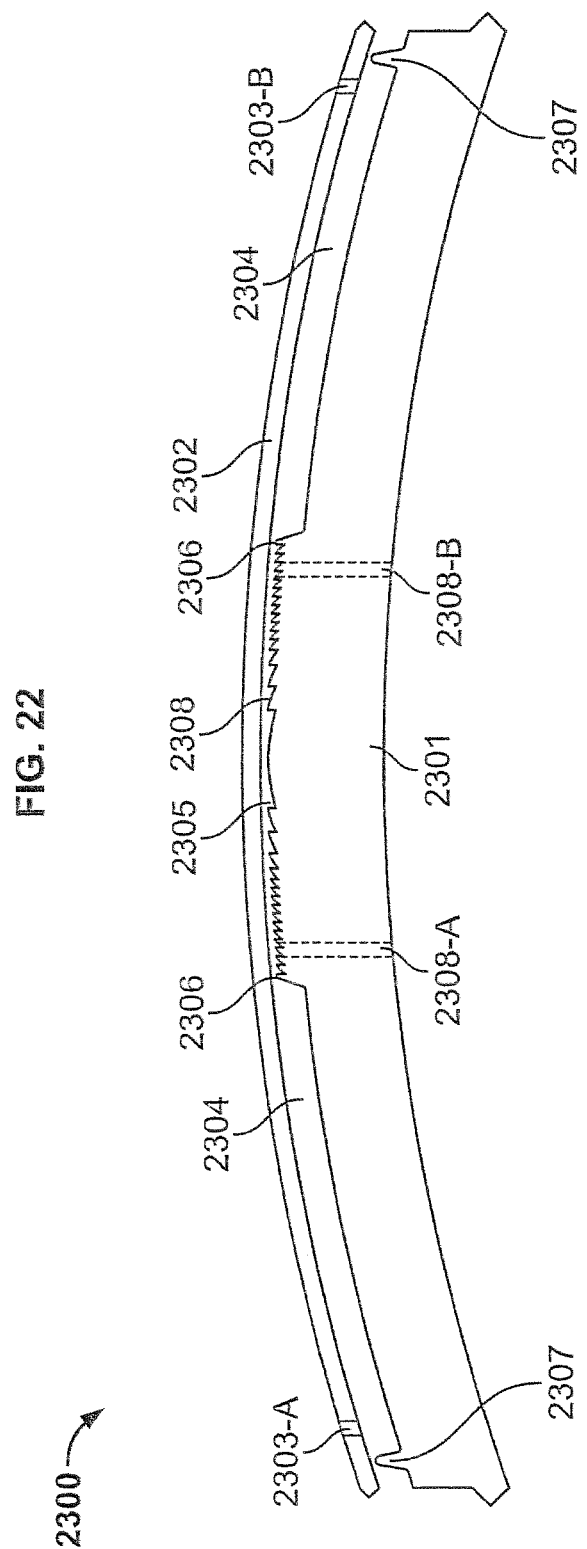
FIG. 22
FIG. 23

|  |  | Additional Comments |
|---|---|---|
| Master name | FK |  |
| Attached files | FK picture.tif, FK 10mm r,z data in mm.xls |  |
|  |  |  |
| Master manufacturing |  |  |
| Master base metal | SS |  |
| Master diameter, thickness | 100mm, 25.4mm |  |
| Master curvature | Flat |  |
| Master plating | PGE electrolytic |  |
| Small tool | 10µm half-arc |  |
| Large tool | ~0.2mm full-arc |  |
| Small tool file | FK 10mm r,z data in mm.xls | r,z machining. 6 decimal places in z. Graphs included 0.2µm radial resolution. |
| Small tool cut radii | 0.0-13.100mm |  |
| Large tool files | - | Machine flat at -2.000mm depth |
| Large tool cut radii | 13.050-30.0mm | 50µm overlap between small and large tools. 0.5µm radial resolution. |
|  |  |  |
| Master description |  |  |
| Master picture | FK picture.tif | 5mm, 1mm gridlines |
| Nominal diffractive depth | 4.1µm |  |
| Diffractive edge smoothing | Yes | Fixed zone edge smoothing |
| Diffractive power | 0.75D | For all radii |
| Upstands | None |  |
| Diffractive shape | Circle |  |
| DE blend width | No DE blend |  |
|  |  |  |
| Quality Control |  |  |
| Surface roughness | <3nm rms | Centre, 6mm, 12mm taken with Zygo using x30 obj and x2 zoom. Send images to Roger Clarke before shipping. |
| Diffractive structure |  | No flat-tops or flat-bottoms. Smooth zone edges. |

FIG. 35

Example of data set:

| Master manufacturing | | |
|---|---|---|
| Master base metal | Al | |
| Master diameter, thickness | 63mm, 25.4mm | |
| Master curvature | 124.52 RoC | |
| Master plating | TechMetal | |
| Small tool | 10μm half-arc | |
| Large tool | ~0.5mm full-arc | |
| Small tool cut radii | 0.0-16.0 mm | |
| Large tool cut radii | 16.0-41.5 mm | |
| Data angular resolution | 0.2° | |
| Data radial resolution | 1.0 μm | |
| | | |
| Master description | | |
| Master picture | FA picture.tif | 5mm, 1mm gridlines |
| Nominal diffractive depth | 3.766μm | |
| Diffractive edge smoothing | No | |
| Diffractive power | 0.75D | For all radii |
| Upstands | Yes | 0.94μm deep, 0.5mm pitch |
| Diffractive shape | Elliptical | 16x30mm full power, 1mm optical blend around circumference |
| DE blend width | None | |

FIG. 38

| | | |
|---|---|---|
| Master manufacturing | | |
| Master base metal | SS | |
| Master diameter, thickness | 100mm, 25.4mm | |
| Master curvature | 124.52 RoC | |
| Master plating | TechMetal | |
| Small tool | 10µm half-arc | |
| Large tool | ~0.5mm full-arc | |
| Small tool cut radii | 0.0-16.0mm | |
| Large tool cut radii | 16.0-35.0mm | |
| Data angular resolution | 0.5° | |
| Data radial resolution | 1.0 µm | |
| | | |
| Master description | | |
| Master picture | FB picture.tif | 5mm, 1mm gridlines |
| Nominal diffractive depth | 4.0µm | |
| Diffractive edge smoothing | No | |
| Diffractive power | 0.75D | For all radii |
| Upstands | Yes | 1.0µm deep, 2.0mm pitch |
| Diffractive shape | Flat-top | Optical blend 14.0-16.0mm radius |
| DE blend width | 1.0mm | Horizontal DE blend 6.0-7.0mm |

FIG. 40

| Master manufacturing | | |
|---|---|---|
| Master base metal | SS | |
| Master diameter, thickness | 100mm, 25.4mm | |
| Master curvature | 124.52 RoC | |
| Master plating | PGE, electrolytic | |
| Small tool | 10μm half-arc | |
| Large tool | ~0.5mm full-arc | |
| Small tool cut radii | 0.0-20.0mm | |
| Large tool cut radii | 18.0-35.0mm | |
| Data angular resolution | 0.5° | |
| Data radial resolution | 0.4 μm | |
| | | |
| Master description | | |
| Master picture | FF picture.tif | 5mm, 1mm gridlines |
| Nominal diffractive depth | 4.0μm | |
| Diffractive edge smoothing | Yes | |
| Diffractive power | 0.73D | For r<6.0mm, fixed zonewidth thereafter |
| Upstands | Yes | 1.0μm deep, 2.0mm pitch, r>20mm |
| Diffractive shape | Enlarged progressive | 17mm high, 2mm low, 34mm wide |
| DE blend width | 1.0mm | DE blend everywhere |

FIG. 42

ELECTRO-ACTIVE DIFFRACTIVE LENS AND METHOD FOR MAKING THE SAME

CROSS-REFERENCE TO RELATED APPLICATIONS

This application claims priority from and incorporates by reference in their entirety the following provisional applications:

U.S. Appl. No. 61/044,205, filed on Apr. 11, 2008; and
U.S. Appl. No. 61/152,913, filed on Feb. 16, 2009.

BACKGROUND OF THE INVENTION

1. Field of the Invention

The present invention generally relates to lenses. More specifically, the present invention provides encapsulation of a liquid optical material using a solid optical material with improved structural integrity and reduced visibility of any liquid optical material seal feature.

2. Background Art

Electro-active lenses generally include a liquid optical material (e.g., liquid crystal) encapsulated or contained by one or more solid, transparent optical materials. Conventional methods and structures for containing the liquid optical material often result in a visible seal ring on the lens indicating the positioning of the liquid optical material. These visible seal rings are cosmetically undesirable to consumers.

In conventional liquid crystal displays (LCDs), sealing features can typically be hidden behind an opaque frame or bezel. Such structures, however, are not viable for ophthalmic lenses and spectacle lenses in particular.

To date, methods and structures designed to reduce the visibility of any liquid optical material seal in an ophthalmic lens often compromise the structural integrity of the lens. As such, conventional methods for processing such lenses (e.g., conventional methods for cutting and edging a lens) can cause containment of the liquid optical material to be disturbed and can also disrupt the ability to alter the refractive index of the liquid optical material electronically. Consequently, many prior art electro-active lenses are not commercially viable products.

Accordingly, what is needed is an electro-active lens and method for manufacturing the same that encapsulates liquid crystal using solid transparent optical material such that the visibility of any liquid crystal seal feature is substantially reduced, while simultaneously providing a structurally robust lens that can be processed to fit a spectacle frame without disrupting containment of the liquid crystal or the ability to alter its refractive index electronically.

BRIEF DESCRIPTION OF THE DRAWINGS/FIGURES

Figure 5:
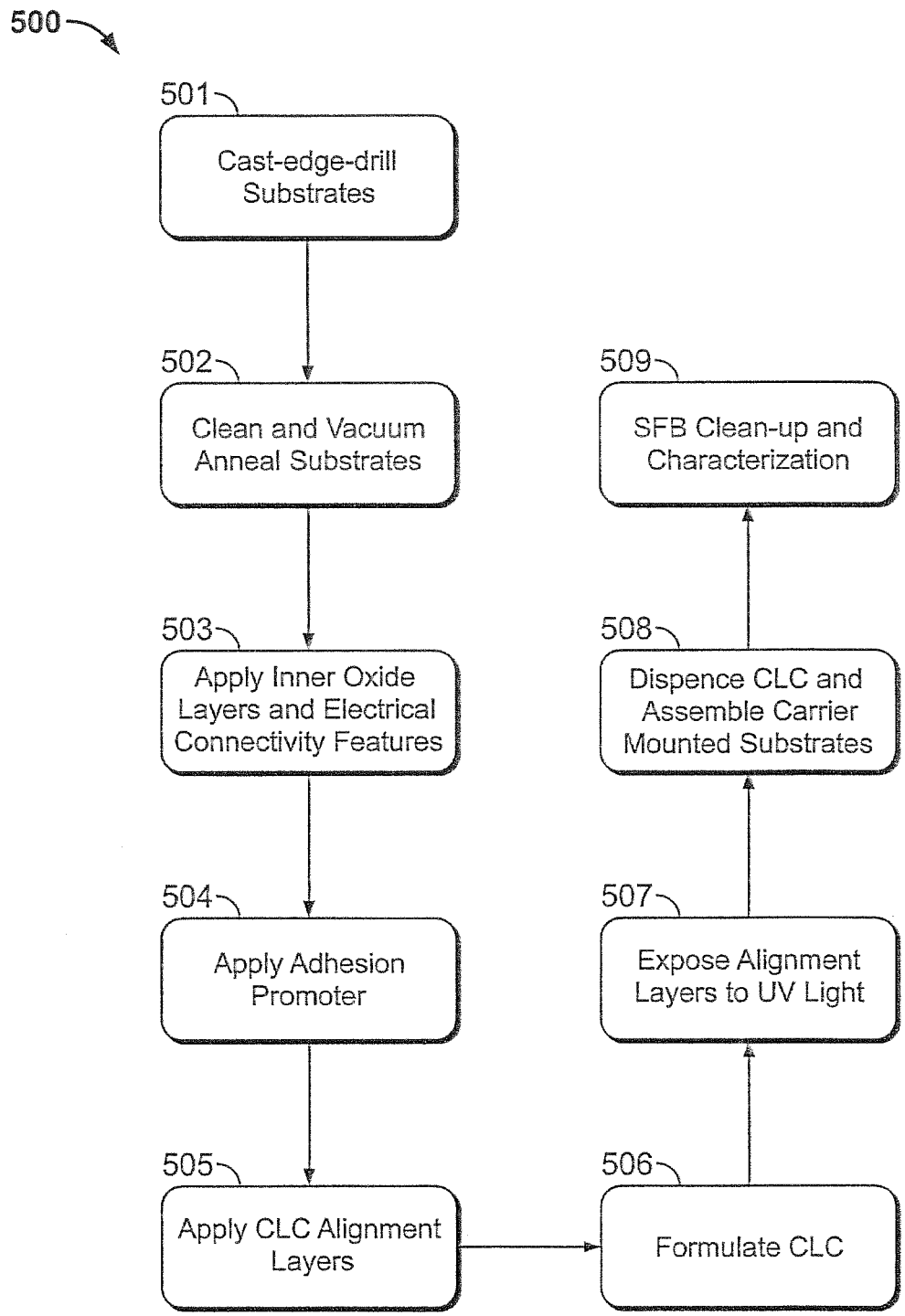

FIG. 5 provides a flowchart that illustrates operational steps for manufacturing the EASFLB in accordance with an aspect of the present invention.

Figure 6:
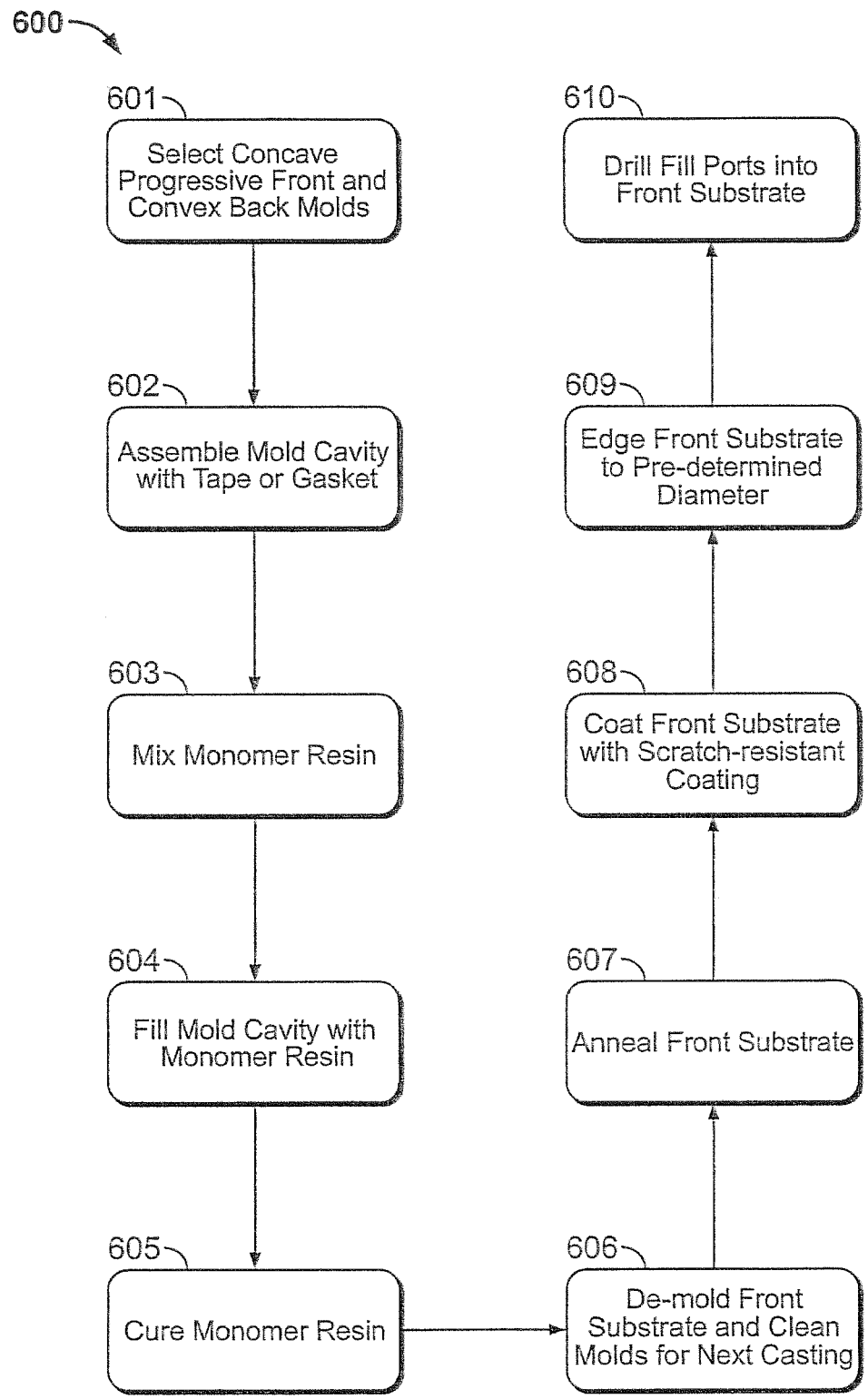

FIG. 6 provides a flowchart that illustrates operational steps for generating a front substrate of the EASFLB in accordance with an aspect of the present invention.

Figure 7:
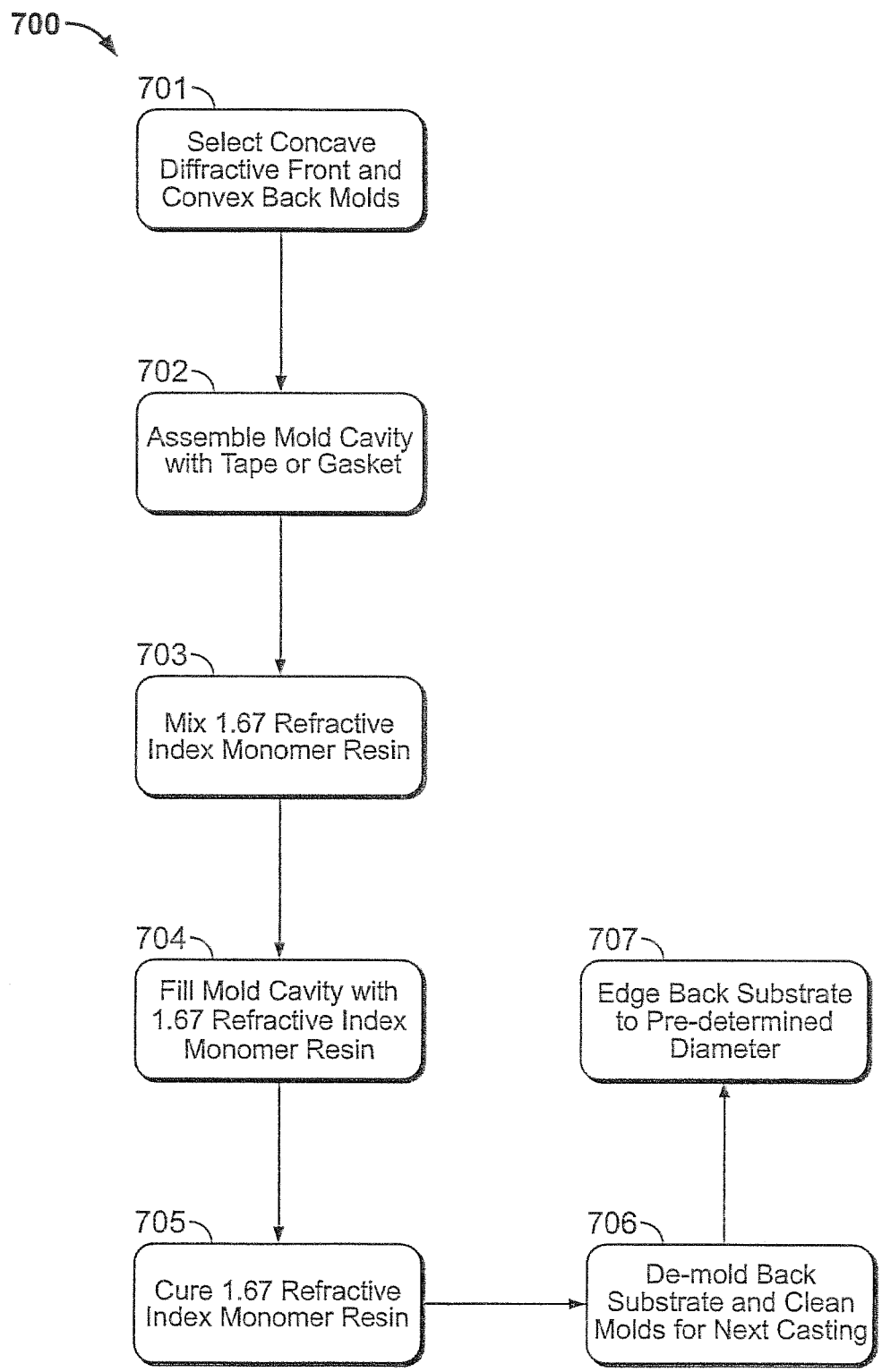

FIG. 7 provides a flowchart that illustrates operational steps for generating a back substrate of the EASFLB in accordance with an aspect of the present invention.

FIG. 8 provides a flowchart that illustrates operational steps for cleaning and annealing the front substrate and the back substrate of the EASFLB in accordance with an aspect of the present invention.

FIG. 9 provides a flowchart that illustrates operational steps for applying multiple layers to the front and back substrates of the EASFLB to form a portion of a dynamic, electro-active, diffractive optical power region in accordance with an aspect of the present invention.

Figure 10A:
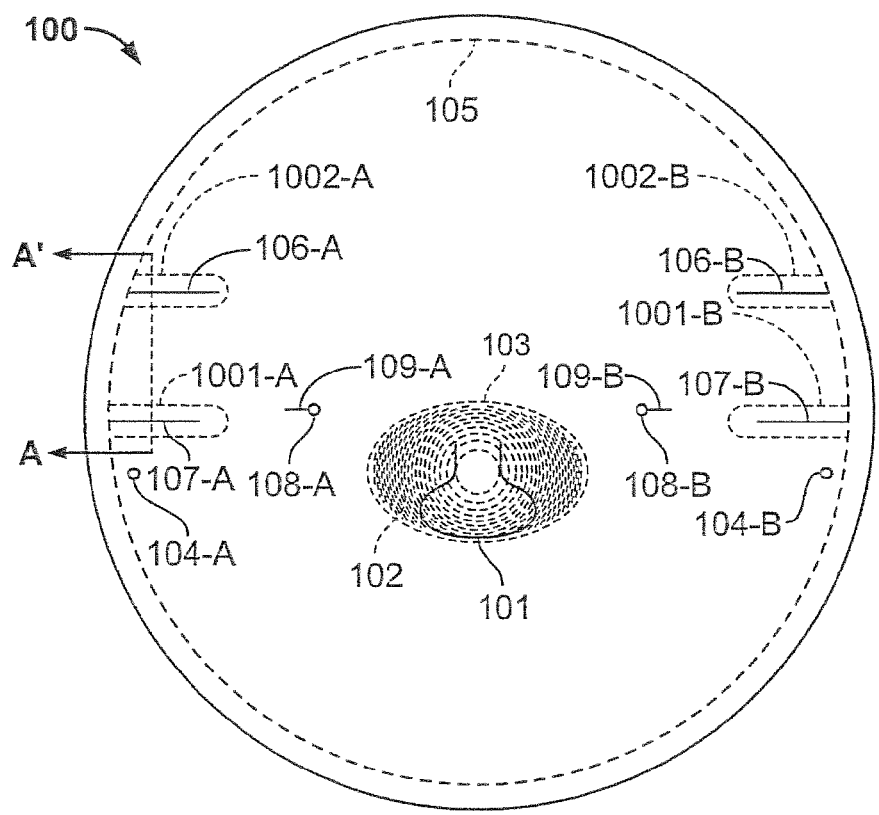
Figure 10B:
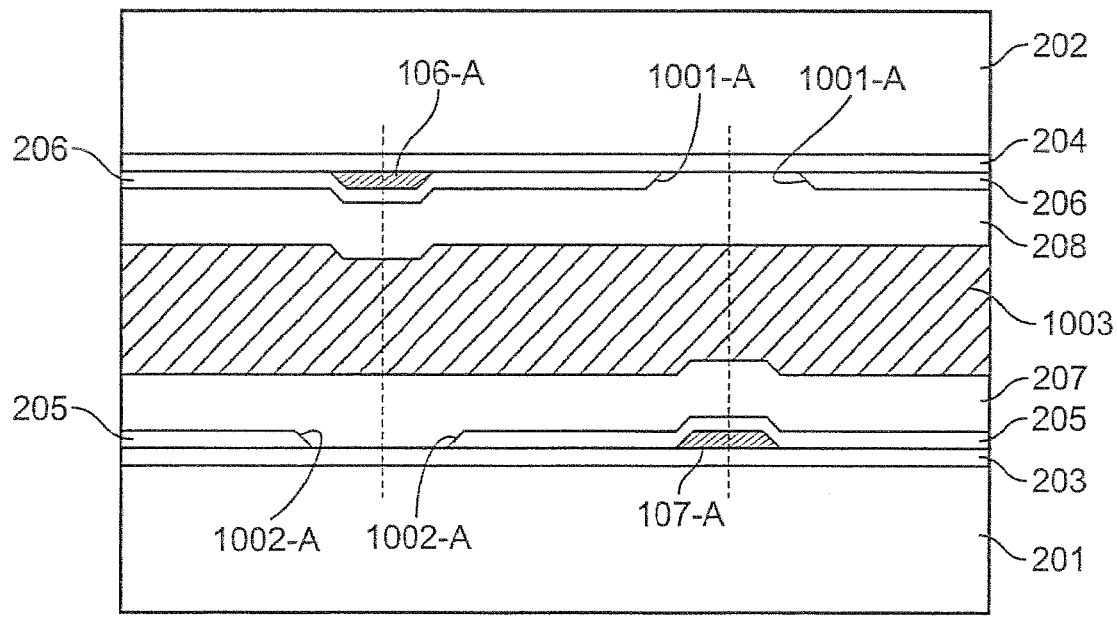

FIGS. 10A and 10B illustrate an exemplary deposition of conductive layers of the EASFLB in accordance with an aspect of the present invention.

Figure 11:
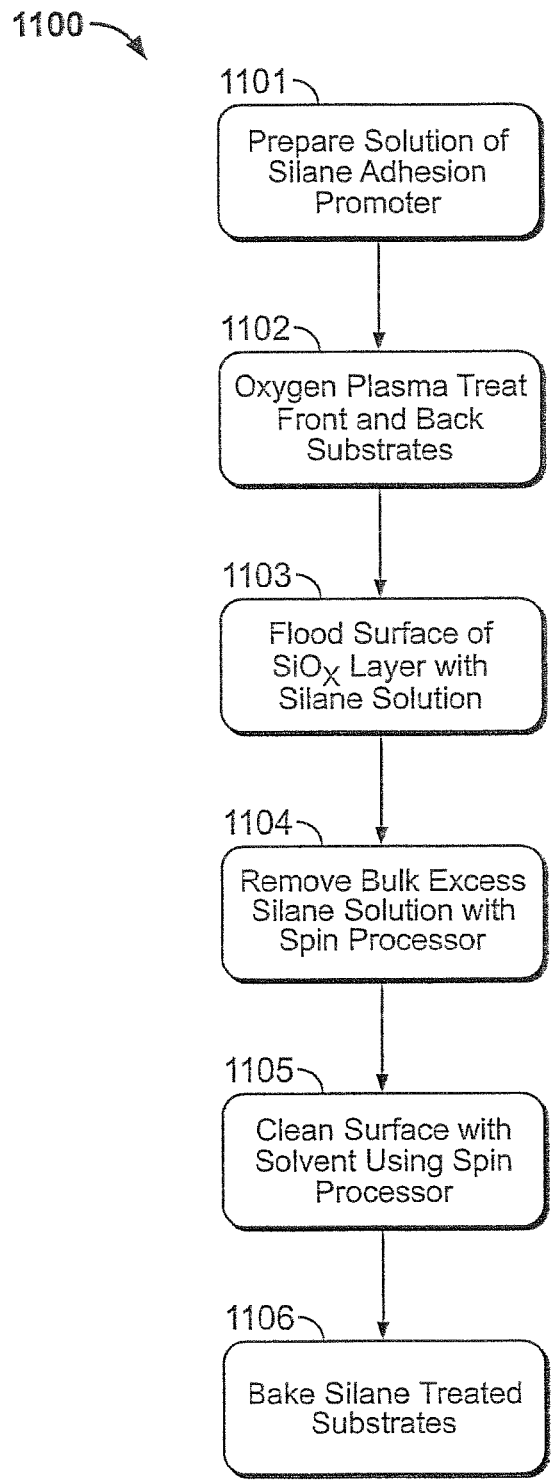

FIG. 11 provides a flowchart that illustrates operational steps for applying an adhesion promoter to substrates of the EASFLB in accordance with an aspect of the present invention.

Figure 12:
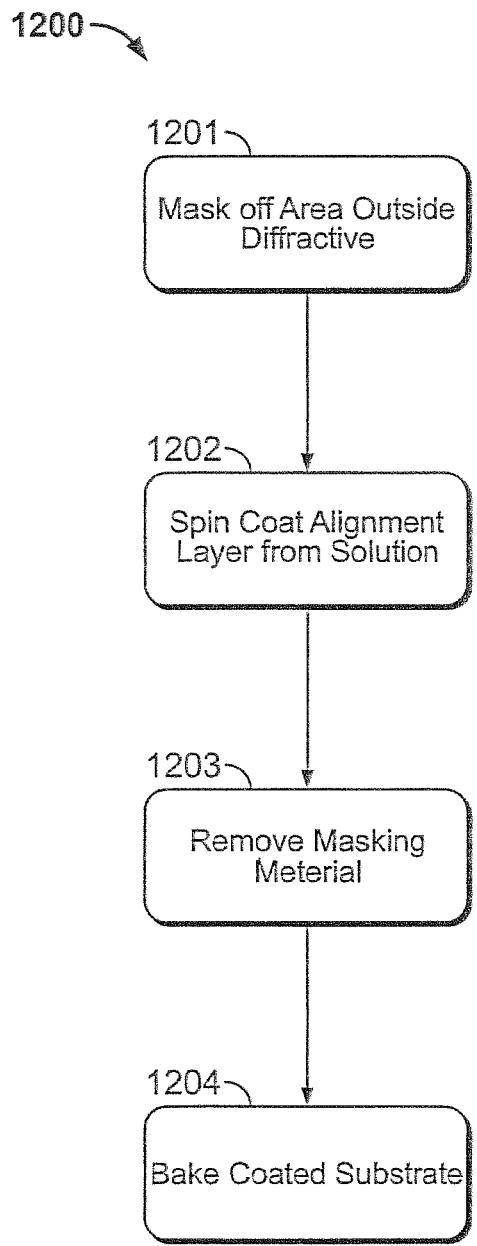

FIG. 12 provides a flowchart that illustrates operational steps for applying alignment layers to substrates of the EASFLB in accordance with an aspect of the present invention.

Figure 13:
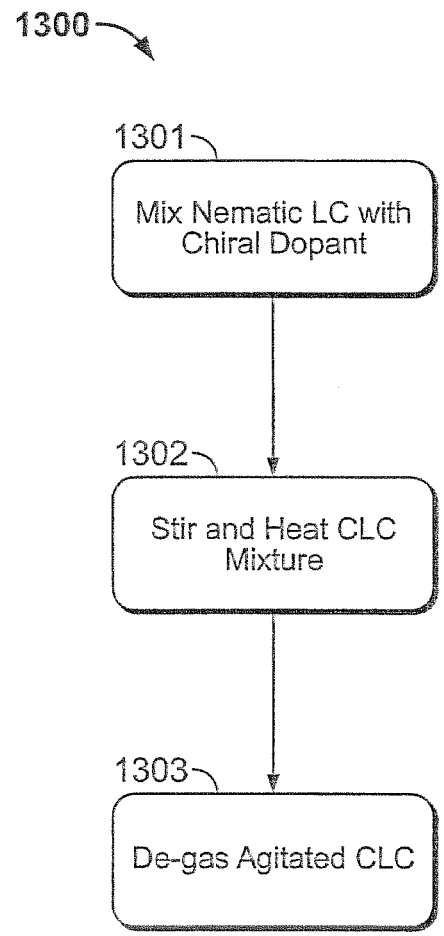

FIG. 13 provides a flowchart that illustrates operational steps for formulating electro-active material in accordance with an aspect of the present invention.

FIGS. 14A-D illustrate an exemplary process for aligning a front substrate and a back substrate of the EASFLB.

FIGS. 15A-D illustrate an exemplary carrier for holding a substrate of the EASFLB.

Figure 16:
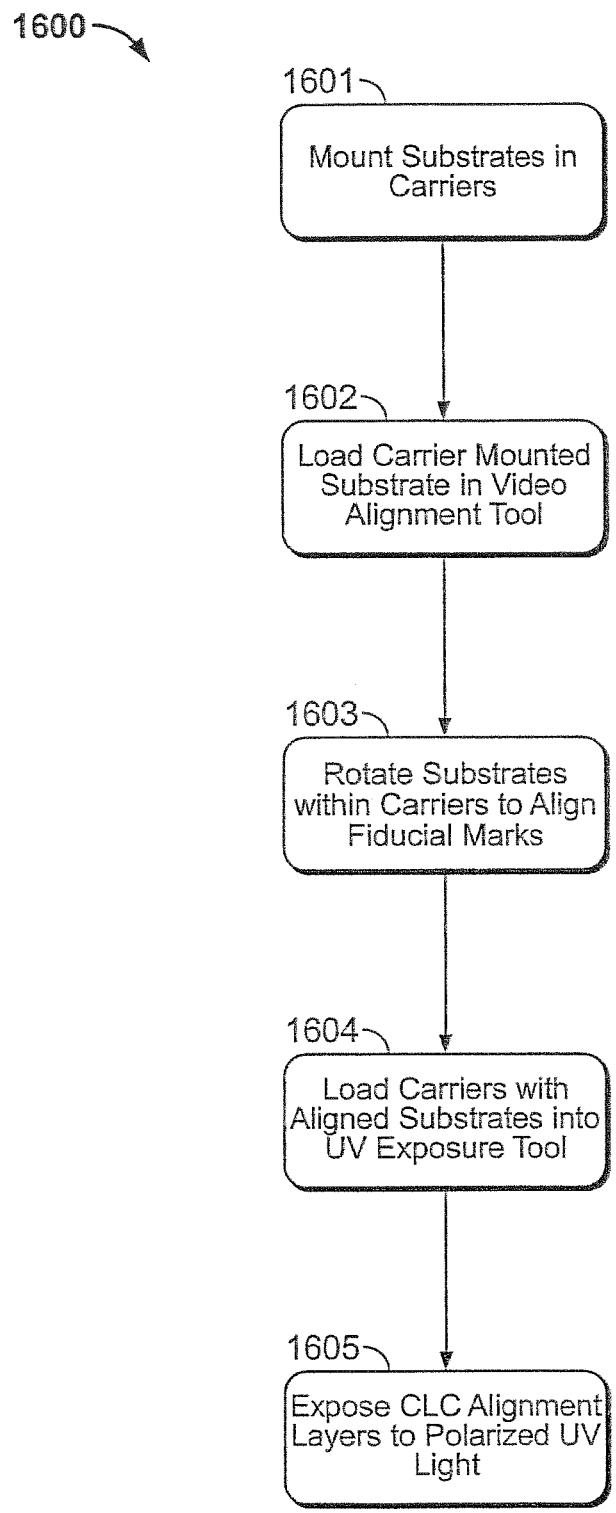

FIG. 16 provides a flowchart that illustrates operational steps for exposing alignment layers of substrates of the EASFLB to ultra-violet light in accordance with an aspect of the present invention.

Figure 17:
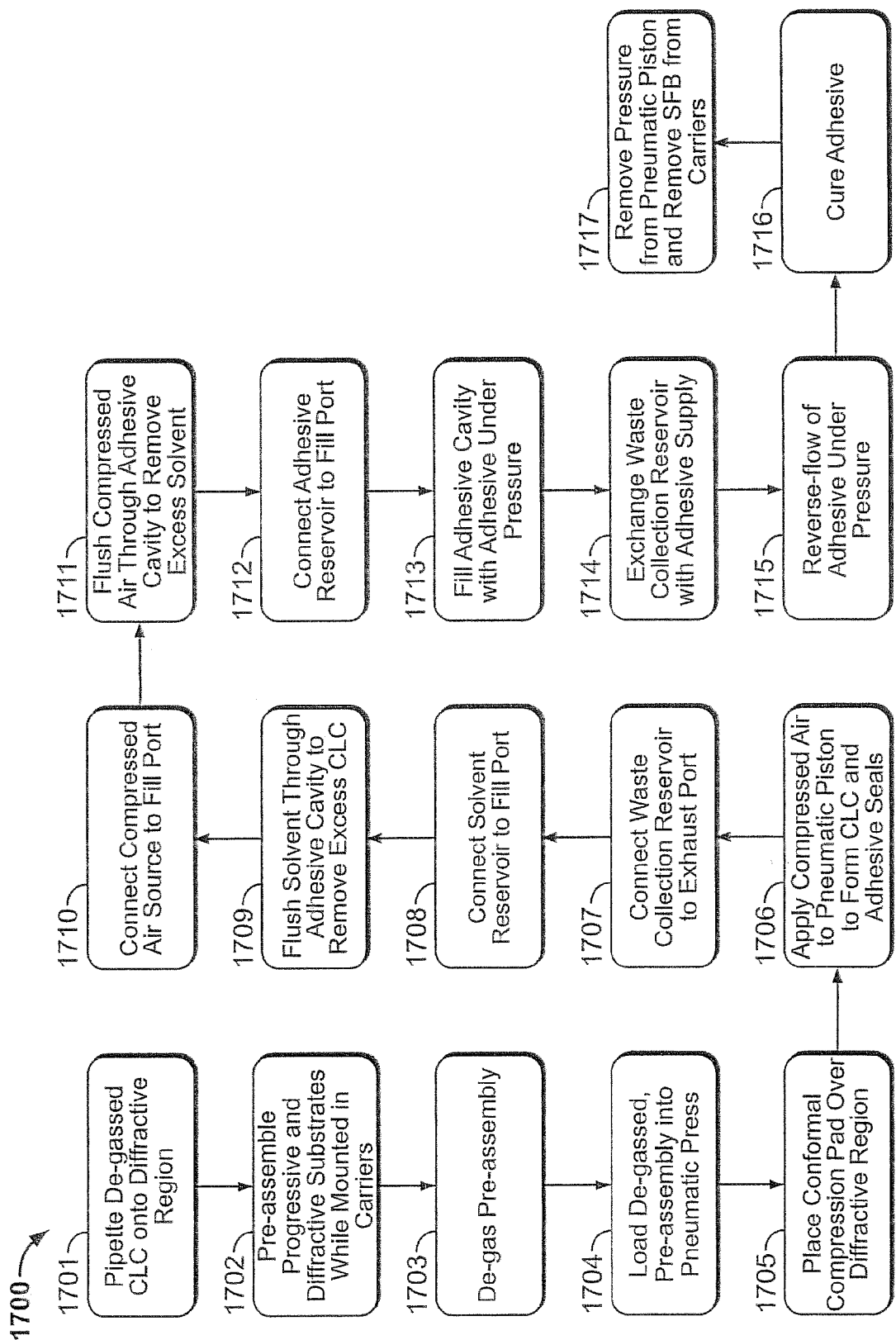

FIG. 17 provides a flowchart that illustrates operational steps for assembling front and back substrates to form the EASFLB in accordance with an aspect of the present invention.

Figure 18A:
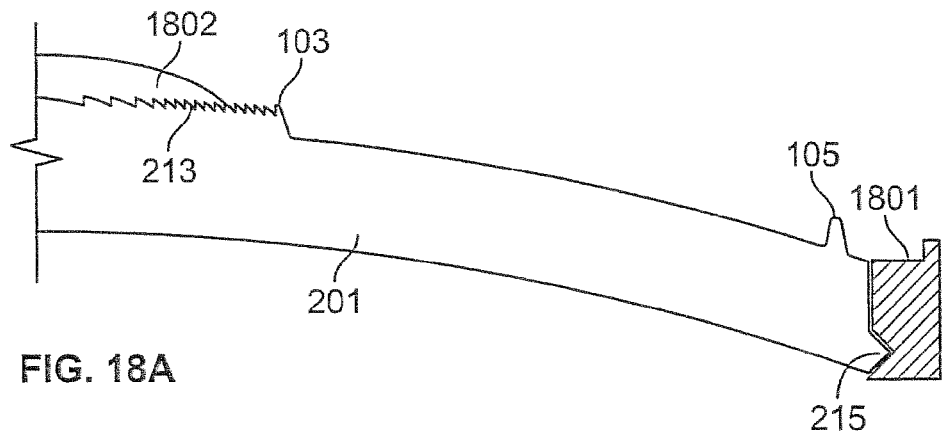
Figure 18B:
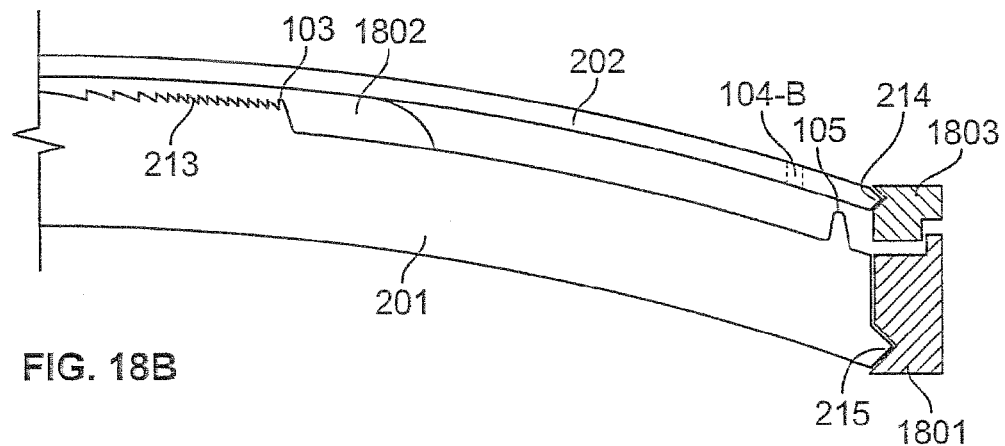
Figure 18C:
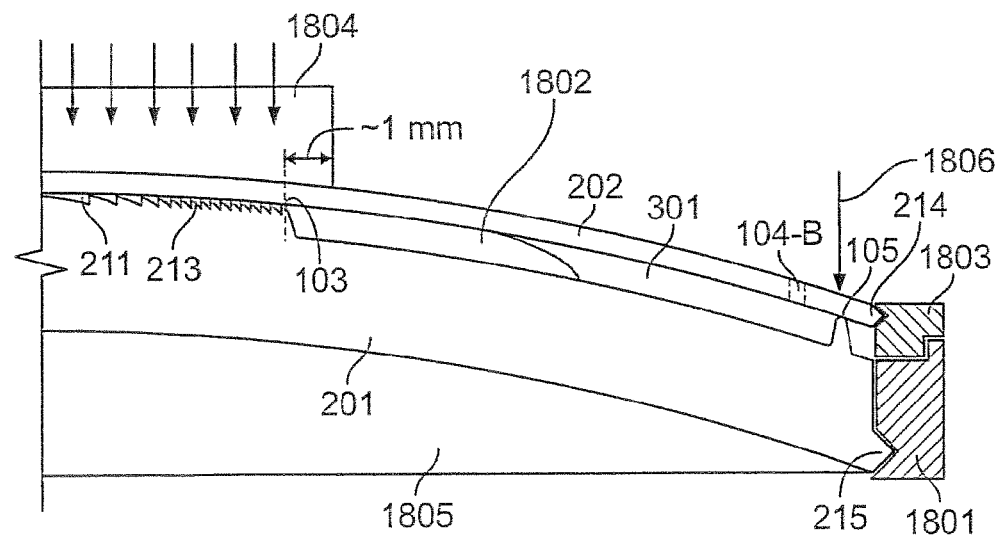

FIGS. 18A-C illustrate dispensing and encapsulating electro-active material within the EASFLB in accordance with an aspect of the present invention.

Figure 19:
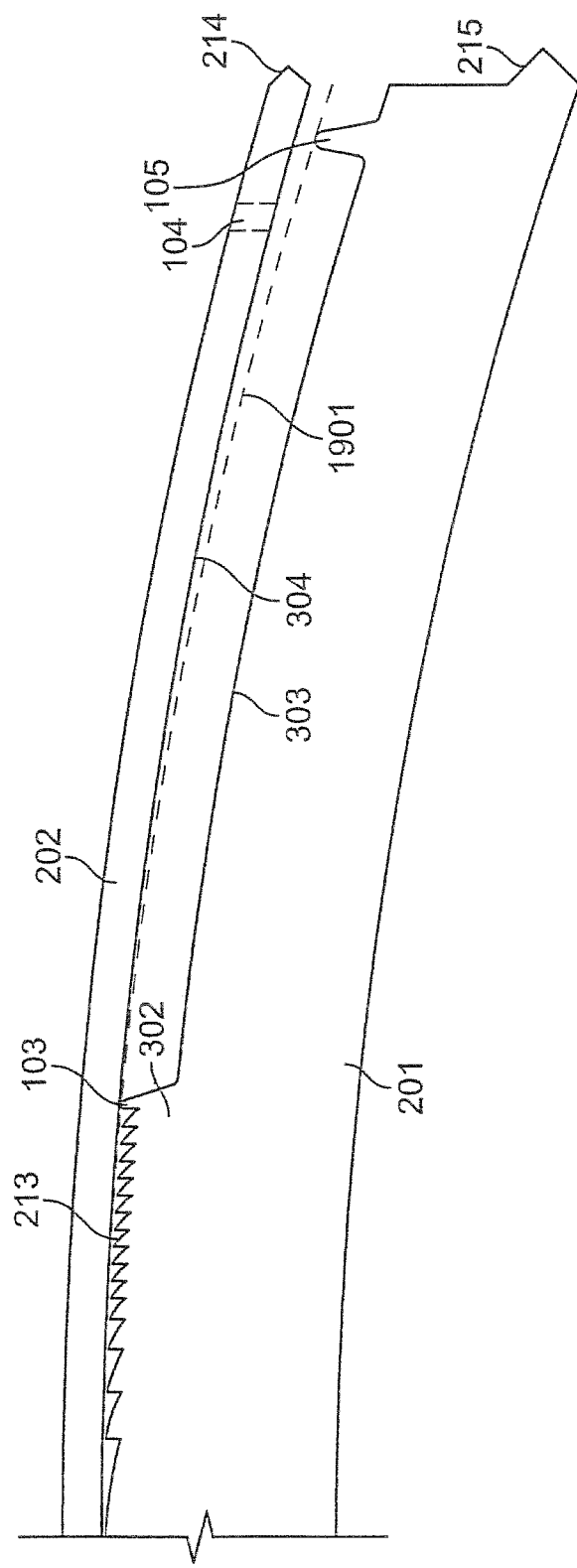

FIG. 19 illustrates a radius of curvature of a front substrate of the EASFLB in accordance with an aspect of the present invention.

Figure 20A:
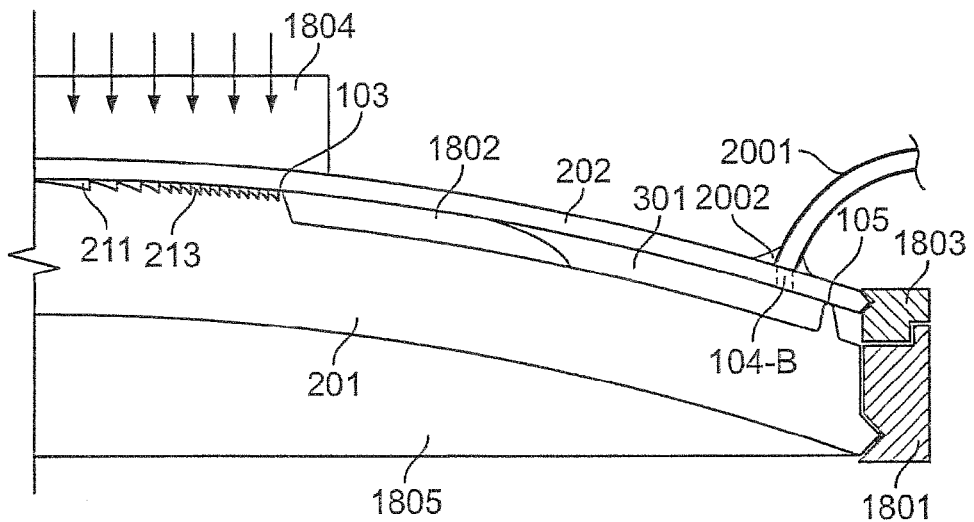
Figure 20B:
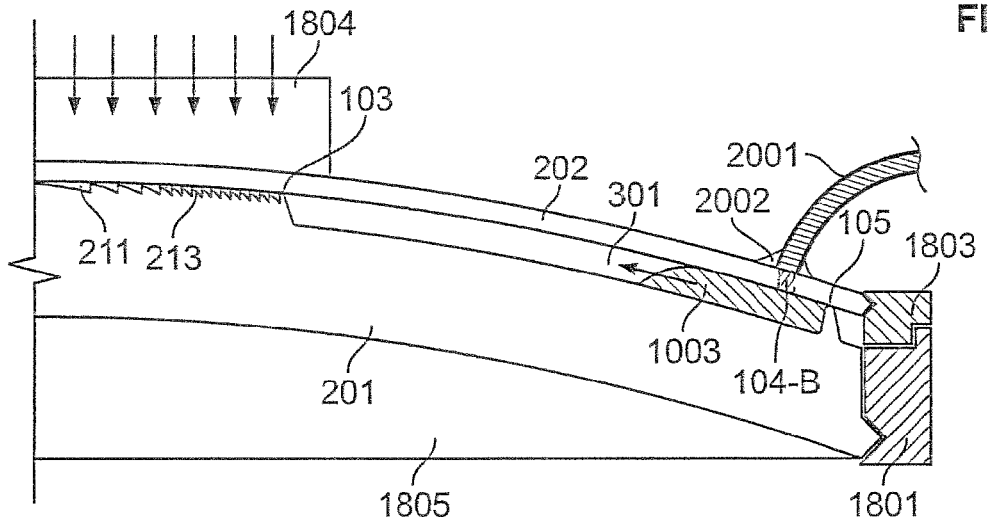
Figure 20C:
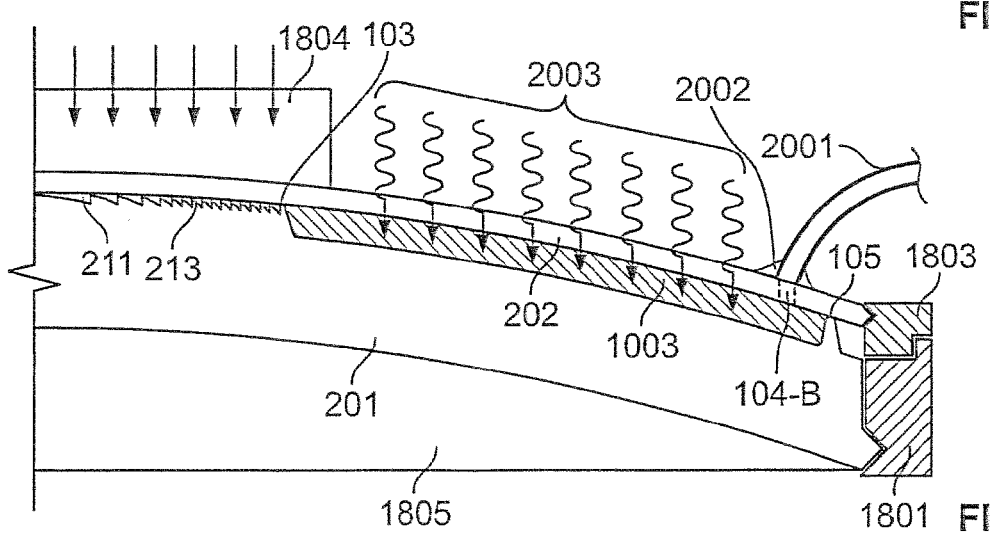

FIGS. 20A-C illustrate introduction and curing of an adhesive to adhere front and back substrates of the EASFLB in accordance with an aspect of the present invention.

Figure 21:
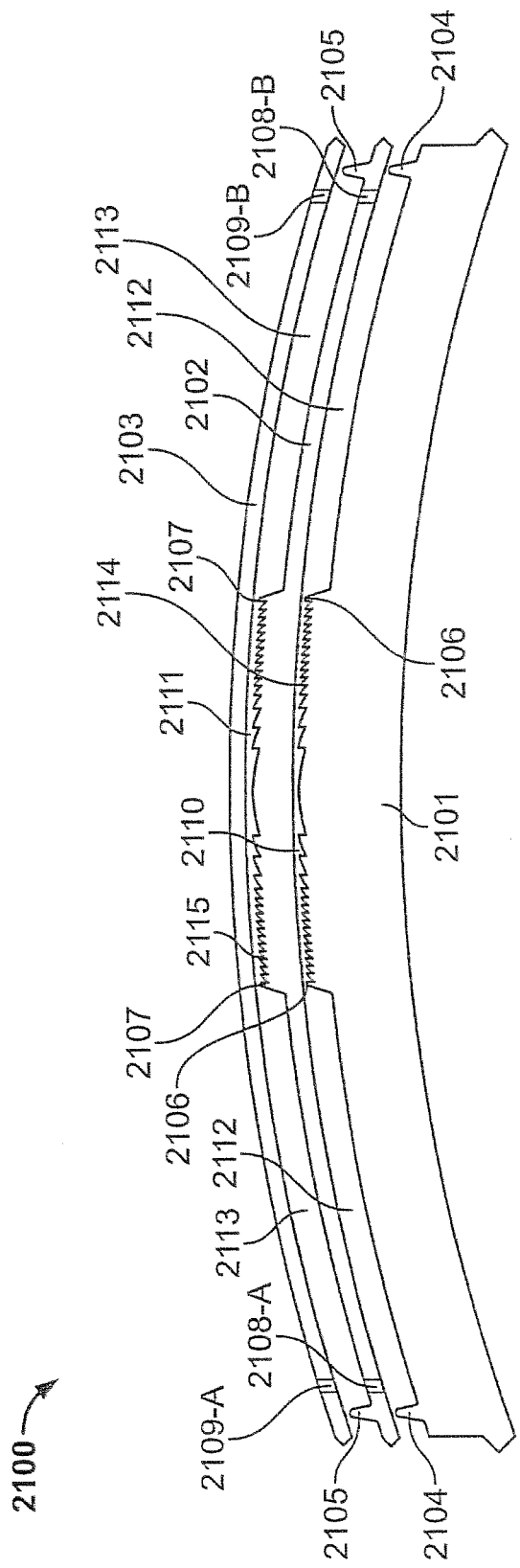

FIG. 21 illustrates a first exemplary alternative EASFLB in accordance with an aspect of the present invention.

FIG. 22 illustrates a second exemplary alternative EASFLB in accordance with an aspect of the present invention.

FIG. 23 illustrates a third exemplary alternative EASFLB in accordance with an aspect of the present invention.

Figure 24:
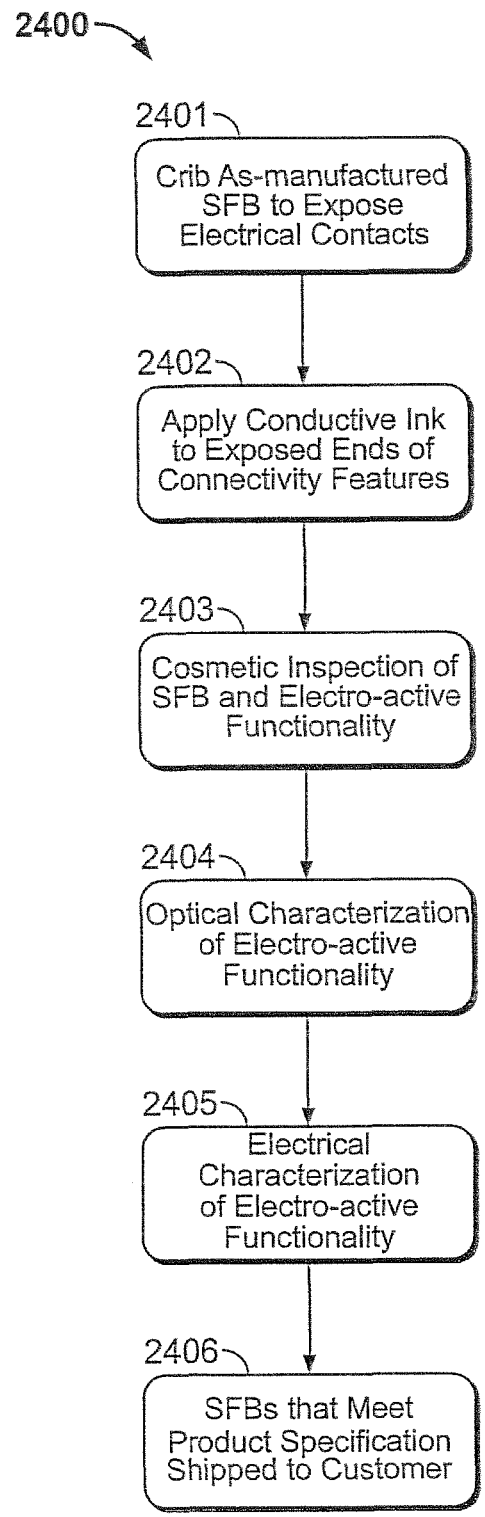

FIG. 24 provides a flowchart that illustrates operational steps for final processing the EASFLB in accordance with an aspect of the present invention.

Figure 25:
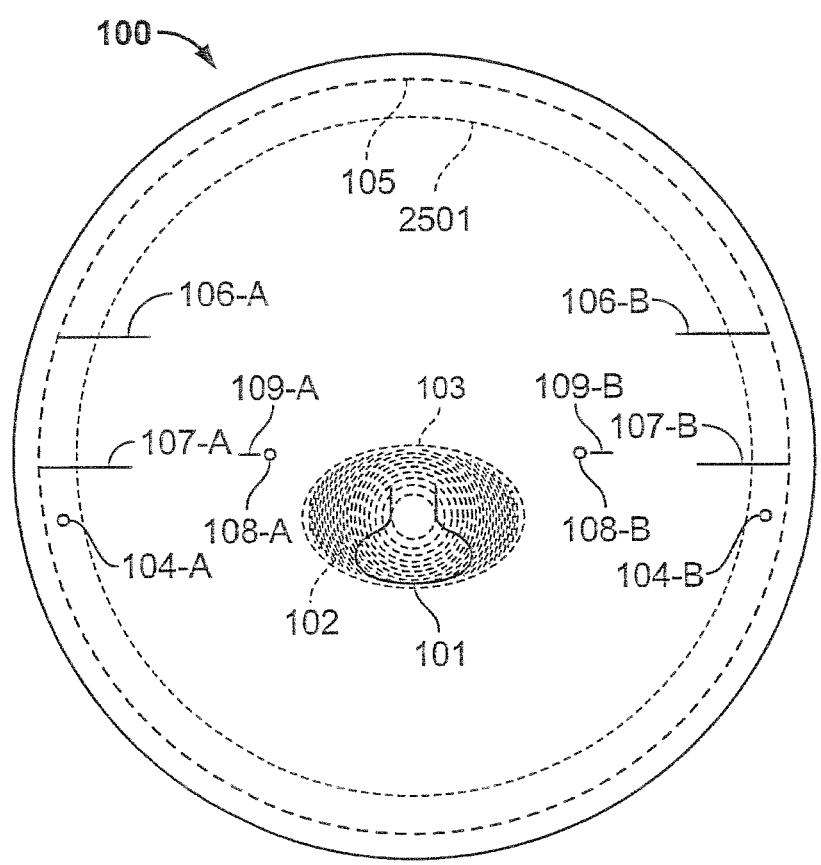

FIG. 25 illustrates an exemplary placement of a new peripheral edge of an EASFLB in accordance with an aspect of the present invention.

Figures 26A, 26B:
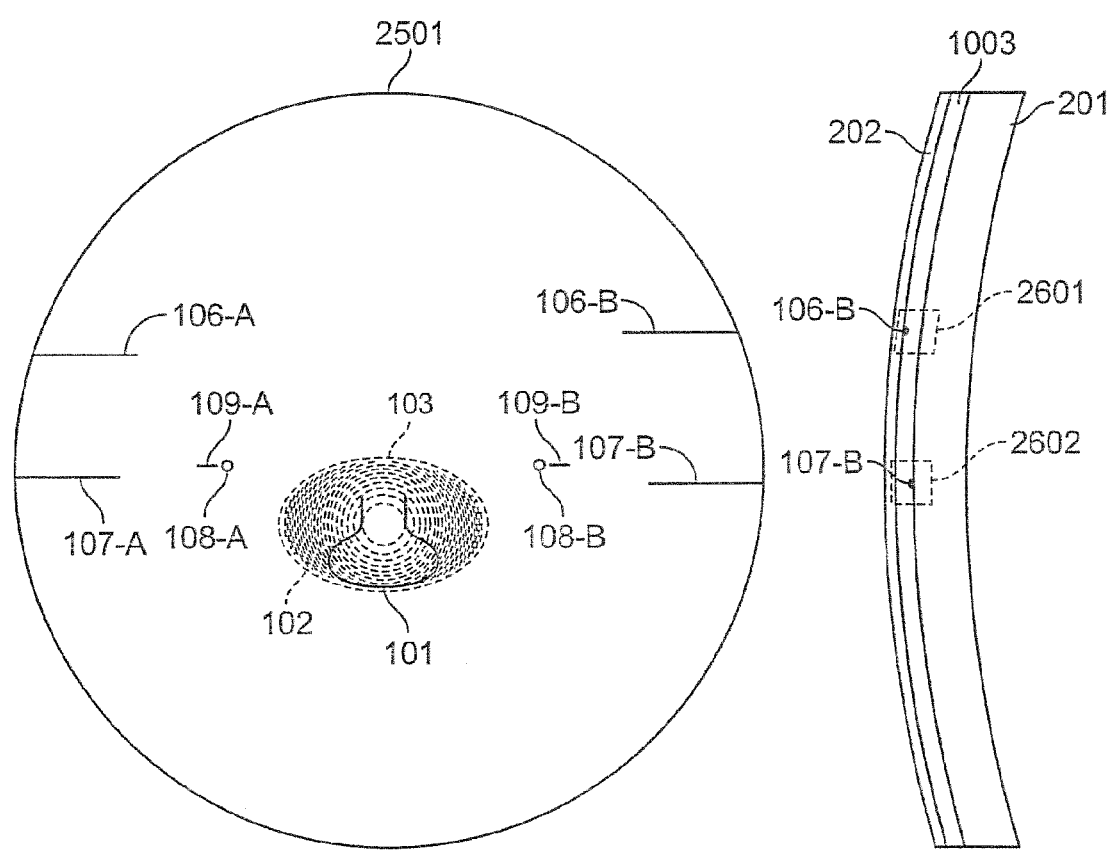

FIGS. 26A and 26B illustrate an EASFLB processed to have a reduced diameter in accordance with an aspect of the present invention.

Figure 27:
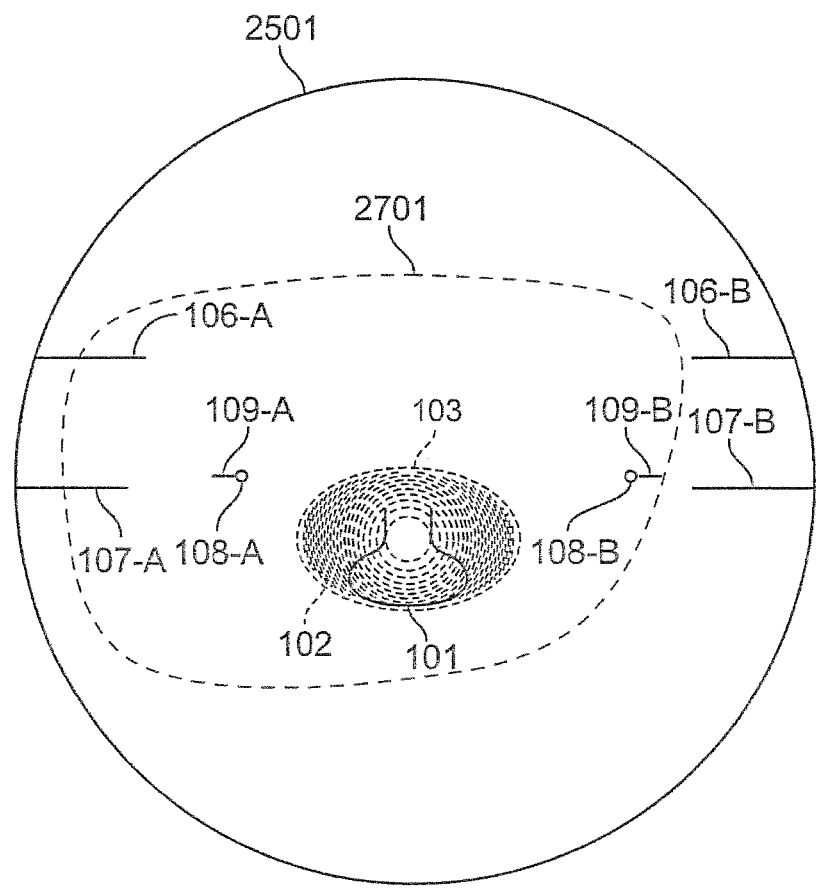

FIG. 27 illustrates a top view of an edged spectacle lens that can be formed from a cribbed, surfaced, and coated EASFLB in accordance with an aspect of the present invention.

Figure 28:
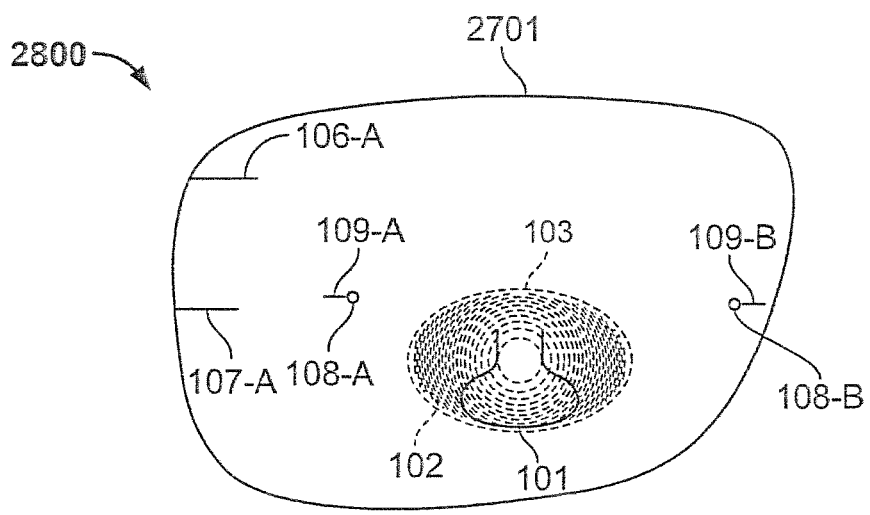
Figure 29:
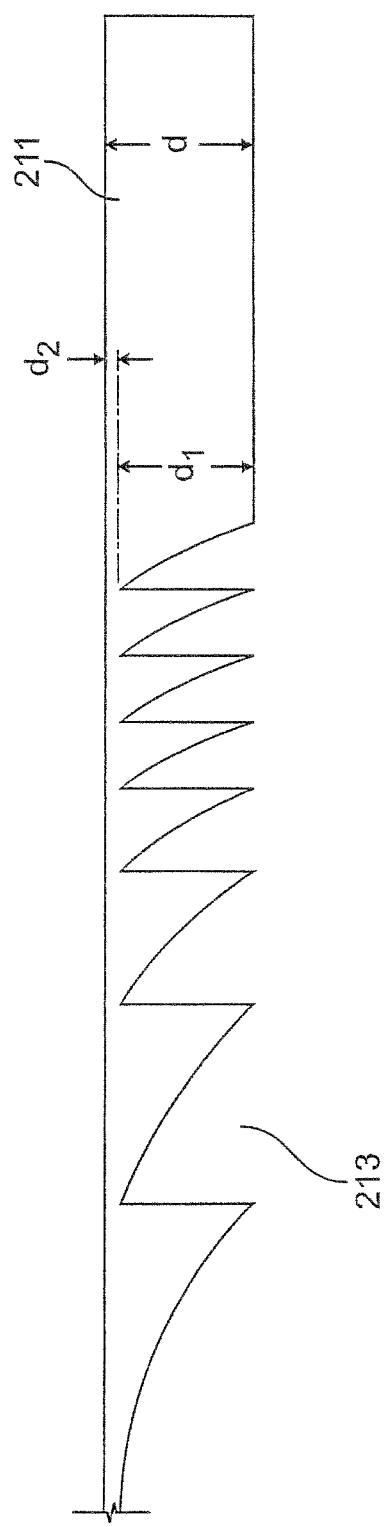

FIG. 28 illustrates a finished and edged spectacle lens in accordance with an aspect of the present invention FIG. 29 illustrates a portion of the dynamic, electro-active, diffractive optical power region of the EASFLB in accordance with an aspect of the present invention.

Figure 30A:
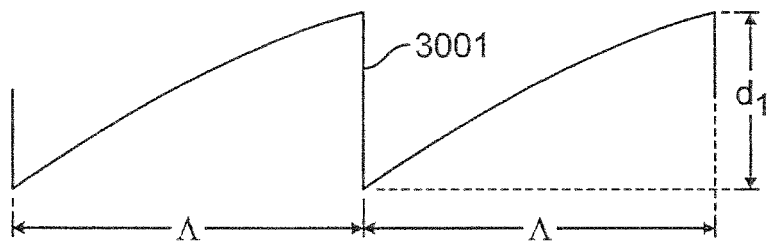
Figure 30B:
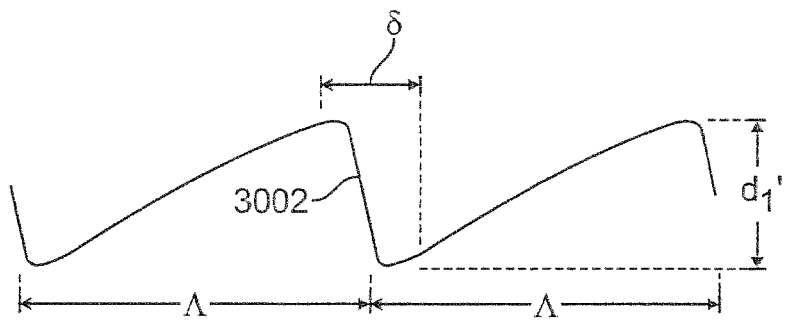
Figure 30C:
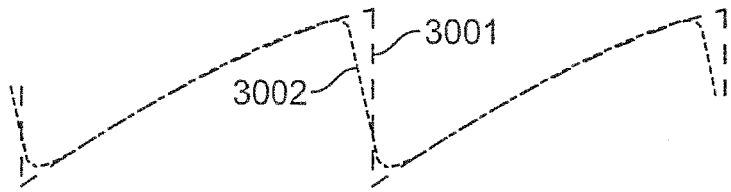

FIGS. 30A-C illustrate exemplary surface relief diffractive structures in accordance with an aspect of the present invention.

Figure 31A:
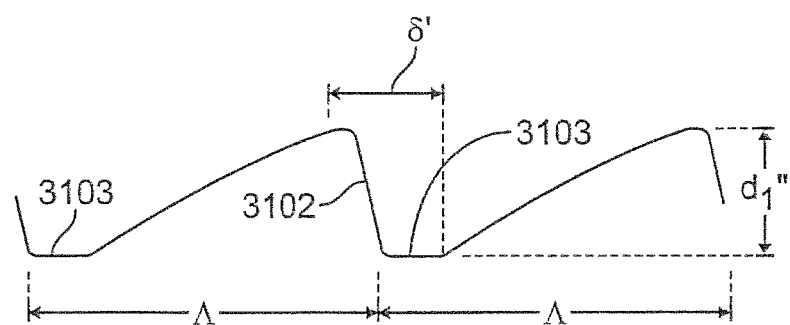
Figure 31B:
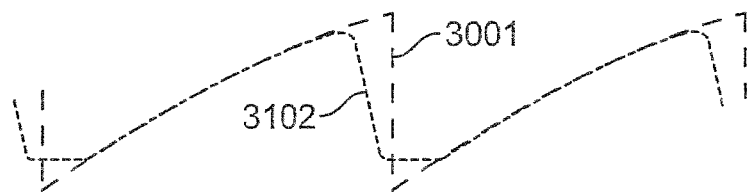

FIGS. 31A-B illustrate additional exemplary surface relief diffractive structures in accordance with an aspect of the present invention.

Figure 32:
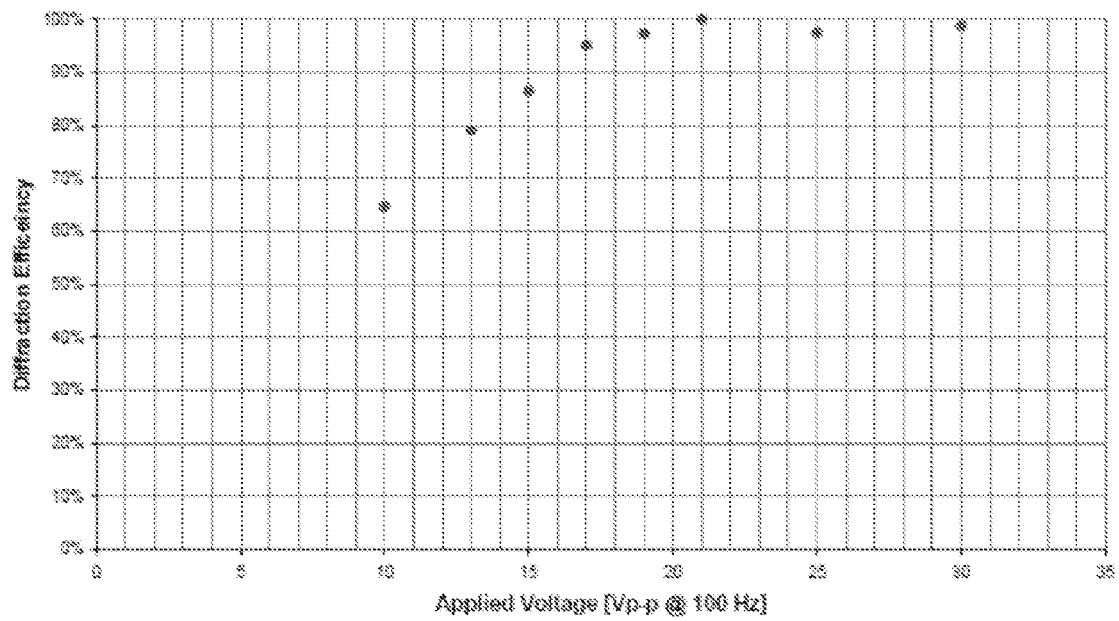

FIG. 32 illustrates a plot of first-order diffraction efficiency versus applied voltage at 550 nm, where the applied voltage is at 100 Hz.

Figure 33:
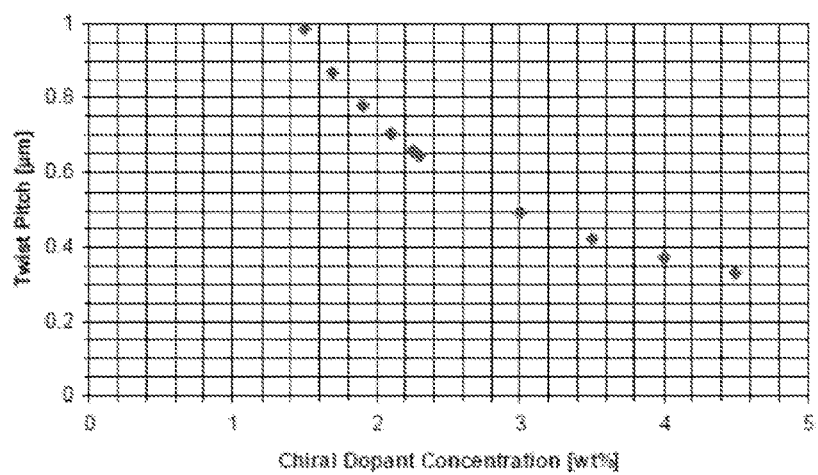

FIG. 33 illustrates a plot of the twist pitch versus the chiral dopant concentration.

Figure 34:
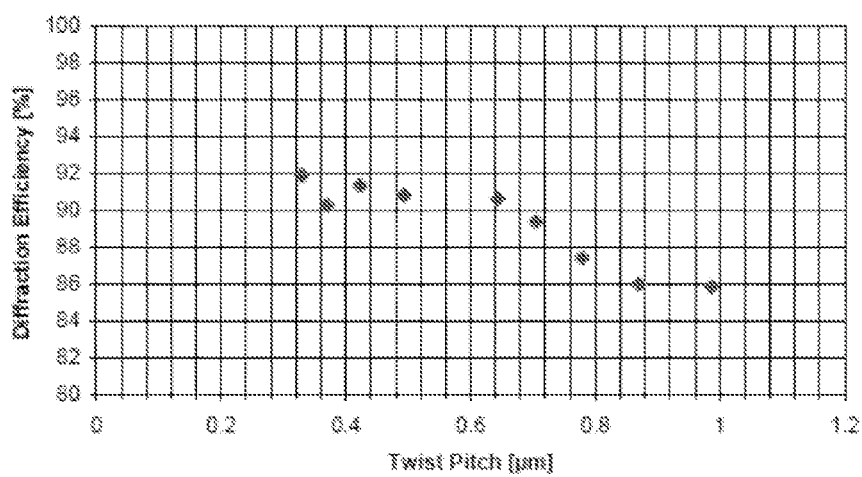

FIG. 34 illustrates a plot of the off-state zeroth-order diffraction efficiency versus twist pitch at 550 nm.

FIG. 35 provides a summary of information for a circular diffractive optic.

Figure 36:
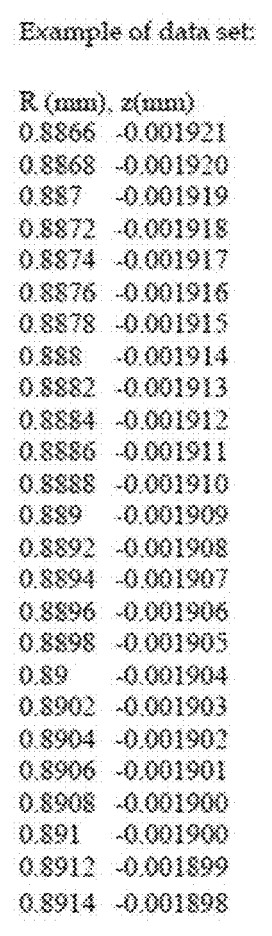

FIG. 36 provides an example data set for a circular diffractive optic.

Figure 37:
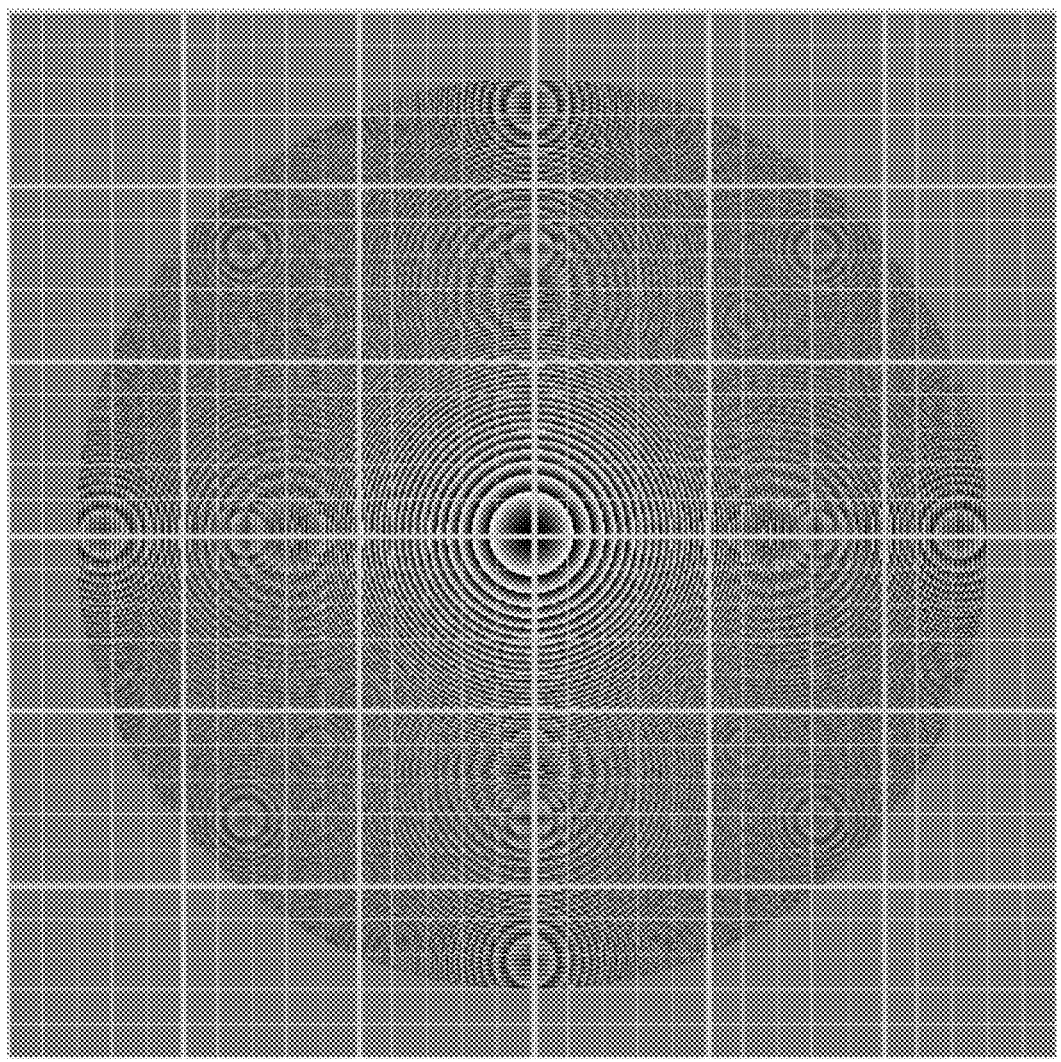

FIG. 37 illustrates a diffractive master picture (course grid of 5 mm, fine grid of 1 mm) for a circular diffractive optic.

Figure 39:
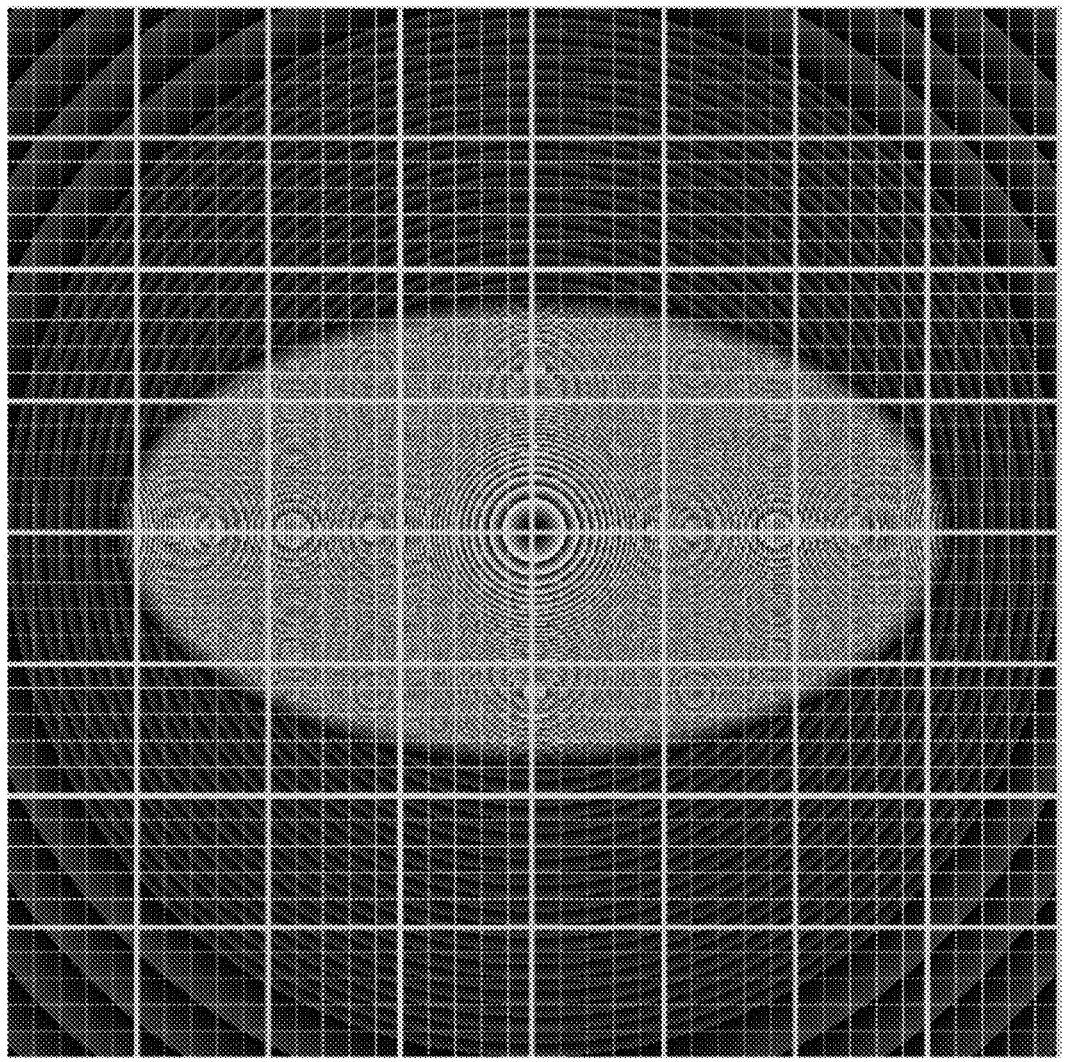

FIG. 38 provides an example data set for an elliptical diffractive optic. FIG. 39 illustrates a diffractive master picture (course grid of 5 mm, fine grid of 1 mm) for an elliptical diffractive optic.

FIG. 40 provides an example data set for a flat-top diffractive optic.

Figure 41:
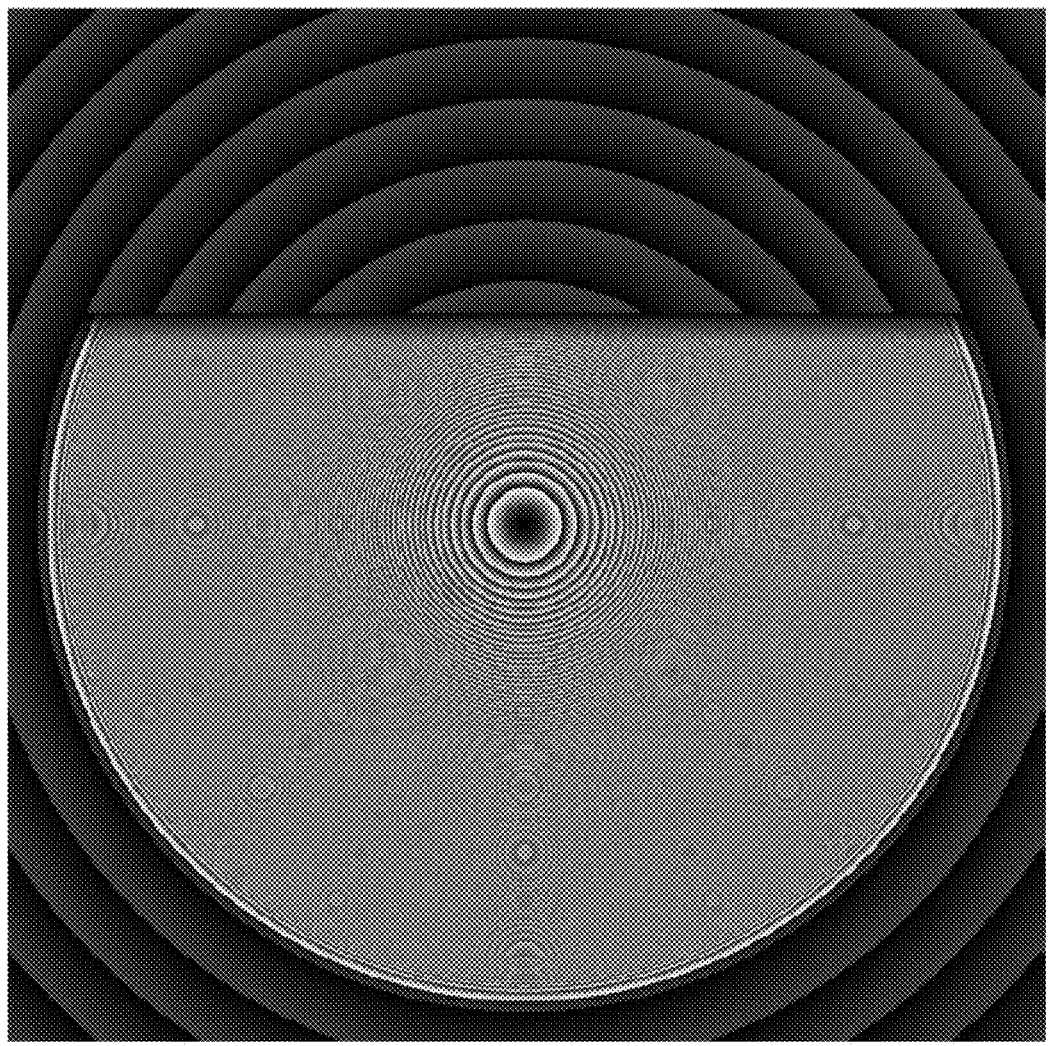

FIG. 41 illustrates a diffractive master picture (course grid of 5 mm, fine grid of 1 mm) for a flat-top diffractive optic.

FIG. 42 provides an example data set for a diffractive optic with optical power progression.

Figure 43:
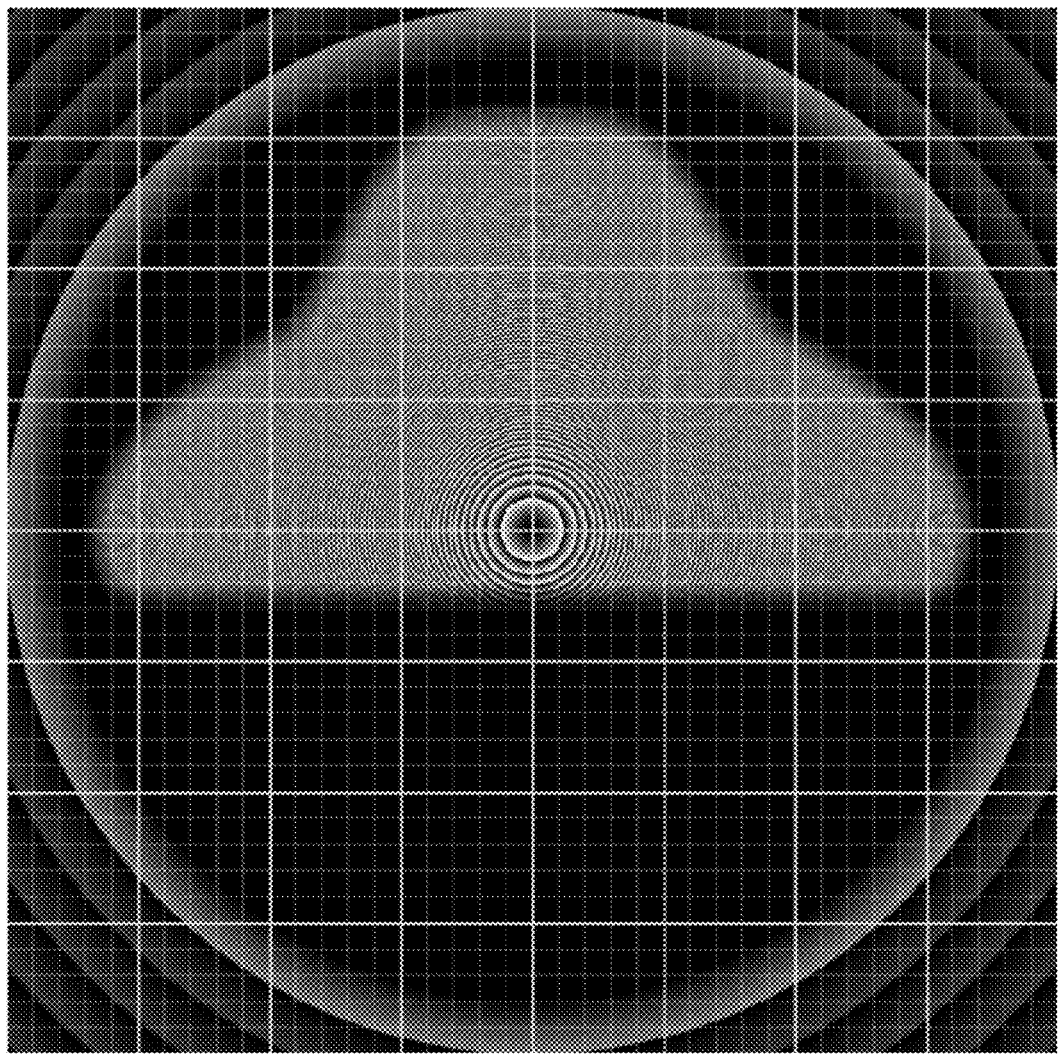

FIG. 43 illustrates a diffractive master picture (course grid of 5 mm, fine grid of 1 mm) for a diffractive optic with optical power progression.

Figure 44:
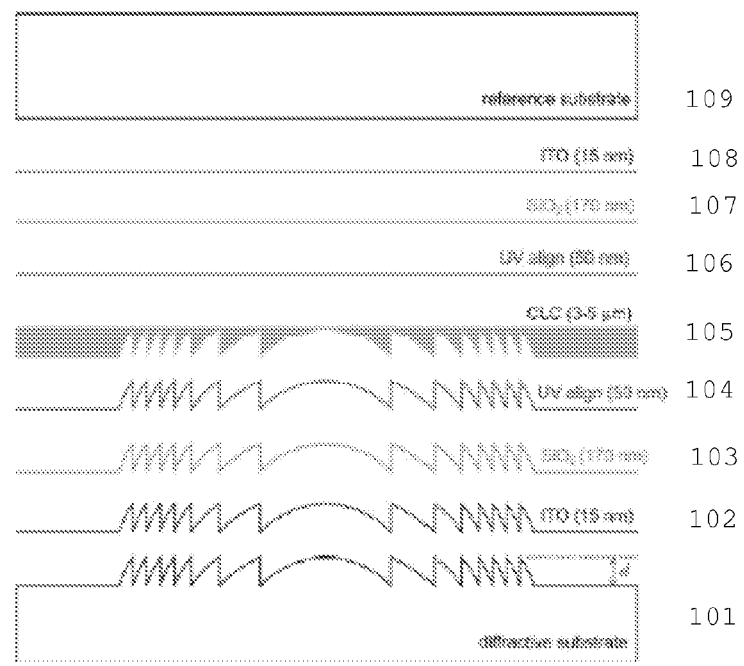

FIG. 44 illustrates the basic structure of an electo-active lens.

Figure 45:
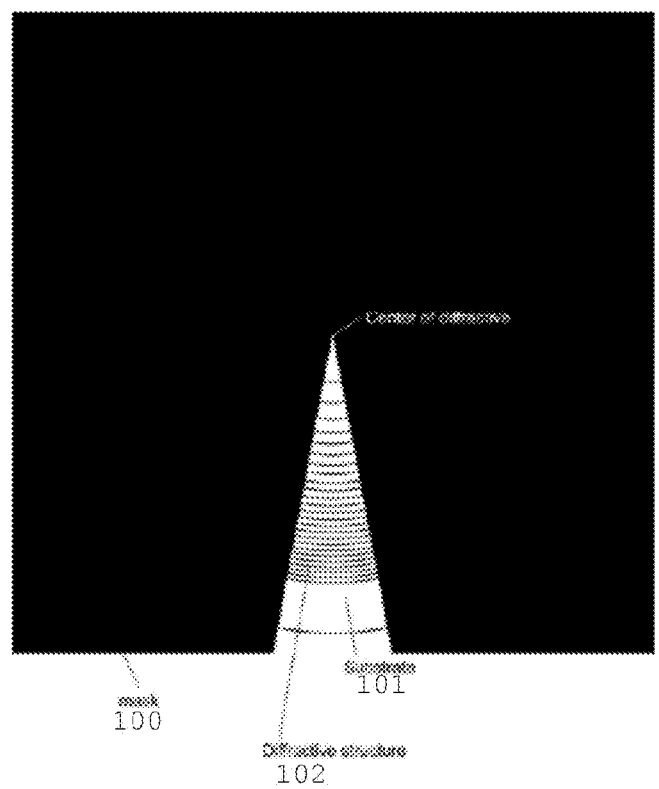

FIG. 45 illustrates a wedge-shaped mask.

Figure 46A:
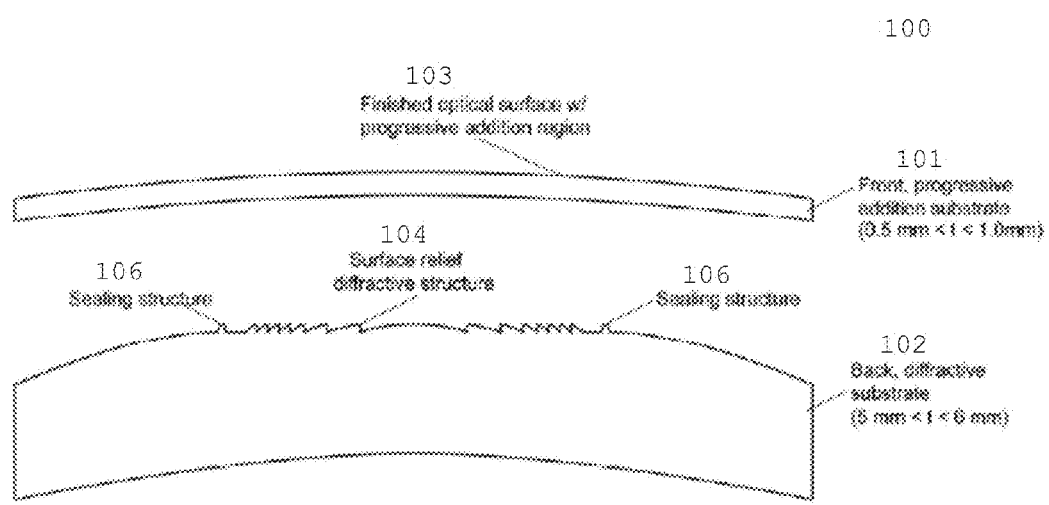
Figure 46B:
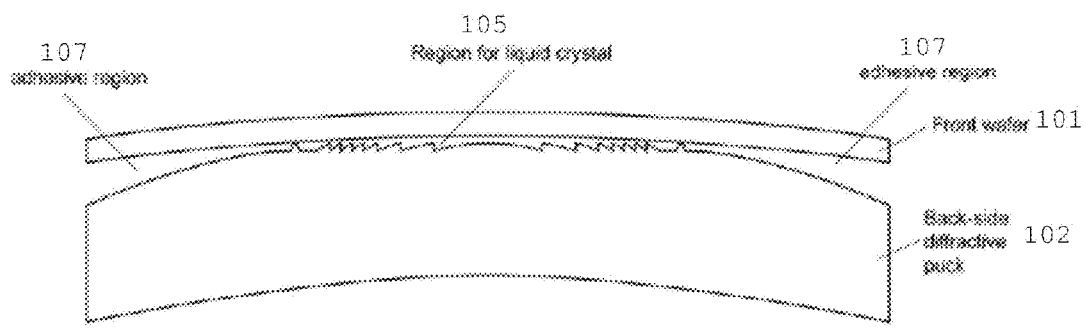

FIGS. 46A and 46B illustrate an example electo-active lens structure.

Figure 47A:
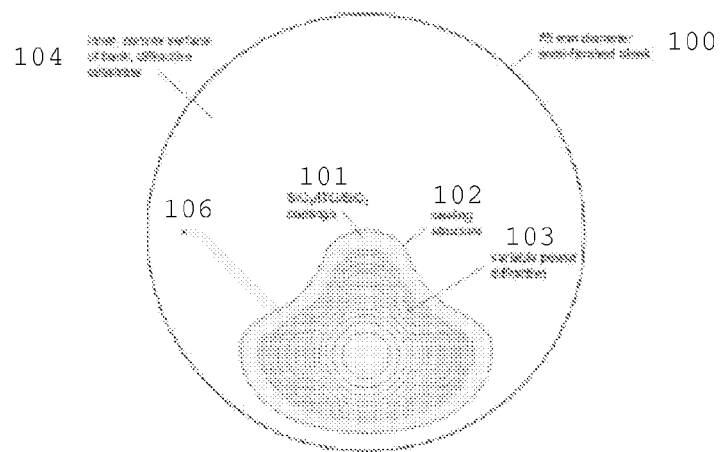
Figure 47B:
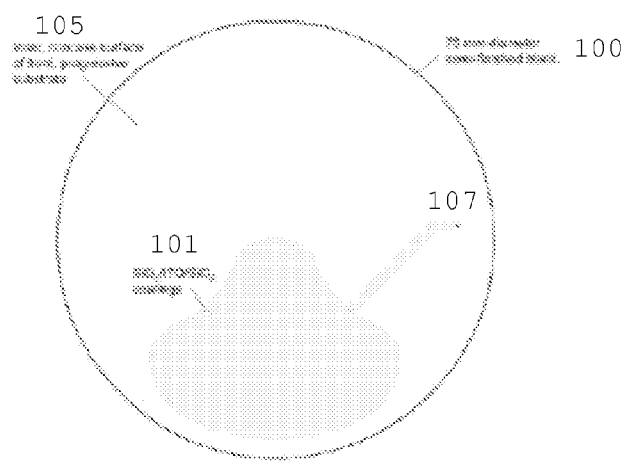

FIGS. 47A and 47B illustrate a semi-finished blank.

Figure 48A:
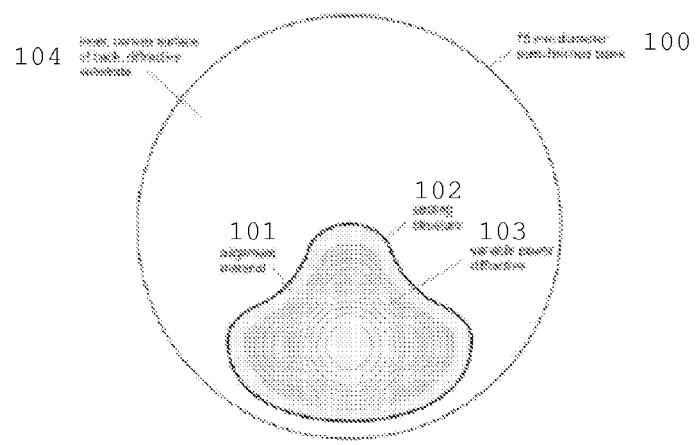
Figure 48B:
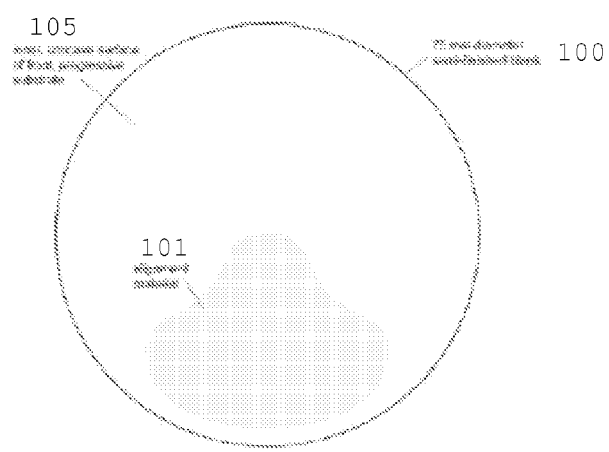

FIGS. 48A and 48B illustrate a semi-finished blank.

Figure 49:
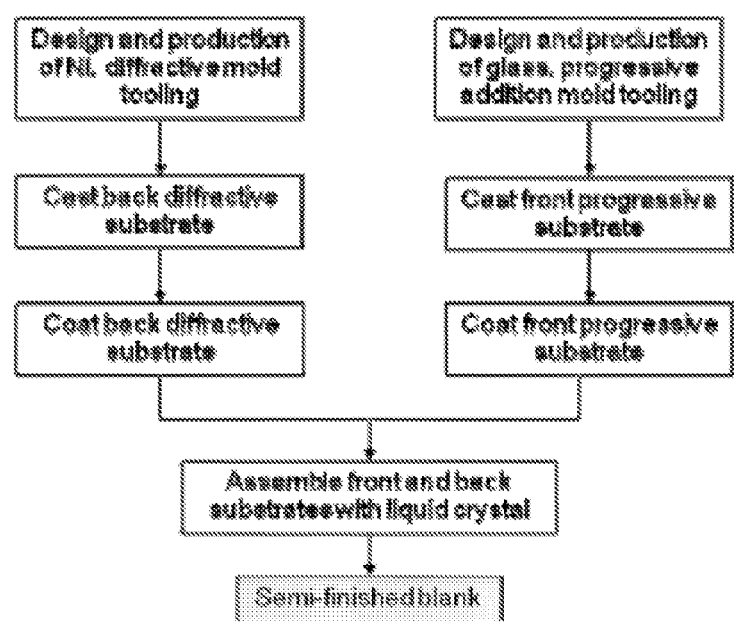

FIG. 49 shows a flow diagram that describes at least one process for producing an electro-active semi-finished blank.

Figure 50:
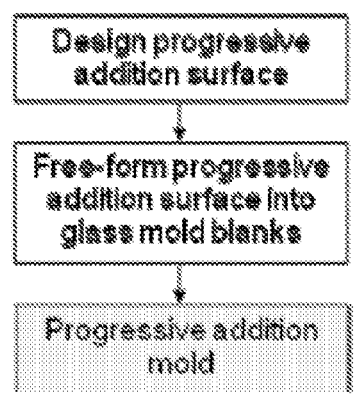

FIG. 50 shows a flow diagram that describes at least one process for producing glass progressive addition mold.

Figure 51:
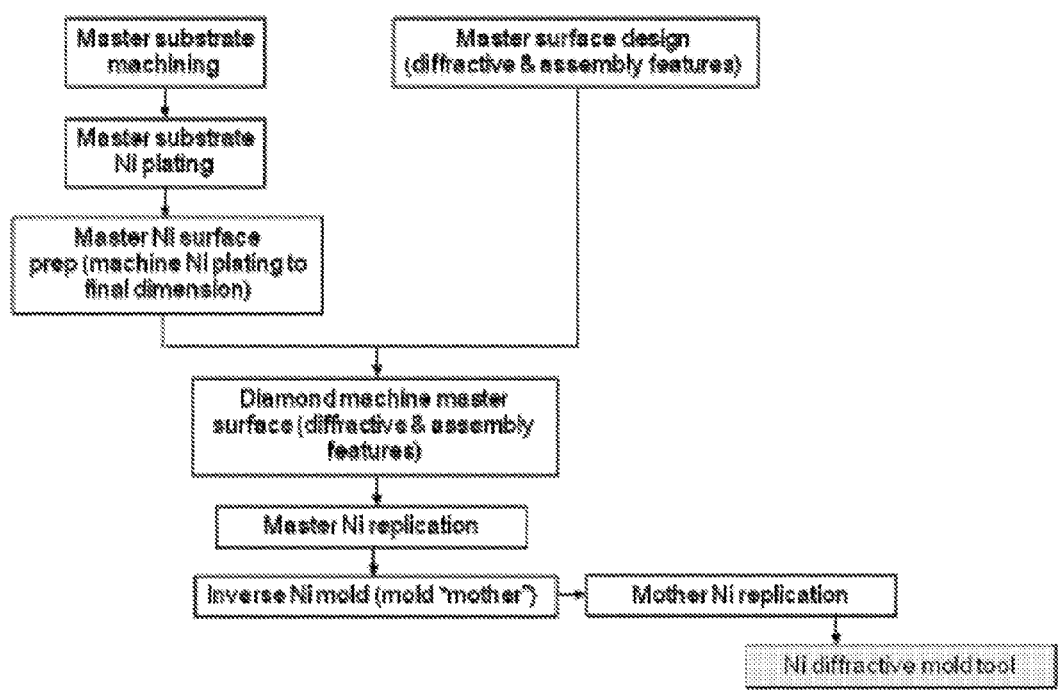

FIG. 51 shows a flow diagram that describes at least one process for producing a Ni diffractive mold.

Figure 52:
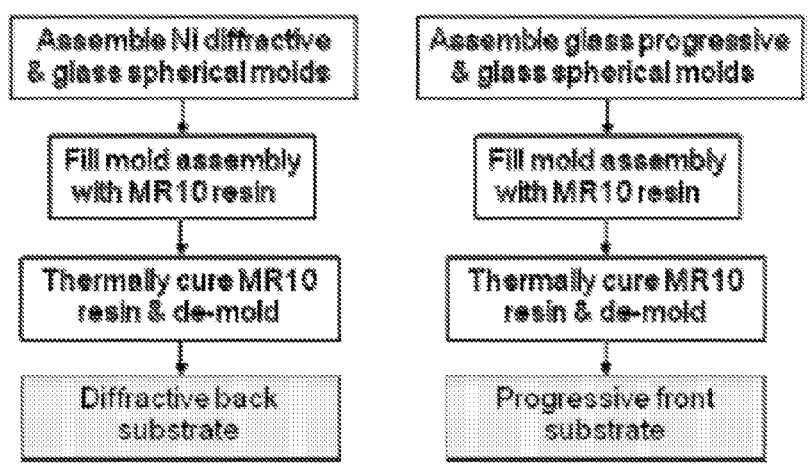

FIG. 52 shows a flow diagram that describes at least one process for doing front and back substrate casting.

Figure 53:
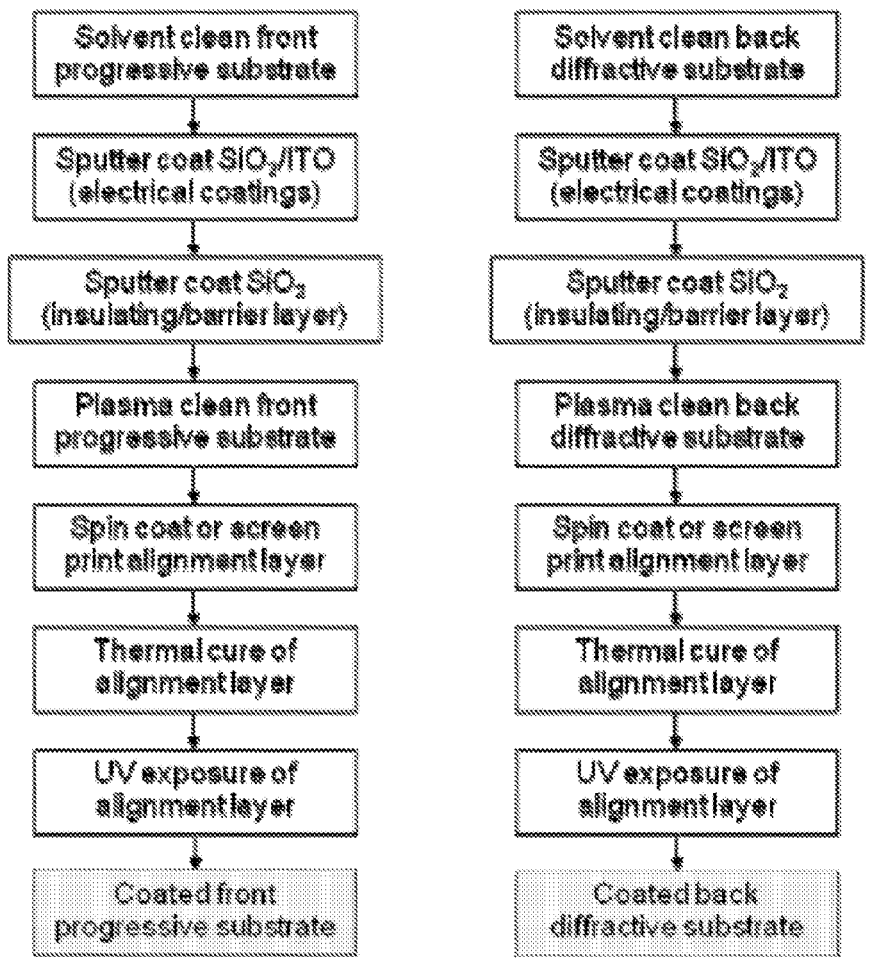

FIG. 53 shows a flow diagram that describes at least one process for doing front and back substrate coating.

Figure 54:
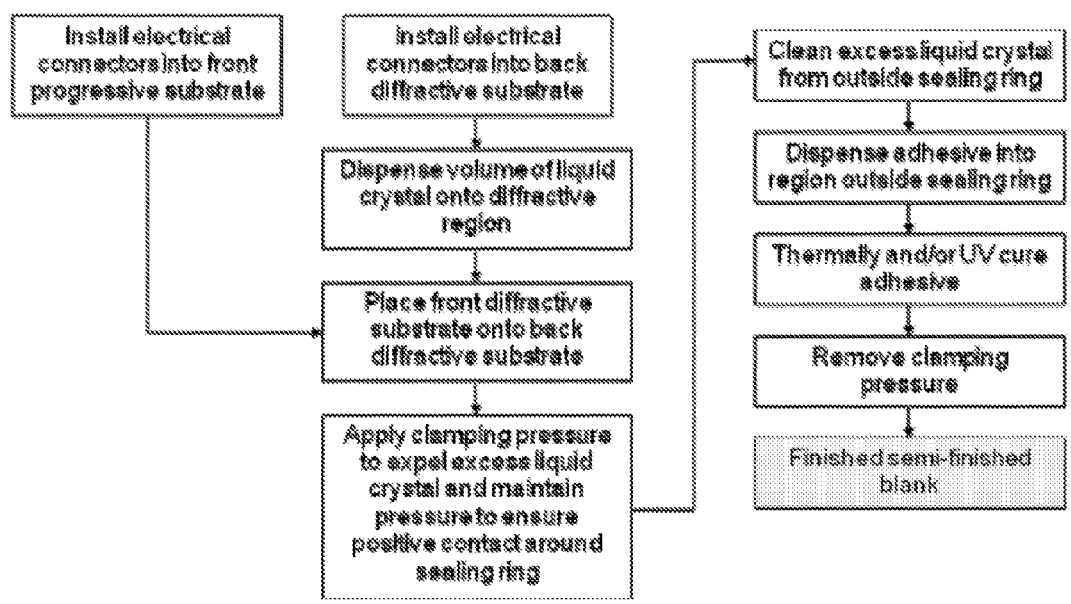

FIG. 54 shows a flow diagram that describes at least one process for assembling a semi- finished blank.

Figure 55:
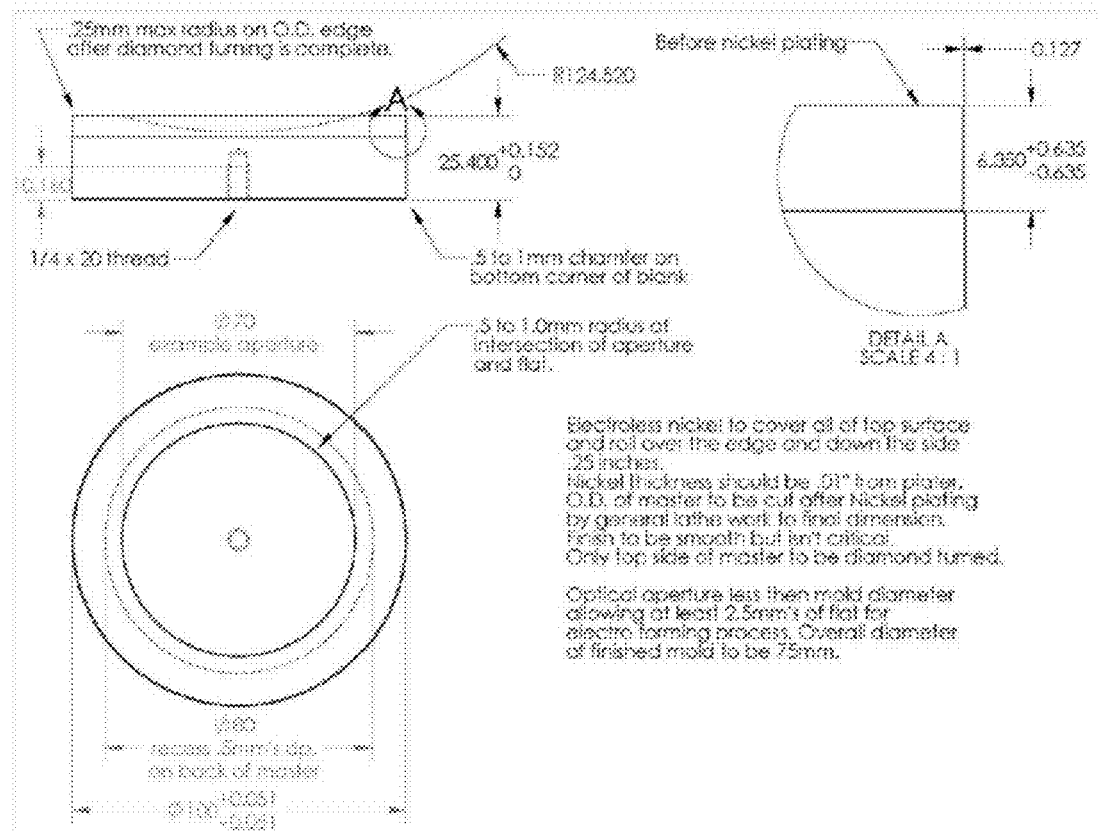

FIG. 55 shows a drawing of a concave surface master used for technology development.

Figure 56:
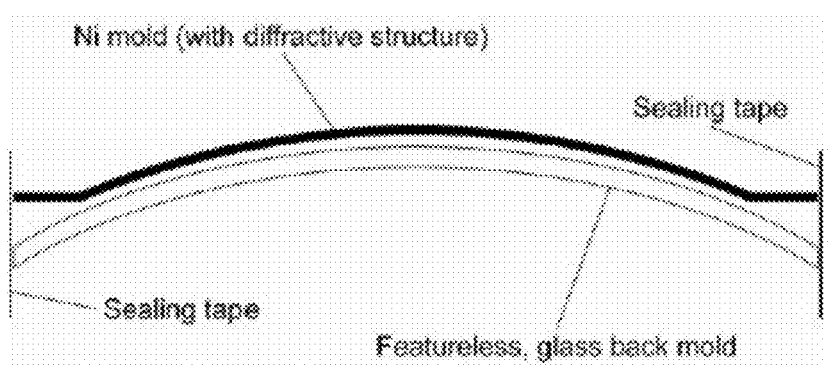

FIG. 56 shows a drawing of an example of a mold assembly.

Figure 57:
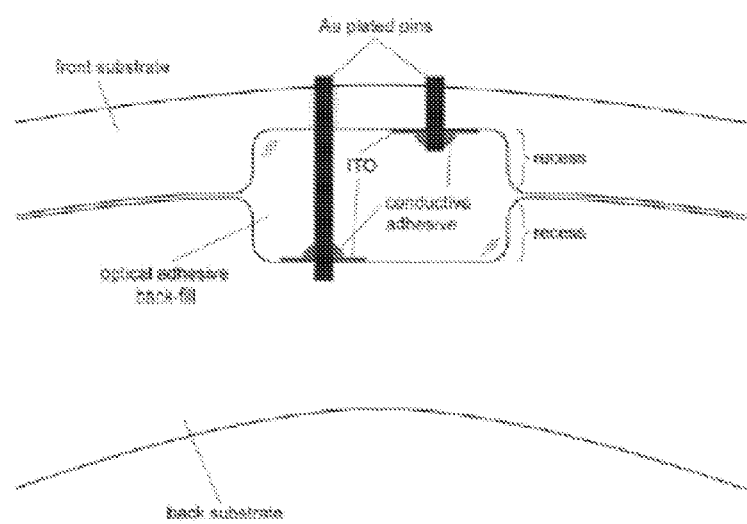

FIG. 57 shows an illustration of a lens external electrical connection.

Figure 58A:
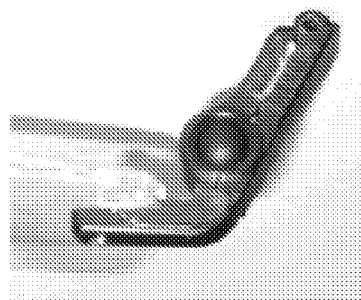
Figure 58B:
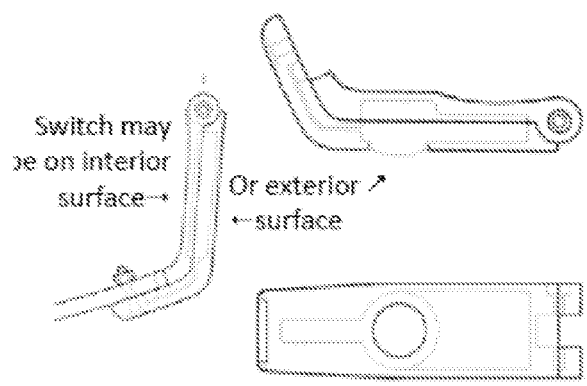

FIGS. 58A and 58B show illustrations of hinge units for a horizontal switch configuration and a vertical switch configuration, respectively.

Figure 59:
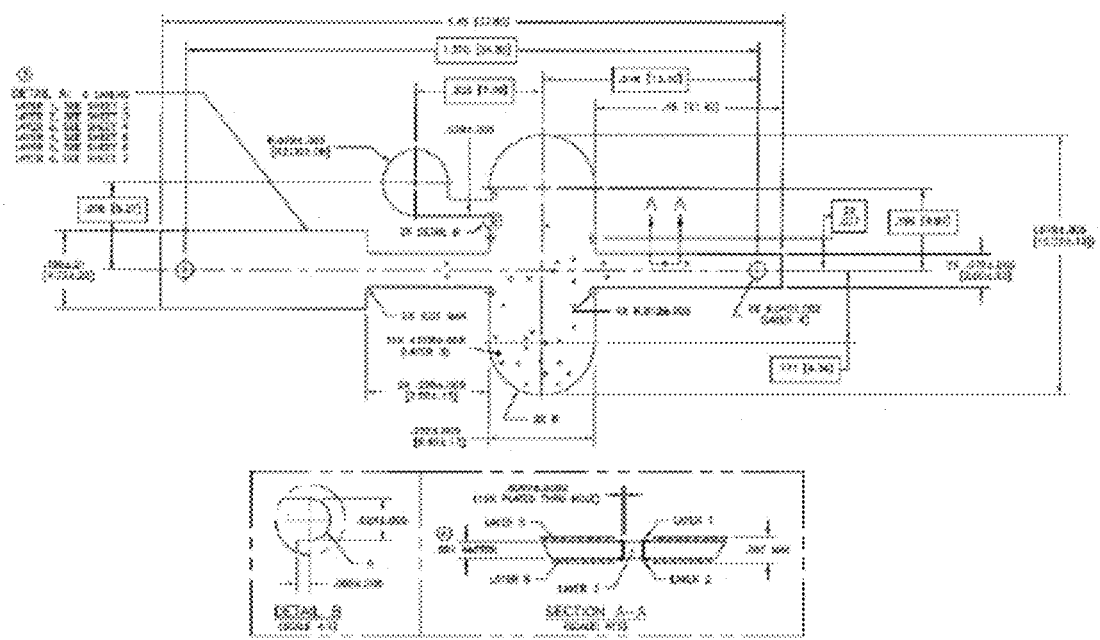

FIG. 59 shows an illustration of an aspect of a horizontal switch assembly.

Figure 60:
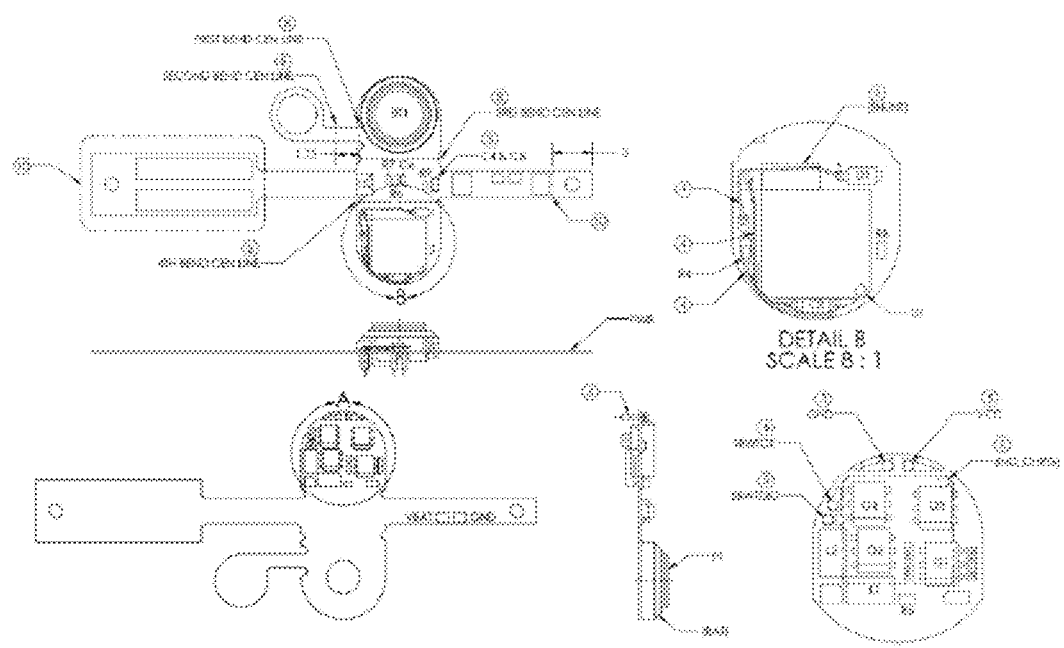

FIG. 60 shows an illustration of an aspect of a horizontal switch assembly.

Figure 61:
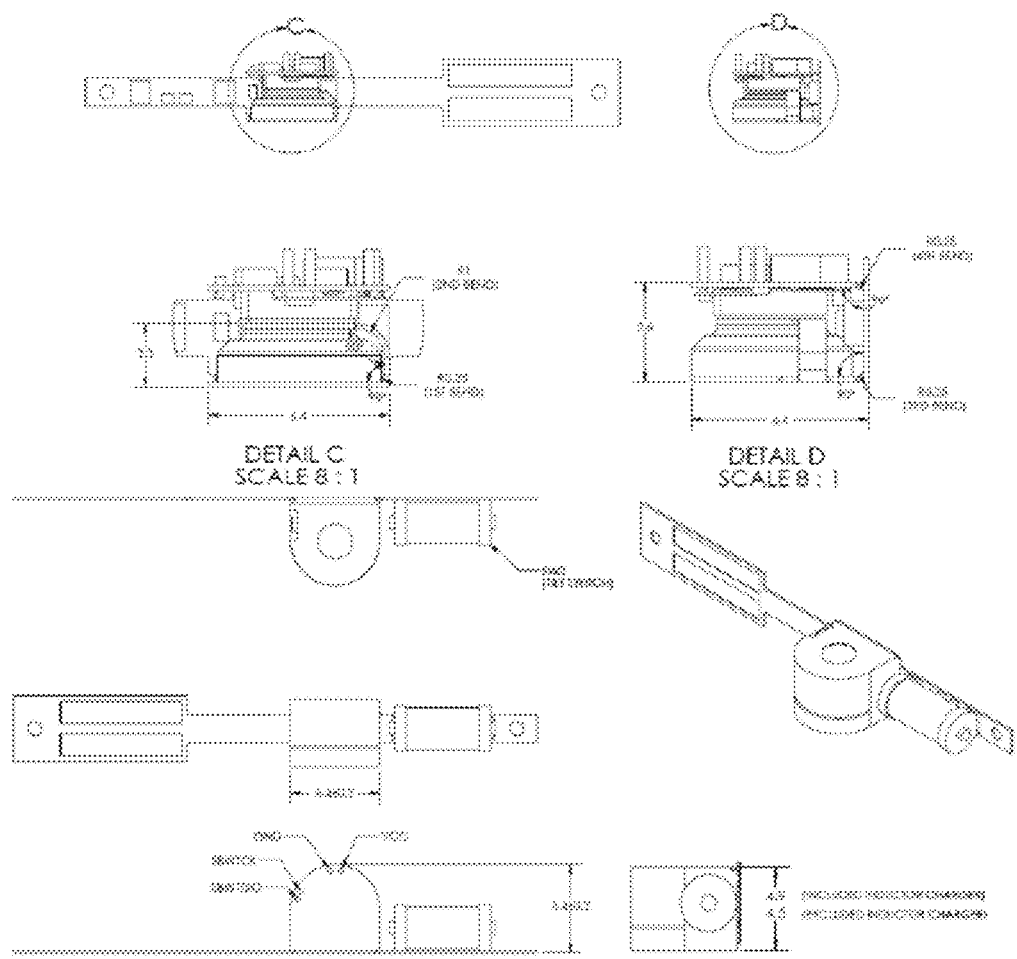

FIG. 61 shows an illustration of an aspect of a horizontal switch assembly.

Figure 62:
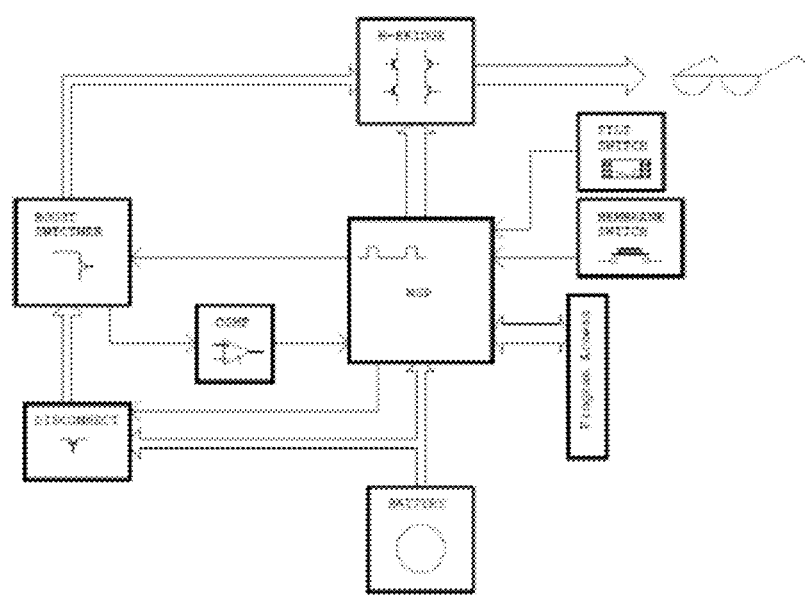

FIG. 62 shows an illustration of a circuit diagram for a hinge unit.

Figure 63:
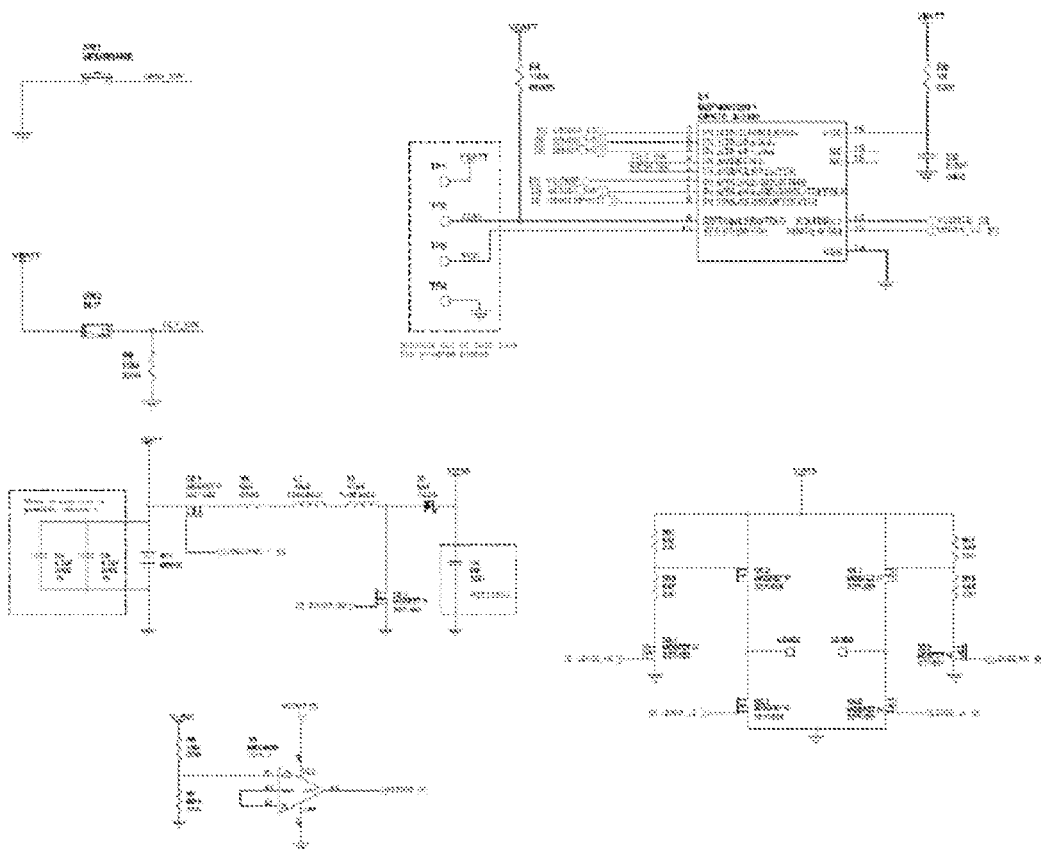

FIG. 63 shows an illustration of a circuit diagram for a hinge unit.

Figure 64:
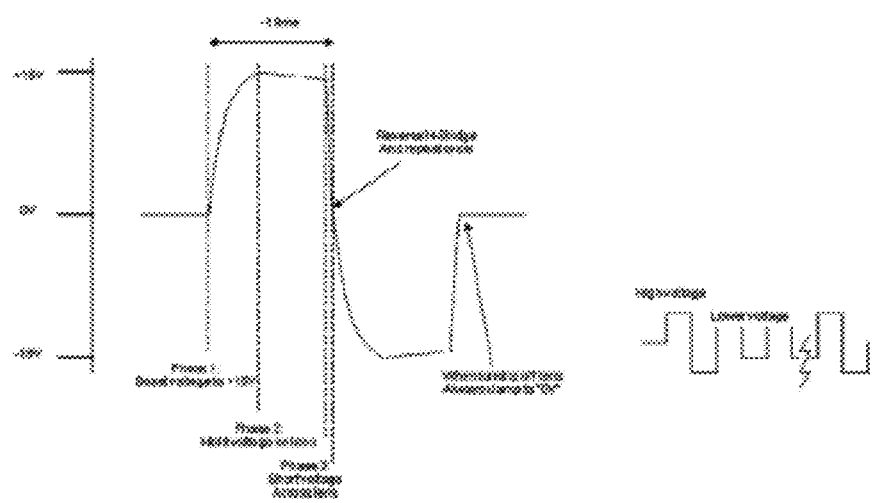

FIG. 64 shows an illustration of a driving waveform.

Figure 65:
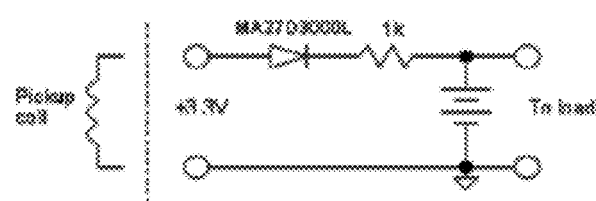

FIG. 65 shows a sample charge circuit.

Figure 66:
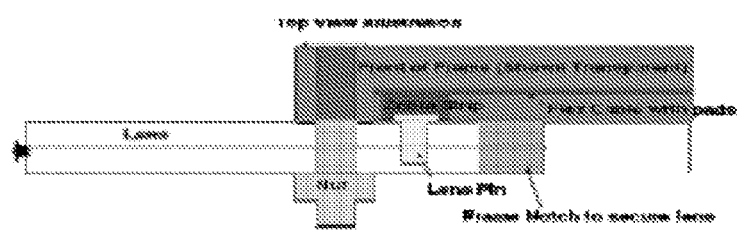

FIG. 66 shows an illustration of a connection of an electro-active lens outer electrode and the hinge electrode.

DETAILED DESCRIPTION OF THE INVENTION

Aspects of the present invention provide an electro-active lens and method for manufacturing the same that encapsulates liquid crystal using solid transparent optical material using an improved liquid crystal seal feature. The seal feature greatly reduces the visibility of the liquid crystal seal feature in an assembled electro-active lens. The seal feature is also structurally robust such that the electro-active lens can be processed to fit a spectacle frame without disturbing containment of the liquid crystal and without disrupting the electrical connectivity to the lens used to alter the refractive index of the liquid crystal, thereby ensuring fabrication of a commercially viable electro-active lens.

As used herein, an electro-active lens can be an unfinished lens blank, a semi-finished lens blank, a finished lens blank, an edged lens, a contact lens, an intra-ocular lens, a corneal inlay or a corneal onlay.

Electrically, an electro-active lens is a binary device that is either off (no optical power generated) or on (optical power generated). This mode of operation is said to be fail-safe as a power failure will cause the lens to revert to the wearer's distance vision. In the off state no voltage is applied and the lens has zero quiescent power draw. In the on state a zero-DC bias, bi-polar, square wave voltage waveform is applied to the lens. The frequency of the waveform is typically between 50 Hz and 150 Hz. The amplitude of the waveform is designed to be above a saturation point in the voltage-diffraction efficiency characteristic such that amplitude variations/fluctuations of the waveform cause no change in performance. A zero-DC bias, bi-polar square wave voltage waveform is used as application of a constant DC voltage will cause the cholesteric liquid crystal to undergo electrolysis, thus doing permanent damage to the material itself.

In the electro-active lens, application of a voltage acts to modulate the diffraction efficiency of the diffractive optic rather than the optical power. In a surface relief diffractive optic such as the ones used in PixelOptics' lenses, the focal length f (inverse of optical power) determines the radii ($r_n$) of the diffractive zones, which are fixed. The focal length and zone radii are related through the following expression: $r_n = (2n\lambda f)^{1/2}$ where X is the design wavelength (e.g., 550 nm, the peak of the human photopic response) and n is an integer counting index (n = 1, 2, 3,...).

In the off-state the average index of refraction of the cholesteric liquid crystal nearly matches the refractive index of the MR10 diffractive optic such that the diffraction efficiency into the 0th diffracted order is high and the diffraction efficiency into the—1st diffracted order is low (i.e. there is no focusing). Upon application of sufficient voltage the refractive index of the cholesteric liquid crystal is switched to a lower value whereby a condition for low diffraction efficiency into the 0th diffracted order and high diffraction efficiency into the—1st diffracted order is created. In this situation, light is brought to focus at the design focal length.

A plot of diffraction efficiency of the $1^{st}$ diffractive order at 550 nm vs. applied voltage is shown in FIG. 32 for an electro-active lens. Diffraction efficiency increases with applied voltage (larger fraction of incident light brought to focus), but saturates at a maximum value once most of the cholesteric liquid crystal molecules have aligned with the electric field. As mentioned above, it is only necessary to apply a voltage slightly larger than that needed to reach the efficiency saturation point. In the case of the data shown below, an applied voltage of $22 \pm 1\ V_{p\text{-}p}$ at 100 Hz would be sufficient to drive such a lens. Below $10\ V_{p\text{-}p}$ the hazy nature of the cholesteric liquid crystal prohibits measurements of diffraction efficiency. However, this data does not represent the state of the art and lenses with lower operating voltages have been. Lenses with as little as $10\ V_{p\text{-}p}$ have been demonstrated.

For a properly operating electro-active lens there is no change in transmission with applied voltage.

In the some embodiments of the invention, a cholesteric liquid crystal is formed by adding the chiral dopant ZLI-4571 (Merch Chemicals) to the nematic liquid crystal BL093 (Merck Chemicals). FIG. 33 shows a plot of cholesteric liquid crystal twist pitch vs. the weight-percent concentration of ZLI-4571 in BL093. From these various mixtures electro-active lenses were made and the diffraction efficiency of the 0th order in the off-state was measured at 550 nm. The results are shown in FIG. 34.

As the chiral dopant loading is increased a decrease in twist pitch is observed as well as a corresponding increase in the off-state, 0th order diffraction efficiency. However, the increase in diffraction efficiency begins to saturate for twist-pitch values below approximately 0.6 μm. Experimental results have shown this to be the point of diminishing returns where further reduction in the twist pitch results in no improvement in diffraction efficiency but causes an undesirable increase in the required operating voltage. In this case, the operating voltage increases quadratically with chiral dopant concentration. Experiments have shown that a chiral dopant concentration of 2 weight percent, yielding a twist pitch of approximately 0.7 μm gives the best compromise between off-state diffraction efficiency and operating voltage.

Various lens designs are possible. FIGS. 35-37 describe an embodiment having a circular diffractive optic. FIGS. 38 and 39 describe an embodiment having an elliptical diffractive optic. FIGS. 40 and 41 describe an embodiment having a flat-top diffractive optic. FIGS. 42 and 43 describe an embodiment having a diffractive optic with optical power progression.

In some embodiments, a variation of the diffractive optic with the optical power progression is used as it may help to reduce the effects of chromatic aberration, ghosting and scatter. In terms of surface roughness of the diffractive structures, in some embodiments, an average roughness of 8 nm or less is used.

FIG. 44 shows a basic structure of an embodiment of an electro-active lens 100. The lend 100 has a diffractive substrate 101, an ITO layer 102 of 15 nm thickness, an SiO$_2$ layer 103 of 170 nm thickness, a UV alignment layer 104 of 50 nm thickness, a CLC layer 105 of 3-5 μm thickness, a UV alignment layer 106 of 50 nm thickness, an SiO$_2$ layer 107 of 170 nm thickness, an ITO layer 108 of 15 nm thickness and a reference substrate 109.

In some embodiments, diffractive and reference substrates are coated with thin films (ITO, SiO$_2$, UV alignment materials) and then the two substrates are brought into contact to constrain the layer of cholesteric liquid crystal. The depth of the diffractive structures, d, is such that when in the on-state, the optical phase difference generated across the diffractive structures due to the difference in refractive index between the cholesteric liquid crystal and the diffractive substrate is $2\pi$ (1 wave of retardation). Mathematically this is expressed as:

$$d(n_{diffractive} - n_{CLC}) = \lambda$$

where d is the depth of the diffractive structures, $n_{diffractive}$ is the refractive index of the material from which the diffractive structure are made (1.67 for MR10), $n_{CLC}$ is the refractive index of the cholesteric liquid crystal in the on-state (1.53 for BL093) and λ is the design wavelength (550 nm for our lenses). When this condition is satisfied the diffractive optic will have nearly 100% diffraction efficiency in the—1st diffracted order (design focal length).

In some embodiments, the thickness of the cholesteric liquid crystal alignment material has a nominal value of 50 nm. In some embodiments, the alignment material is spin-coated from solution as it is received from the vendor (Rolic Technologies, Ltd.).

The thickness of the ITO and SiO$_2$ layers may be determined using thin-film coating design software as a system taking into account the refractive index of the substrate material (MR10) and the refractive index of the cholesteric liquid crystal. Another consideration is that as the SiO$_2$ layer may act to provide electrical insulating between the two substrates and as a vapor barrier against MR10 out-gassing, its thickness is required to be >100 nm.

In some embodiments, the diffractive optic contains rotationally symmetric diffractive structures, rotationally symmetric alignment on both substrates of the electro-active device will be required. Rotational alignment is achieved through the use of alignment materials which align liquid crystal molecules when exposed to linearly polarized UV radiation. The process of achieving rotational alignment requires exposing diffractive structures coated with the alignment material to linearly polarized UV radiation through a wedge-shaped mask (see FIG. 45) while the diffractive rotates about its geometric center. FIG. 45 shows a wedge-shaped mask 100 showing a substrate 101 and a diffractive structure 102. The geometric center of the diffractive is coincident with the apex of the wedge.

Figure 1:
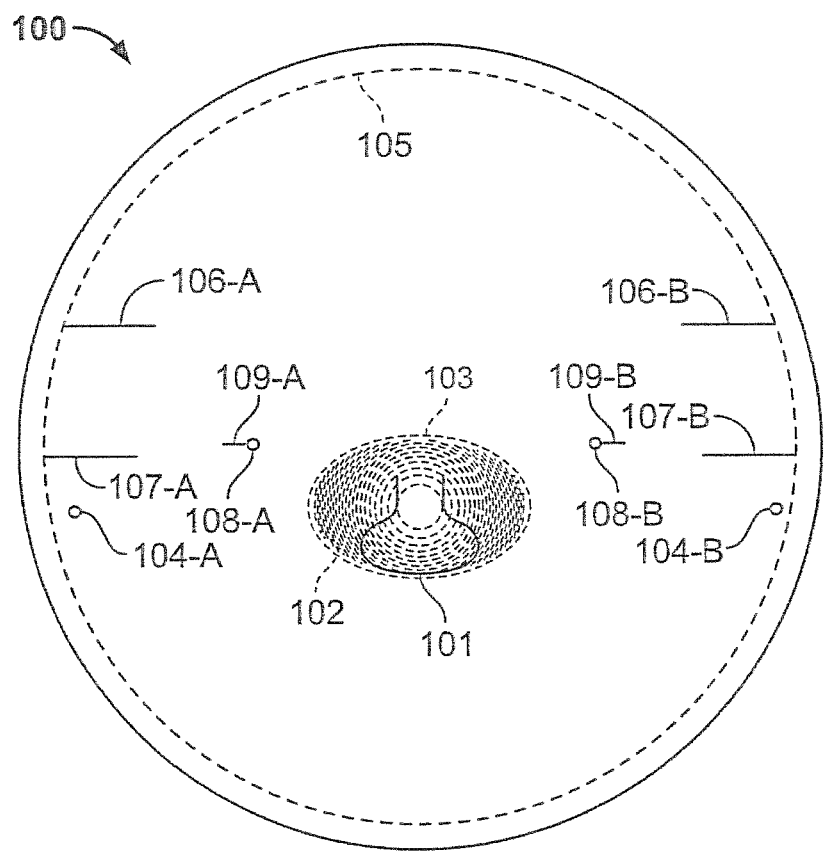
FIG. 1 illustrates an electro-active semi-finished lens blank (EASFLB) in accordance with an aspect of the present invention

FIG. 1 illustrates an electro-active semi-finished lens blank (EASFLB) 100 in accordance with an aspect of the present invention. The EASFLB 100 can comprise a first substrate (e.g., a top substrate) and a second substrate (e.g., a bottom substrate). FIG. 1 depicts a top view of the EASFLB 100. Accordingly, FIG. 1 shows a view of the top substrate of the EASFLB 100.

As depicted in FIG. 1, the EASFLB 100 can comprise a progressive addition optical power region 101 in optical communication with a dynamic, electro-active, diffractive optical power region 102. The dynamic, electro-active, diffractive optical power region 102 can comprises an electro-active material such as, for example, a cholesteric liquid crystalline (CLC) material. The electro-active material can be encapsulated within a volume by the two bounding substrates (i.e., the top and bottom substrates of the EASFLB 100) and an electro-active material seal feature 103.

The dynamic, electro-active, diffractive optical power region 102 is shown as having an oval shape but is not so limited. The dynamic, electro-active, diffractive optical power region 102 can be of any shape (e.g., round, flat-topped, semi-circle, etc.) and can be blended as described in U.S. patent application Ser. No. 12/166,526, filed Jul. 2, 2008, which is hereby incorporated by reference in its entirety.

FIG. 1 shows the progressive addition optical power region 101 overlapping or positioned within a boundary defined by the dynamic, electro-active, diffractive optical power region 102 for purposes of illustration only. The positioning of the progressive addition optical power region 101, however, is not so limited. Overall, the progressive addition optical power region 101 and the dynamic, electro-active, diffractive optical power region 102 can be positioned in any orientation with respect to one another. To that end, any or all portions of the progressive addition optical power region 101 can overlap any or all portions of the dynamic, electro-active, diffractive optical power region 102. This enables the progressive addition optical power region 101 to extend beyond the boundary defined by the dynamic, electro-active, diffractive optical power region 102 while still overlapping a substantial portion of the dynamic, electro-active, diffractive optical power region 102.

An adhesive can adhere the two substrates of the EASFLB 100 together and can be applied via one or more fill ports 104. The adhesive can be contained in a volume determined by the bounding substrates of the EASFLB 100 (i.e., the top and bottom substrates), the electro-active material seal feature 103 and an adhesive seal feature 105. The refractive index of the adhesive can be substantially equal to the refractive indices of one or more of the bounding substrates of the EASFLB 100. The adhesive seal feature 105 can be located towards the periphery of the EASFLB 100. The electro-active material seal feature 103 can be considered to be an electro-active material seal structure 103. Similarly, the adhesive seal feature 105 can be considered to be an adhesive seal structure 105.

Electrical contacts 106 and 107 can allow a voltage to be applied to the dynamic, electro-active, diffractive optical power region 102 so as to allow activation of the dynamic, electro-active, diffractive optical power region 102. Electrical contact can be made between the electrical contacts 106 and 107 and the dynamic, electro-active, diffractive optical power region 102 via transparent conductors. The electrical contacts 106 and 107 can be applied to the inner surfaces of the two bounding substrates and can therefore be embedded within the EASFLB 100. As shown in FIG. 1, the electrical contacts 106 and 107 are positioned within a boundary defined by the adhesive seal feature 105 but are not so limited.

Semi-visible fiducial marks 108 and 109 can be included on and/or in the EASFLB 100 to act as guiding or alignment marks during manufacture of the EASFLB 100 (i.e., to aid in manufacturing the EASFLB 100). The semi-visible fiducial marks 108 and 109 can be located on the anterior surfaces of the bounding substrates for example.

Figure 2:
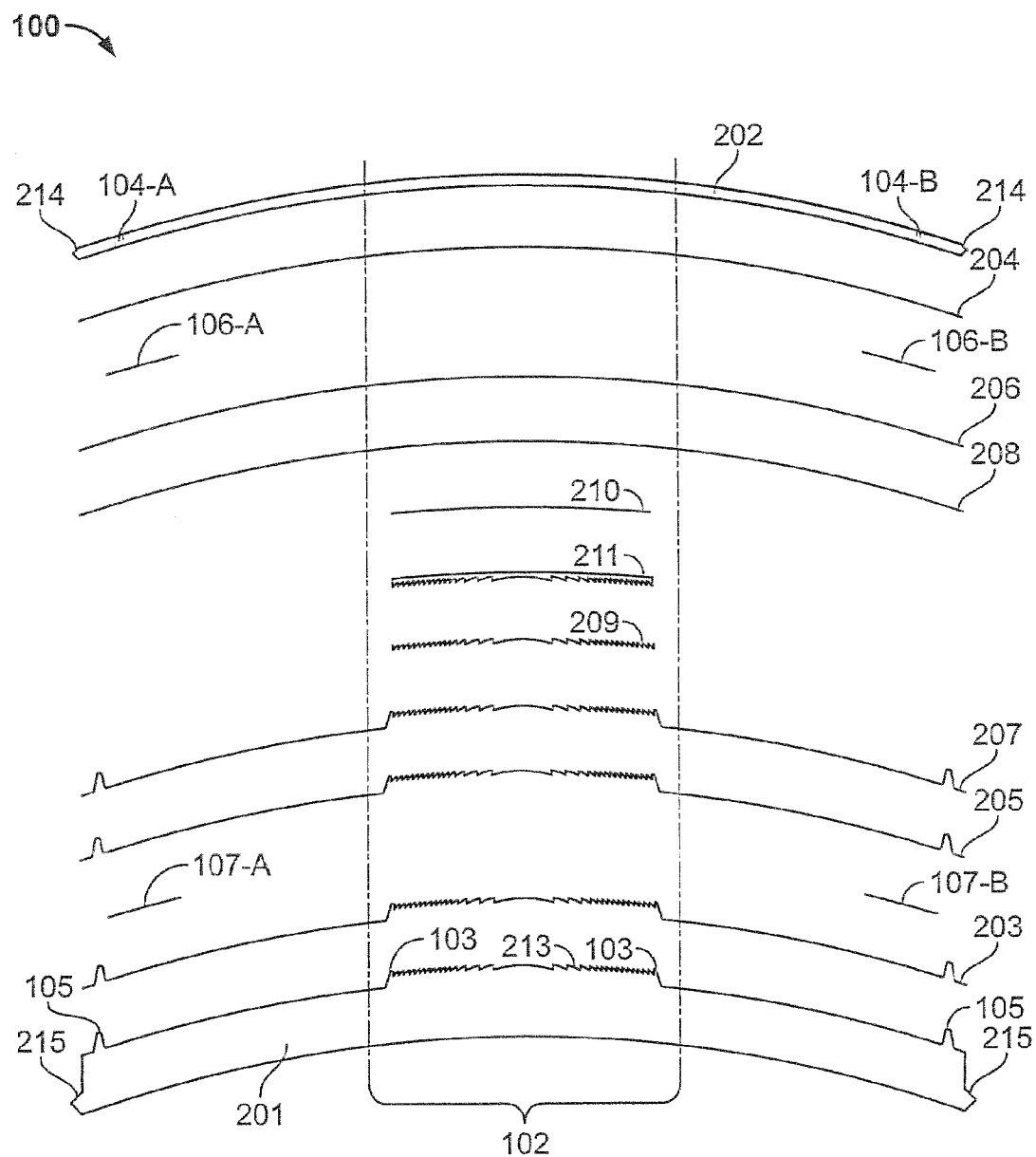
FIG. 2 illustrates an exploded cross-sectional view of the EASFLB depicted in FIG. 1.

An exploded cross-sectional view of the EASFLB 100 (not to scale) is shown in FIG. 2. The EASFLB 100 can be constructed from the aforementioned bounding substrates—in particular, a back substrate 201 and a front substrate 202. The back substrate 201 can be thicker than the front substrate 202. The back substrate 201 can comprise any lens material. As an example, the back substrate 201 can comprise a material having a refractive index of 1.67 such as Mitsui MR-10. The front substrate 202 can also comprise any lens material. As an example, the front substrate 202 can comprise the same lens material as the back substrate 201 (e.g., the front substrate 202 can comprise MR-10 material). Alternatively, the front substrate 202 can comprise a different lens material (e.g., the back substrate 201 can comprise Trivex® having a refractive index of 1.53. As will be appreciated by one skilled in the relevant arts, the features and characteristics of the front substrate 202 and the back substrate 201 can be interchanged in accordance with an aspect of the present invention.

The front substrate 202 and the back substrate 201 can have any desired thickness. As an example, the thickness of the back substrate 201 can be between 5.0 mm and 10.0 mm while the thickness of the front substrate 202 can be between 0.5 mm and 2.0 mm. The anterior, convex surface of the back substrate 201 can contain the electro-active material seal feature 103, the adhesive seal feature 105, and a surface relief diffractive structure 213.

The surface relief diffractive structure 213, when in physical and optical communication with an electro-active material, can be designed to generate a phase retardation of m2π, where m is an integer. In accordance with an aspect of the present invention, m can be equal to one (1). For large values of m (e.g., m>5), chromatic aberration may be reduced and the surface relief diffractive structure 213 may be characterized as a multi-order surface relief diffractive structure. Accordingly, the surface relief diffractive structure 213 can be implemented as a multi-order surface relief diffractive structure as described in U.S. patent application Ser. No. 12/118,226, filed on May 9, 2008, which is hereby incorporated by reference in its entirety.

The anterior, convex surface of back substrate 201 can also comprise additional semi-visible fiducial marks 109 (shown in FIG. 1) for the purpose of aiding the manufacturing process. The posterior, concave surface of the back substrate 201 can be substantially featureless. After assembly of the EASFLB 100, the posterior, concave surface of the back substrate 201 can be further processed to form a final ophthalmic lens for a patient. For example, the posterior, concave surface of the back substrate 201 can be edged, cut and/or free-formed in accordance with a patient's vision prescription. In particular, a progressive addition optical power region can be free-formed onto the posterior, concave surface of the back substrate 201. This can obviate generation (e.g., either by mold or by free-forming) of the progressive addition optical power region 101 on the front substrate 202. Alternatively, a progressive addition optical power region can be formed on both the front substrate 202 and the back substrate 201 (e.g., either by mold or by free-forming). This can allow the progressive addition optical power region 101 to be of a lower power design, thereby lowering the total amount of unwanted astigmatism introduced by the progressive addition optical power regions of the EASFLB 100.

The anterior, convex surface of the front substrate 202 can comprise the progressive optical power region 101 and the semi-visible fiducial marks 108 (both shown in FIG. 1) while the concave surface of the front substrate 202 can be substantially featureless. The front substrate 202 can also comprise the adhesive fill ports 104. The adhesive fill ports 104 can be through-holes that are between 1.0 mm and 2.0 mm in diameter. The adhesive fill ports 104 can be drilled or machined into the front substrate 202 or can be formed by other suitable means (e.g., by mold). Alternatively or in addition thereto, the back substrate 201 can comprise the adhesive fill ports 104.

The edge of the back substrate 201 can contain a bevel 215 to aid in the handling of the back substrate 201 during manufacture and assembly of the EASFLB 100. The edge of the front substrate 202 can also contain a bevel 214 to aid in the handling of the front substrate 202 during manufacture and assembly of the EASFLB 100.

Additional layers and structures can be applied to the convex surface of the back substrate 201 and to the concave surface of the front substrate 202 to allow operation of the dynamic, electro-active, diffractive optical power region 102. First layers 203 and 204 can any transparent material that is electrically insulating. As an example, the layers 203 and 204 can comprise $SiO_x$ (e.g., $SiO_2$ or $SiO_3$). Each of the layers 203 and 204 can have a thickness of 20 nm for example.

On top of each of the layers 203 and 204, a conductive material can be patterned into fine wires to form the electrical contacts 106 and 107. On top of the electrical contacts 106 and 107, transparent conductor layers 205 and 206 can be deposited. Each of the transparent conductor layers 205 and 206 can comprise a transparent conductive material such as Indium Tin Oxide (ITO) or Zinc Oxide (ZnO). The transparent conductor layers 205 and 206 can have a thickness of 20 nm for example. The transparent conductor layers 205 and 206 can be in electrical contact with the corresponding electrical contacts 106 and 107. The electrical contacts 106 and 107 can provide electrical contact to the dynamic, electro-active, diffractive optical power region 102 through the edge of the EASFLB 100.

One or more of the transparent conductor layers 106 and 107 can be deposited or formed to be patterned electrode structures (or pixelated structures) as described in U.S. patent application Ser. No. 12/246,543, filed on Oct. 7, 2008 and U.S. patent application Ser. No. 12/135,587, filed on Jun. 9, 2008, both of which are hereby incorporated by reference in their entirety. Such a patterned electrode structure can be used to form a desired diffractive pattern using a volume of electro-active material (e.g., electro-active material 211 contained in a space that need not rest on top of a diffractive relief structure).

On top of the transparent conductor layers 205 and 206, insulating layers 207 and 208 can be deposited. The insulating layers 207 and 208 can comprise any transparent material that is electrically insulating. As an example, the layers 207 and 208 can comprise $SiO_x$ (e.g., similar to the first layers 203 and 204). The insulating layers 207 and 208 can comprise 170 nm of $SiO_x$ for example. The final layers deposited can comprise liquid crystal alignment material layers 209 and 210 which act to align a volume of electro-active material 211 encapsulated within the EASFLB 100. The arrangement and thicknesses of the layers 203-210 maximizes luminous transmittance through the EASFLB 100 while minimizing electrical power consumption of the dynamic, electro-active, diffractive optical power region 102.

The surface relief diffractive structure 213, the electro-active material seal feature 103, and the layers and elements 203-211 can be considered to be an electro-active element of the EASFLB 100 (e.g., the dynamic, electro-active, diffractive optical power region 102). Any of the layers and elements 203-211 can be deposited across an entire area of the EASFLB 100 (e.g., the insulating layers 203 and 204) or can be deposited over less than an entire area of the EASFLB 100 or a portion of the entire area of the EASFLB 100 (e.g., the alignment layers 209 and 210). Further, the surface relief diffractive structure 213 and the electro-active material seal feature 103 can occupy any portion of the anterior, convex surface of the back substrate 201. Additionally, as will be appreciated by one skilled in the relevant arts, the surface relief diffractive structure (and associated electro-active material seal feature and adhesive seal feature for example) of the EASFLB 100 can be alternatively positioned on the front substrate 202.

As shown in FIG. 2, the dynamic, electro-active, diffractive optical power region 102 is shown as comprising multiple layers and elements of the EASFLB 100. Further, the dynamic, electro-active, diffractive optical power region 102 is shown as occupying a portion of an entire horizontal width of the EASFLB 100. As described further below, the EASFLB 100 can be further processed to form a finished lens blank or an edged lens (ready to be mounted into a spectacle frame). Overall, the arrangement of the layers of the EASFLB 100 can be varied as will be understood by one skilled in the relevant arts and as described in U.S. patent application Ser. No. 12/042,643, filed on Mar. 3, 2008, which is hereby incorporated by reference in its entirety.

Additionally, as shown in FIGS. 1 and 2, the electro-active material seal structure 103 can be positioned around the surface relief diffractive structure 213. That is, the electro-active material seal structure 103 can surround or enclose the surface relief diffractive structure 213. Further, the electro-active material seal structure 103 can be formed to sit higher than the surface relief diffractive structure 213. The electro-active material seal structure 103 can be formed at the same time as forming the back substrate 201 or can be added to the back substrate 201 after formation of the surface relief diffractive structure 213.

As indicated in FIGS. 1 and 2, the electro-active material seal structure 103 can contain or encapsulate the electro-active material 211 (e.g., over the surface relief diffractive structure 213). Further, the electro-active material seal structure 103 can ensure the electro-active material 211 remains isolated from any adhesive positioned between the electro-active material seal structure 103 and the adhesive seal structure 105. Lastly, the electro-active material seal structure 103 can be positioned so that portions of the EASFLB 100 can be subsequently removed (e.g., portions between the electro-active material seal structure 103 and the periphery of the EASFLB 100) without disturbing containment of the electro-active material 211 (e.g., leakage of the electro-active material 211).

The adhesive structure 105 can be positioned towards the edge of the back substrate 201. The adhesive seal structure 105 can be formed at the same time as forming the back substrate 201 or can be added to the back substrate 201 at a later time. The electro-active material seal structure 103 and the adhesive seal structure 105 can comprise the same material as the back substrate 201 or can comprise a different material.

Figure 3:
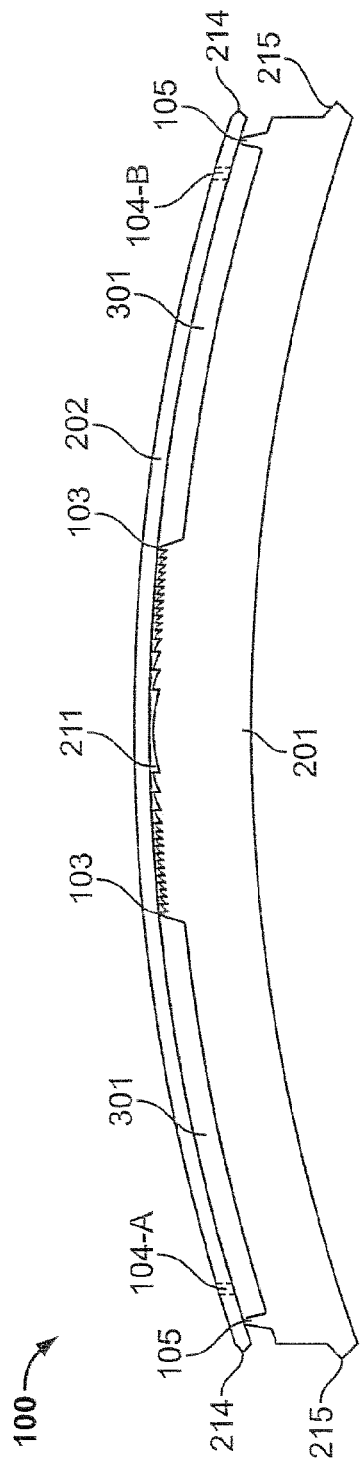
FIG. 3 illustrates a side view of the EASFLB depicted in FIG. 1.

To form the EASFLB 100, the two substrates 201 and 202 can be brought into physical contact as shown in FIG. 3. The convex surface of the back substrate 201 can come into contact with the concave surface of the front substrate 202 only along the electro-active material seal feature 103 and the adhesive seal feature 105, thus encapsulating the volume of electro-active material 211 and forming an adhesive cavity 301. Uncured liquid adhesive can then be introduced into the adhesive cavity 301 through one or more fill ports 104. The liquid adhesive can then be cured to a solid state, adhering the two substrates together and permanently encapsulating the volume of electro-active material 211 within the EASFLB 100.

As shown in FIG. 3, the electro-active material seal structure 103 can ensure the electro-active material 211 remains contained so that it does not leak into the adhesive cavity 301. That is, the electro-active material seal structure 103 can isolate or separate the electro-active material 211 from the adhesive cavity 301 (and any adhesive subsequently placed in the adhesive cavity 301).

Figure 4:
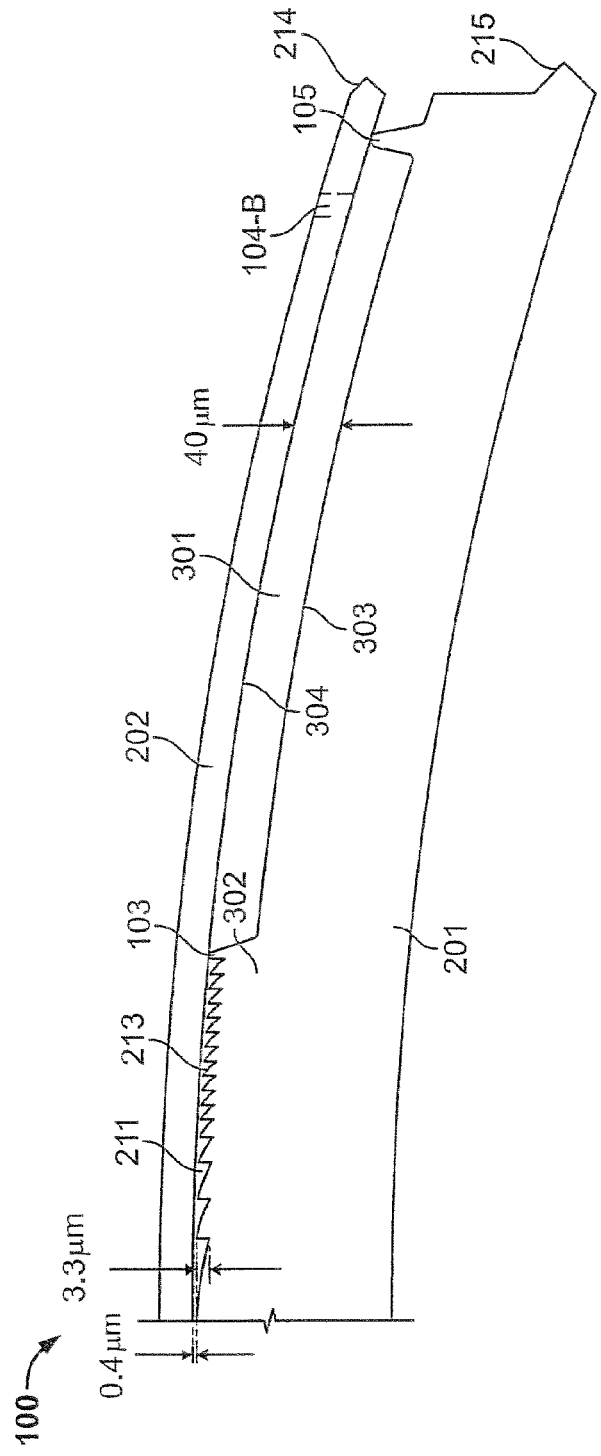
FIG. 4 illustrates a close-up view of a cross section of the EASFLB depicted in FIG. 3 along a radial direction.

FIG. 4 illustrates a close-up view of a cross section of the EASFLB 100 article along a radial direction. FIG. 4 shows an example of how the volume of electro-active material 211 can be encapsulated. As shown, the back substrate 201 can comprise a surface relief diffractive structure 213. The surface relief diffractive structure 213 can have a maximum depth. The maximum depth of the surface relief diffractive structure 213 can be, for example, approximately 3.3 µm. The surface relief diffractive structure 213 can sit atop a mesa structure 302. The mesa structure 302 can have a height of approximately 40 μm for example. The mesa structure 302, along with the adhesive seal feature 105, can form the adhesive cavity 301. The adhesive cavity 301 can be of sufficient depth to allow uncured liquid adhesive to flow unencumbered by excessive capillary forces.

The electro-active material seal feature 103 can be positioned proud of the peaks of the surface relief diffractive structure 213. As an example, the electro-active material seal feature 103 can be positioned proud of the peaks of the surface relief diffractive structure 213 by approximately 0.4 μm (400 nm). The electro-active material seal feature 103 can be positioned to be at the same relative height from the outer, anterior, convex surface 303 of the back substrate 201 as the adhesive seal feature 105. This can allow the posterior, concave, surface 304 of the front substrate 202 to only contact the back substrate 201 at the apex points of the electro-active material seal feature 103 and the adhesive seal feature 105. By allowing the two substrates to come into contact in this manner, the volume of electro-active material 211 can be segregated from the uncured liquid adhesive by means of the electro-active material seal feature 103. Further, uncured liquid adhesive may be contained within the adhesive cavity 301 by means of the electro-active material seal feature 103 and the adhesive seal feature 105.

In the following, a detailed description of the process for manufacturing the EASFLB 100 is provided.

FIGS. 46A and 46B provide an EASFLB 100 that comprises a front substrate 101, preferable a progressive addition substrate having a thickness between 0.5 mm and 1.0 mm, and a back substrate 102, preferable a diffractive substrate having a thickness between 5 mm and 6 mm. The front substrate 101 has a finished optical surface 103 with a progressive addition region. The back substrate 102 has a plurality of surface relief diffractive structures 104 that form a region 105 for the liquid crystal. The back substrate 102 also has sealing structures 106 disposed near the plurality of surface relief diffractive structures 104. FIG. 46A shows the two substrates separately before assembly. FIG. 46B shows the assembled EASFLB, where the front substrate 101 is brought into contact with the back substrate 102 via the sealing structures 106. Upon assembly, the front substrate 101 may be referred to as a front wafer, and the back substrate 102 may be referred to as a back-side diffractive puck. Upon assembly, adhesive regions 107 are formed, wherein an amount of adhesive can be disposed for adhering the front wafer 101 to the back-side diffractive puck 102.

As shown in FIGS. 46A and 46B, the front substrate 101 has a radius or curvature that is greater than the back substrate. In some embodiments, the front substrate has a radius of curvature that is at least 2 mm larger than the radius of curvature of the back substrate.

In some embodiments, a diffractive with an optical power progression is used. In such embodiments, the electro-active diffractive region is isolated from the adhesive used to assemble the semi-finished blank by means of a ridge-like sealing structure. FIGS. 47A and 47B show parts of a blank 100, as labeled. The blank electronic barrier coatings 101 (SiO2/ITO/SiO2) constrained within the sealing structure 102 (and corresponding area of the substrate) except for one lead trace per substrate 106 107 used to facilitate the external electrical connection. The variable power diffractive region 103 and the inner convex surface 104 of the back substrate are shown. The inner concave surface 105 of the front substrate is shown. The termination point of each lead trace coincides with a connection pin for the means of electrical connectivity.

In another embodiment, a uniform layer of ITO with isolation paths etched/cut to form the active area of the lens is applied. This may produce improved cosmetic results compared to simply coating the diffractive area with ITO. FIGS. 48A and 48B show a blank 100. The blank has an alignment material 101 and a sealing structure 102. The variable power diffractive region 103 and the inner convex surface 104 of the back substrate 104 are shown. The inner concave surface 105 of the front substrate is also shown.

In such embodiments, contrary to conventional liquid crystal device assembly techniques, no spacers are used to set the cell gap. Instead of conventional spacer beads/rods, the surface relief diffractive structure itself, coated with an appropriate dielectric (e.g. $SiO_2$) to eliminate shorting between the ITO electrodes, sets the cell gap. However, as described above, it is anticipated that a sealing structure of height comparable to the diffractive structures will be used to isolate the liquid crystal from the assembly adhesive.

FIG. 5 provides a flowchart 500 that illustrates operational steps for manufacturing the EASFLB 100 in accordance with an aspect of the present invention. The invention is not limited to this operational description. Rather, it will be apparent to persons skilled in the relevant art(s) from the teachings herein that other operational control flows are within the scope and spirit of the present invention. In the following discussion, the steps in FIG. 5 are described.

FIG. 5 breaks down the entire manufacturing process into major steps 501 through 509. The first step 501 comprises casting, edging, and drilling the two substrates of the EASFLB 100—i.e., the top substrate 202 and the bottom substrate 201. FIG. 6 provides a flowchart 600 that illustrates operational steps for generating the front substrate 202 that is shown more generally as step 501 in FIG. 5. The front substrate 202 can be formed according to any known substrate fabrication processes as will be understood by one skilled in the relevant arts. Accordingly, FIG. 6 illustrates an exemplary process.

As shown in FIG. 6, the process begins with step 601, which comprises selecting a concave mold for creating the progressive addition optical power region 101. The concave mold for creating the progressive addition optical power region 101 can comprise a region of substantially constant curvature and one or more regions of smoothly varying curvature. Step 601 can also comprise selecting a corresponding convex mold with substantially constant curvature. As is well known in the spectacle lens art, the substantially constant curvatures may be spherical, aspheric or any combination thereof.

At step 602, the selected molds are assembled into a mold cavity using either tape or a pre-fabricated gasket. The selected concave and convex mold assembly can generate a front substrate 202 having a substantially constant thickness. The thickness of the front substrate 202 can be, for example, between 0.5 mm and 2.0 mm. At step 603, a liquid resin is mixed from monomers and/or other precursor materials. The resin can be any resin material.

At step 604, the prepared liquid resin is filled into the mold cavity. At step 605, the liquid resin is cured (polymerized) to form a solid. The resin can be a monomer that, when cured, generates a solid material having a refractive index of 1.67 (e.g., Mitsui MR-10) for example. The resin can be cured (polymerized) by using heat, light, or any combination thereof. The front substrate 202 can also alternatively be formed by injection molding.

After the resin cure cycle 605, at step 606, the cast part is de-molded and the selected molds can be cleaned for casting subsequent parts. At step 607, the cast part can be thermally annealed under vacuum at a temperature below the glass transition temperature of the cured resin to prepare it to receive an anti-scratch coating. At step 608, an anti-scratch coating can be applied to the front substrate 202. The anti-scratch coating applied to the front substrate 202 can be, for example, HI-GARD™ 1080. Any anti-scratch coating can be applied by either dip coating or spin coating. After application of the anti-scratch coating in step 608, the part can be edged to a pre-determined diameter at step 609. At step 610, the fill ports 104 can be added.

The progressive addition optical power region 101 can be aligned as desired with respect to the dynamic, electro-active, diffractive optical power region 102. A desired alignment can be facilitated by edging the front substrate 202 such that the position of the progressive addition optical power region 101 is held to an acceptable tolerance (e.g., ±0.25 mm) with respect to the outer edge of the substrate 202. Alternatively, or in addition thereto, alignment can be achieved optically (e.g., using conventional optical alignment mechanisms) using semi-visible alignment marks on each substrate. During the edging process the bevel structure 214 can be added. The bevel 214 can be v-shaped and can facilitate the mounting of the substrate 202 in various process tooling (e.g., during subsequent steps). An acceptable or desired tolerance can be achieved by processing the substrate 202 using, for example, commercially available Computer Numerically Controlled (CNC) spectacle lens blocking and edging equipment. The fill ports 104 can be machined by most CNC spectacle lens edging machines but can also be created by any appropriate drilling or machining means.

FIG. 7 provides a flowchart 700 that illustrates operational steps for generating the back substrate 201 that is shown more generally as step 501 in FIG. 5. The back substrate 201 can be formed according to any known substrate fabrication processes as will be understood by one skilled in the relevant arts. Accordingly, FIG. 7 illustrates an exemplary process.

At step 701, a concave front diffractive mold and a convex back mold can be selected. A mold used for creating the surface relief diffractive structure 213, the CLC seal feature 103, and the adhesive seal feature 105 (and possibly semi-visible fiducials 109) can be fabricated in accordance with those techniques described in U.S. patent application Ser. No. 12/166,526, filed Jul. 2, 2008, which is hereby incorporated by reference in its entirety. For example, each of the surface relief diffractive structure 213, the electro-active material seal feature 103, and the adhesive seal feature 105, or any combination thereof, can be cut into a Ni plated tooling master using precision single-point diamond turning techniques.

From a master tool fabricated in this manner, replicas can be made using a Ni electro-forming process. These replica molds can then be used as molds for casting substrates having the surface relief diffractive structure 213, the electro-active material seal feature 103 and/or the adhesive seal feature 105, or any combination thereof. The selected convex back mold can be a conventional glass mold.

At step 702, the selected front mold can be assembled into a mold cavity with the selected back mold using either tape or a pre-fabricated gasket.

The molds can be arranged so as to form the back substrate 201 with a substantially constant thickness. For example, the molds can be arranged to form the back substrate 201 to have a thickness between 5.0 mm and 10.0 mm.

The curvatures of the molds used to form the back substrate 201 can be spherical, aspheric or a combination thereof.

At step 703, a liquid resin can be mixed from monomers and/or other precursor materials. At step 704, the resin can be used to fill the mold cavity.

At step 705, the resin can be cured (e.g., polymerized) to form a solid. The monomer resin can be any resin. As an example, the resin can be a material that when cured generates a solid material having a refractive index of approximately 1.67 (e.g., Mitsui MR-10). Further, the solid material formed by curing the resin can have a refractive index that substantially matches the effective refractive index of the electro-active material 211 when no electrical power is applied. The resin can be cured (polymerized) by using heat, light, or any combination thereof. The back substrate 201 can also alternatively be formed by injection molding.

If the refractive index of the cured resin used to cast the back substrate 201 (and hence the surface relief diffractive structure 213) is not substantially matched to the refractive index of the electro-active material 211, then an in-mold coating step can be employed. An in-mold coating comprising a material having a desired refractive index (e.g., having an index of refraction that is substantially matched to the index of refraction of the electro-active material 211) can be used. The in-mold coating material can be either spin coated or dip coated onto the concave surface of a mold to a thickness that would fill and planarize the surface relief diffractive structure 213. This material can then be partially or fully cured on the mold using thermal and/or optical means prior to the mold being assembled with a convex mate.

During the curing of a liquid resin used to form the back substrate 201, the in-mold coating material can adhere itself to the resin. After the resin is cured, the in-mold coating can become integral to the cast part. Further, the in-mold coating can act as a chemical and gas barrier between the cured resin forming the back substrate 201 and the electro-active material 211.

After the resin cure cycle 705, the back substrate 201 can be de-molded at step 706. At step 706, the molds can also be cleaned for casting subsequent parts. After the de-molding step 706, the back substrate 201 can be edged to a pre-determined diameter at step 707. As stated above, it may be desirable to align the progressive addition optical power region 101 to within a desired tolerance with respect to the dynamic, electro-active, diffractive optical power region 102. To increase the likelihood of proper alignment, the back substrate 201 can be edged such that the position of the surface relief diffractive structure 213 is held to an acceptable tolerance (e.g., ±0.25 mm) with respect to the outer edge of the back substrate 201. Alternatively, or in addition thereto, alignment can be achieved optically (e.g., using conventional optical alignment mechanisms) using semi-visible alignment marks on each substrate.

During the edging process the bevel structure 215 can be added. The bevel 215 can be v-shaped and can facilitate the mounting of the substrate 201 in various process tooling (e.g., during subsequent steps). An acceptable or desired tolerance can be achieved by processing the substrate 201 using, for example, commercially available (CNC) spectacle lens blocking and edging equipment.

Returning to FIG. 5, after the front substrate 202 and the back substrate 201 are edged, they can be moved to a clean room (e.g., a clean room of at least class 1000) for steps 502 through 508. At step 502, the front substrate 202 and the back substrate 201 can be cleaned and annealed. FIG. 8 provides a flowchart 800 that illustrates operational steps for cleaning and annealing the front substrate 202 and the back substrate 201 that is shown more generally as step 502 in FIG. 5.

As shown in FIG. 8, cleaning can begin at step 801 with an ultrasonic detergent wash. An ultrasonic cleaning unit can be used at step 801. As an example, the cleaning unit can be filled with a detergent such as, for example, Gerber-Coburn Free- Wash. The detergent can be diluted with de-ionized (DI) water as per the manufacturer's specification. The wash cycle of the cleaning unit can last between 10 and 15 minutes for example.

After an ultrasonic detergent wash at step 801, the front substrate 202 and the back substrate 201 can be moved to a second ultrasonic unit for a rinse cycle at step 802. The rinse cycle can use DI water and can last between 10 and 15 minutes for example. At step 803, the front substrate 202 and the back substrate 201 can be further cleaned using a non-ultrasonic rinse. The non-ultrasonic rinse can use DI water and can last between 15 and 25 minutes for example.

At step 804, the front substrate 202 and the back substrate 201 can be dried with heated, circulated air. The front substrate 202 and the back substrate 201 can be dried for approximately 20 minutes for example. The temperature of the air for drying can be elevated above ambient to accelerate drying. However, the temperature of the air can be made to not exceed the glass transition temperature ($T_g$) of the substrate material. By way of example only, the $T_g$ of Mitsui MR-10 is approximately 90° C. Accordingly, an appropriate temperature for the circulated air can be approximately 80° C.

At step 805, the front substrate 202 and the back substrate 201 substrates can be moved to a plasma cleaning unit. The front substrate 202 and the back substrate 201 substrates can be exposed to an oxygen plasma for between 1 and 3 minutes for example to remove any residual organic surface contaminants. At step 806, the front substrate 202 and the back substrate 201 can be subjected to a vacuum anneal. With the vacuum anneal, the front substrate 202 and the back substrate 201 can be thoroughly dried under vacuum and any volatiles can be removed. As with step 804, the annealing temperature can be kept below the $T_g$ of the substrate material. Further, the vacuum can be applied for a period of time sufficient to expel a desired amount of volatiles. By way of example only, if Mitsui MR-10 is the substrate material, then a vacuum anneal at 80° C. for at least 24 hours at a pressure below 1 mBar would be desirable.

Returning to FIG. 5, after step 502 is completed, the front substrate 202 and the back substrate 201 are ready to receive thin film layers that enable the dynamic electro-active functionality at step 503. FIG. 9 provides a flowchart 900 that illustrates operational steps for applying the multiple layers that help form a portion of the dynamic, electro-active, diffractive optical power region 102 that is shown more generally as step 503 in FIG. 5. These layers can be applied to the convex surface of the back substrate 201 and to the concave surface of front substrate 202 (i.e., the mating surfaces) in a symmetrical manner such that the description of FIG. 9 can be applicable to both the front substrate 202 and the back substrate 201. Any or all steps illustrated in FIG. 9 can be implemented without exposure to ambient atmosphere (i.e., under vacuum).

As shown in FIG. 9, at step 901, the front substrate 202 and the back substrate 201 can be cleaned using an oxygen plasma cleaning. The cleaning can be implemented, for example, for approximately 1 to 3 minutes. At step 902, a first thin film layer (e.g., layers 203 and 204 of FIG. 2) can be applied to a substrate. The first thin film layer can be an insulating material. As an example, the insulating material can be approximately 20 nm of electrically insulating and substantially colorless $SiO_x$. The insulating layer can be applied by Radio-Frequency (RF) sputtering a Si target with a mixture of Ar and $O_2$ (e.g., such that the Ar carrier gas sputters Si from the target which then reacts with the $O_2$ gas to form the $SiO_x$ oxide to be deposited).

At step 903, the conductive traces can be applied (e.g., the conductive traces 106 and 107 of FIG. 2). When the substrate is under vacuum, the traces 106 and 107 can be applied by sputtering a layer of metal (e.g., Au, Ag, or Al) or transparent conductive oxide (e.g., ITO or ZnO) onto the first oxide layers 203 and 204 through a shadow mask that defines the lines as shown in FIG. 1. The thickness of the traces 106 and 107 can be larger than 100 nm and, as an example, can be on the order of 1 μm to allow for a good connection via the edge.

If the substrates are not under vacuum, then the conductive traces 106 and 107 can be made of conductive ink or conductive adhesive that is either screen printed, ink-jet printed, or stenciled onto the first oxide layers 203 and 204. The conductive traces 106 and 107 of the present invention can also be formed by plating metal onto the first oxide layers 203 and 204 from an aqueous solution as will be understood by one having skill in the relevant arts. the conductive traces 106 and 107 can be placed in a pre-determined position relative to the semi visible fiducial marks 108 and 109, respectively.

At step 904, transparent conductors (e.g., layers 205 and 206 of FIG. 2) can be applied. The transparent conductors can be ITO and can have a thickness, for example, of approximately 20 nm. The transparent conductor layer can be applied by DC sputtering an ITO target with a mixture of Ar and $O_2$ such that the Ar carrier gas sputters conductor material from the target and the $O_2$ gas can tune the optical transmission and sheet resistivity ($\Omega/\square$) of the deposited conductor layer.

At step 905, the next thin film layer can be applied (e.g., layers 207 and 208 of FIG. 2). The next layer can be an insulating layer. As an example, the insulating material can be electrically insulating and substantially colorless $SiO_x$ and can have a thickness, for example, of approximately 170 nm. This insulating layer can be applied by RF sputtering a Si target with a mixture of Ar and $O_2$ (e.g., such that the Ar carrier gas sputters Si from the target which then reacts with the $O_2$ gas to form the $SiO_x$ oxide to be deposited).

In accordance with an aspect of the present invention, the conductor layers 205 and 206 can be applied directly onto the first oxide layers 203 and 204 prior to applying the conductive traces 106 and 107. Overall, the conductive traces 106 and 107 can be applied before or after the conductor layers 205 and 206, provided they are formed to be in direct contact with the adjacent conductor layer.

In accordance with an aspect of the present invention, the aforementioned insulating layers 207 and 208 as well as the conductive layers 205 and 206 can be deposited over the entire area or surface of the substrates. In particular, the insulating layers 207 and 208 and the conductive layers 205 and 206 can be deposited without patterning to reduce the visibility of any boundaries or edges. However, to reduce the possibility of electrical shorting between the front substrate 202 and the back substrate 201, the conductive layers 205 and 206 can be deposited using a mask. Alternatively, a portion of the conductive layers 205 and 206 can be selectively removed after deposition.

FIGS. 10A and 10B illustrates an exemplary deposition of the conductive layers 205 and 206 in accordance with an aspect of the present invention. As shown in FIG. 10A, conductive layer material has not been deposited over (or has been removed from) areas defined by boundaries 1001 and 1002. Accordingly, no conductive path is formed between the conductive traces 106 and 107 to the conductive layer material deposited on the opposite substrate. FIG. 10B illustrates a side view of the EASFLB 100 depicted in FIG. 10A with respect to section A-A'. As shown in FIG. 10B, a region on the back substrate 201 below the conductive trace 106 is devoid of conductive material. Likewise, a region on the front substrate 202 above conductive trace 107 is devoid of conductive material.

Material 1003 can represent a layer of cured adhesive resin. The cured adhesive resin 1003 can be electrically insulating. However, during assembly of the EASFLB 100, it may be possible for the front substrate 202 and the back substrate 201 to come into contact, thereby resulting in an electrical short. Therefore, the deposition of the conductive layers 205 and 206 as illustrated in FIGS. 10A and 10B can safeguard against this possibility. Further, when the EASFLB 100 is edged to fit into a spectacle lens frame, the terminating ends of the conductive traces 106 and 107 can be coated with an additional layer of conductive material (e.g., conductive ink or conductive adhesive). By removing the conductive layer material in the regions adjacent to the conductive traces 106 and 107, the risk of this additional layer of conductive material introducing an electrical short between the front substrate 202 and the back substrate 201 can be further reduced.

After deposition of the layers 207 and 208, no further inorganic coatings need to be applied. Accordingly, the surfaces of the layers 207 and 208 can be processed to increase their ability to bond with organic films and adhesives. Returning to FIG. 5, this is shown as step 504. FIG. 11 provides a flowchart 1100 that illustrates operational steps for applying an adhesion promoter to the front substrate 202 and the back substrate 202 that is shown more generally as step 504 in FIG. 5.

As an example, the layers 207 and 208 can be treated with an organofunctional silane such as, for example, Dow Corning Z-6030 (γ-Methacryloxypropyltrimethoxysilane, CAS #2530-85-0). As will be appreciate by one skilled in the relevant arts, organofunctional silanes can be used to improve the adhesion of organic compounds to inorganic surfaces.

As shown in FIG. 11, at step 1101, a silane adhesion promoter can be prepared. As an example, the promoter can be an aqueous solution of approximately 0.1% to 0.5% silane where the pH of the water has been adjusted to be in the range of 3.5 to 4.5 with acetic acid before the silane is added (in accordance with the Dow Corning Z-6030 specification).

At step 1102, the layers 207 and 208 can be treated with an oxygen plasma. As an example, the layers 207 and 208 can be treated for approximately 1 to 3 minutes. At step 1103, the surface of an insulating layer can be treated with the silane solution. Application of the silane mixture may be achieved, for example, with a spin processor (i.e., a spin coater). As such, the surface of the insulating layers can be flooded with the silane solution with the processor stationary, allowing it to bond to the plasma treated insulating surface. At step 1104, the excess solution can be spun off.

At step 1105, any residual silane solution can be washed away in the spin processor using water and/or a solvent (e.g., isopropyl alcohol). At step 1106, the substrate can be dried. The substrate can be dried, for example, under ambient atmosphere for approximately 15 minutes at approximately 80° C. In accordance with an aspect of the present invention, it may be possible to apply the silane in a batch process. With a batch process, several oxygen plasma-treated, insulating layer-coated substrates can be loaded into a chamber. The silane material can then be put into a vapor phase by means of a heat source and/or a vacuum. The silane material can be allowed to bond to the insulating layer. Such a batch process can greatly improve throughput and potentially eliminate cleaning steps 1104 and 1105 as the surface of the insulating layer would only accumulate enough silane material to cover the surface with a molecular monolayer.

Returning to FIG. 5, at step 505, the alignment layers 209 and 210 can be applied. FIG. 12 provides a flowchart 1200 that illustrates operational steps for applying the alignment layers 209 and 210 that is shown more generally as step 505 in FIG. 5.

As shown in FIG. 12, at step 1201, the silane-treated insulating surfaces (i.e., insulating layers 207 and 208) can be masked off. Physically masking a portion of the insulating layers 207 and 208 enables the alignment material to only coat those regions that will be in contact with the electro-active material 211. As an example, the regions within the electro-active material seal feature 103 (as shown in FIG. 1) can be exposed for coating while the remaining portions of the insulating layers 207 and 208 can be covered or masked to prevent exposure. A mask that exhibits poor adhesion to the silane-treated insulating surfaces can be used so that the mask can be removed easily. Further, the mask can have good solvent resistance to the solvent from which the alignment layers 209 and 210 can be spin coated (e.g., Signmask light blue from Avery Dennison).

Once the masks have been applied, at step 1202, the alignment layers 209 and 210 can be spin coated from a solution. As an example, the spin coating can be conducted at a speed in the range of 2000 to 4000 rpm for between 30 and 90 seconds.

Improved performance of the dynamic, electro-active, diffractive optical power region 102 can be achieved, for example, by providing the circular features of the surface relief diffractive structure 213 with rotationally symmetric electro-active material 211 alignment. Accordingly, an aspect of the present invention contemplates the use of alignment materials such that the alignment direction can be determined by exposing the material to linearly polarized ultraviolet radiation as described in U.S. patent application Ser. No. 12/101,264, filed Apr. 11, 2008, which is hereby incorporated by reference in its entirety. Materials that can be optically processed are available from Elsicon, Inc. (Delaware, USA) and Rolic Technologies Ltd. (Switzerland).

At step 1203, the physical mask can be removed. At step 1204, the coated substrate (e.g., the substrate 201 and/or 202) can be heated to drive off excess solvent. As an example, the substrates can be heated to approximately 50° C. under ambient atmosphere for approximately 15 minutes.

Returning to FIG. 5, at step 506, the electro-active material 211 can be formulated. Step 506 can be the final step before assembly of the EASFLB 100 (i.e., before the substrates 201 and 202 are brought together). FIG. 13 provides a flowchart 1300 that illustrates operational steps for formulating the electro-active material 211 that is shown more generally as step 506 in FIG. 5.

The electro-active material 211 can be a cholesteric liquid crystalline (CLC) material. The CLC material can be a mixture of a nematic liquid crystal (NLC) with a chiral dopant (CD) as described U.S. application Ser. No. 12/018,048 filed on Jan. 22, 2008, which is hereby incorporated by reference in its entirety. At step 1301, a selected NLC can be mixed with a selected CD. As an example, the NLC can be a material such as BL093 or MDA-98-1602 (Merck) and the CD can be a material such as ZLI-4571 or MJ092239 (Merck). Empirical studies by the inventors have shown that a mixture of NLC with 2.25 wt. % CD gives favorable results in terms of achieving low diffraction efficiency when the dynamic, electro-active, diffractive optical power region 102 is not active and fast switching speeds when the dynamic, electro-active, diffractive optical power region 102 transitions from an active to an inactive state.

At step 1302, the electro-active material mixture 211 can be physically mixed. As an example, the mixing process can be undertaken for a minimum of 12 hours at a temperature above the clearing temperature of the neat NLC. Since the clearing temperature of MDA-98-1602 is 109° C., any temperature greater than approximately 112° C. can generally be used.

At step 1304, the electro-active material mixture 211 can be degassed. As an example, degassing of the mixture can be undertaken at ambient (i.e., room) temperature and reduced pressure (on the order of 10 mBar or less) for at least 12 hours. The electro-active material mixture 211 can be mixed or otherwise agitated during the degassing process to increase the efficiency of gas removal.

Returning to FIG. 5, steps 507 and 508 represent the final processes applied to the substrates 201 and 202—i.e., assembly of the substrates 201 and 202 with the electro-active material 211 to form the EASFLB 100. To ensure desirable operation of the dynamic, electro-active, diffractive optical power region 102 by way of its correct orientation with respect to the progressive optical power region 101, the position of the center of the surface relief diffractive structure 213 with respect to the progressive optical power region 101 can be determined and fixed throughout steps 507 and 508.

As described above, when the front substrate 202 is edged (e.g., in step 609 of FIG. 6) the position of the progressive optical power region 101 can be fixed with respect to the edge of the front substrate 202 to within a known tolerance. Further, when the back substrate 201 is edged (e.g., in step 707 of FIG. 7) the center of the surface relief diffractive structure 213 can be fixed with respect to the edge of the back substrate 201 to within a known tolerance.

As a result of these steps, alignment of the surface relief diffractive structure 213 with respect to the progressive optical power region 101 can be accomplished by a simple rotation of the substrates 201 and 202.

Figure 14C:
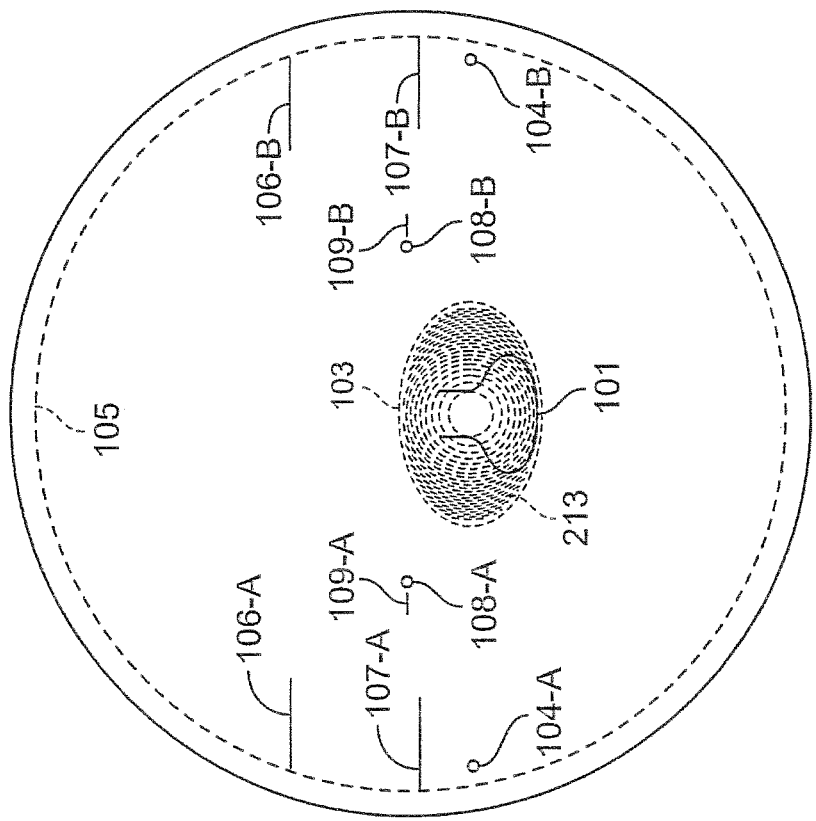

FIG. 14 illustrates an exemplary process for aligning the front substrate 202 and the back substrate 201. FIG. 14A illustrates a front substrate 202. FIG. 14B illustrates a back substrate 201. FIG. 14C illustrates the front substrate 201 of FIG. 14A placed on top of the back substrate 201 of FIG. 14B. As shown in FIG. 14C, the front and back substrates 201 and 202 can be concentric. However, as further shown in FIG. 14C, the front substrate 202 has been rotated slightly clockwise from its orientation as shown in FIG. 14A. Additionally, the back substrate 201 has been rotated slightly counterclockwise from its orientation as shown in FIG. 14B. Consequently, the progressive optical power region 101 and the dynamic, electro-active, diffractive optical power region 102 are misaligned as shown in FIG. 14C. Further, the alignment of the front substrate 202 and the back substrate 201 are misaligned.

Figure 14D:
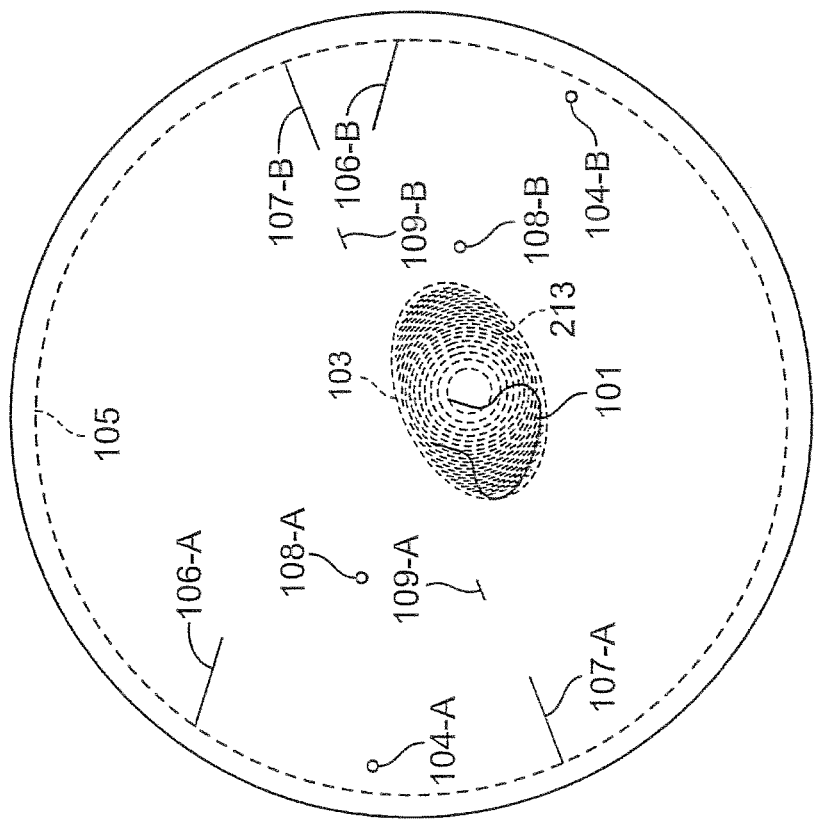

To properly align the progressive optical power region 101 and the dynamic, electro-active, diffractive optical power region 102 (and to properly align the front substrate 202 and the back substrate 201), the front and back substrates 201 and 202 can be rotated while maintaining their concentricity. Specifically, the front and back substrates 201 and 202 can be rotated such that the semi-visible fiducial marks 108 and 109 are aligned as shown in FIG. 1. When the semi-visible fiducial marks 108 and 109 are properly aligned, then the center of the surface relief diffractive structure 213 will be in proper alignment with respect to the progressive optical power region 101, as shown in FIG. 14D.

To provide proper alignment between the front substrate 202 and the back substrate 201, the front and back substrates 201 and 202 can be mounted in carriers. The carriers can allow the substrates 201 and 202 to be kept concentric, to be rotated about their centers to the point where they are in the correct orientation, and to be locked in place (e.g., to lock in a desired orientation or alignment). These carriers may then be loaded into other process tools to aid the completion of other alignment critical steps.

Figures 15C, 15D:
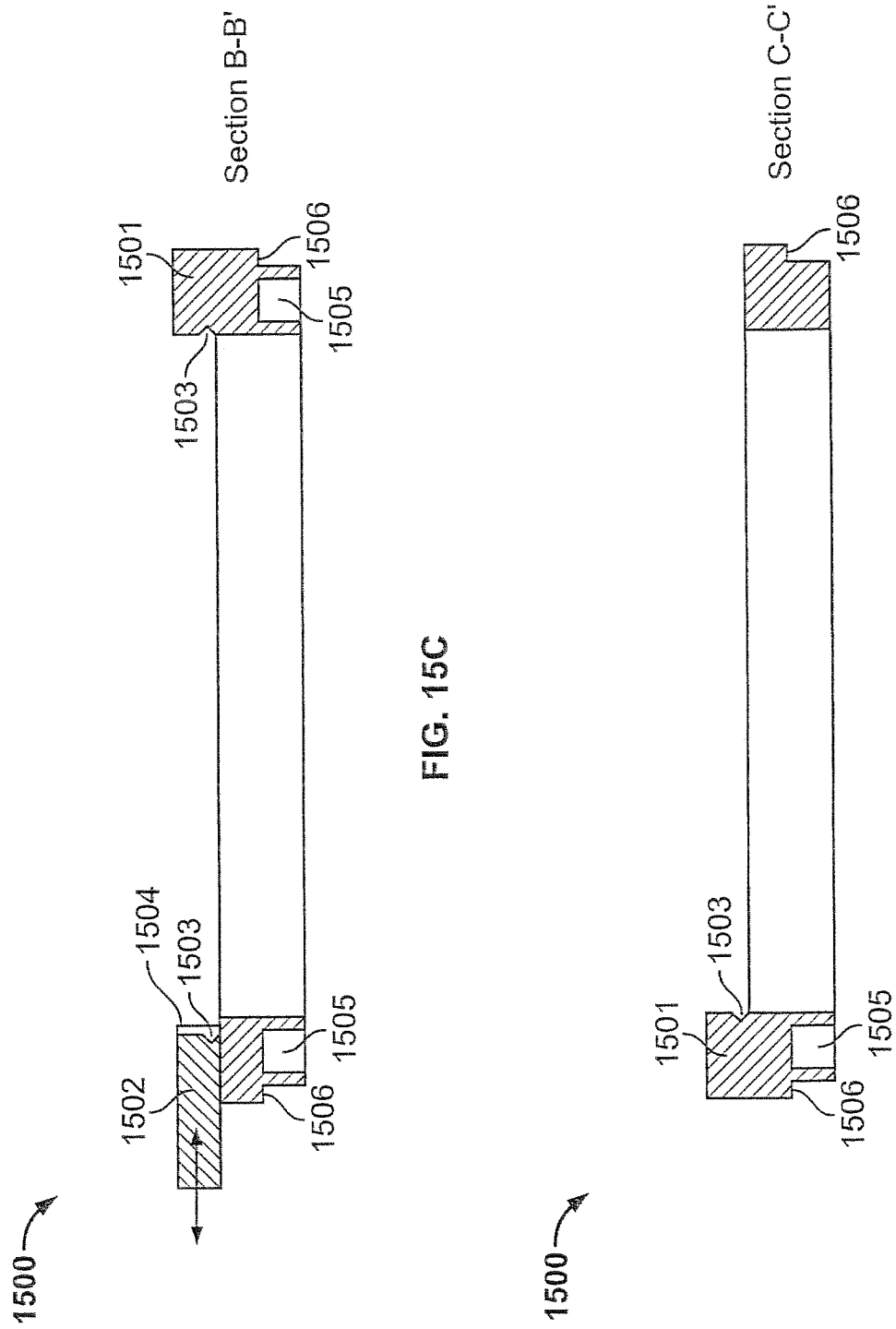

FIGS. 15A-D illustrate an exemplary carrier 1500 for holding a substrate of the EASFLB 100. FIG. 15A illustrates a top view of the carrier 1500. FIG. 15B illustrates a bottom view of the carrier 1500. The carrier 1500 can comprise fixed, raised portions 1501 and an adjustable raised portion 1502. The fixed, raised portions 1501 and the adjustable raised portion 1502 can each have a recess 1503 (shown in FIGS. 15C and 15D) to accept a beveled edge of a substrate. Adjustable raised portion 1502 can be positioned between additional fixed, raised portions 1504. The fixed, raised portions 1504 can contain a means for translating the adjustable raised portion 1502 such as, for example, linear bearings.

FIG. 15C illustrates a first cross sectional view of the carrier 1500. Specifically, FIG. 15C illustrates a view across cross section B-B' shown in FIG. 15A. FIG. 15D illustrates a second cross sectional view of the carrier 1500. Specifically, FIG. 15D illustrates a view across cross section C-C' shown in FIG. 15A. Details of the recess 1503 can be seen in the cross sectional views provided by FIGS. 15C and 15D.

A substrate can be held in place by its bevel (e.g., the bevel 214 or 215 as shown in FIG. 2) in recesses 1503. Positive pressure from the recesses 1503 can be maintained by the adjustable raised portion 1502 which can be, for example, allowed to slide on spring loaded linear bearings contained, for example, within other fixed, raised portions 1504. Alignment of the carrier 1500 within other process tooling may be accomplished through a hole and dowel or kinematic mounting means. The carrier 1500 may be outfitted with holes 1505 designed to fit over dowels in a processing tool, for example. The carrier 1500 can also be nested within another, similar carrier or in a process tool mount by means of a small ledge 1506 produced by reducing the diameter of the lower portion of the carrier 1500.

Completing step 507 depicted in FIG. 5 can begin with mounting the front and back substrates 201 and 202 within the aforementioned carriers 1500. FIG. 16 provides a flowchart 1600 that illustrates operational steps for exposing the alignment layers 209 and 210 to ultra-violet light that is shown more generally as step 507 in FIG. 5.

At step 1601, the front and back substrates 201 and 202 can be mounted within the aforementioned carriers 1500. To do so, the adjustable raised portion 1502 of a carrier 1500 can be retracted to allow a substrate to be loaded. At step 1602, a carrier 1500 can be mounted in an optical alignment tool. The optical alignment tool can include an electronic vision system that locates the semi-visible fiducial marks (e.g., the fiducial marks 108 and/or 109). At step 1603, one or more of the substrates can be rotated until a desired orientation between the substrates is achieved. Once a substrate is properly oriented, the adjustable raised portion 1502 of the carrier 1500 can come into contact with the substrate, effectively locking it in place.

At step 1604, the carriers 1500 for the front and back substrates 201 and 202 can be loaded into a tool for exposing the alignment layers 209 and 210 to linearly polarized UV radiation. At step 1605, the alignment layers 209 and 210 can be exposed to polarized UV radiation. As an example, the alignment layers 209 and 210 can be exposed to polarized UV radiation through a wedge-shaped shadow mask to achieve either perpendicular or piecewise perpendicular alignment as described in U.S. patent application Ser. No. 12/101,264, filed Apr. 11, 2008, which is hereby incorporated by reference in its entirety.

The alignment layers 209 and 210 can be processed such that the pre-tilt angle of the electro-active material 211 can be between and 10° and 20° with respect to the surface of the front and back substrates 201 and 202. As an example, the alignment material ROP-103 (Rolic Technologies Ltd.) may be processed to achieve these results by exposing the material to 80 mJ/cm$^2$ of 365 nm UV radiation from a Hamamatsu LC8 lamp at a direction of 40° from the substrate surface normal. As per the ROP-103 specification, the radiation from said lamp can be passed through a UVC cut-off filter (Schott WG295) and UV bandpass filter (Schott UG11) before being polarized by means of a wire-grid polarizer (Moxtek).

FIG. 17 provides a flowchart 1700 that illustrates operational steps for assembling the front and back substrates 201 and 202 to form the EASFLB 100 that is shown more generally as step 508 in FIG. 5. At step 1701, a portion of the mixed and degassed electro-active material mixture 211 is dispensed onto the surface relief diffractive structure 213. The electro-active material mixture 211 can be dispensed by pipette.

FIG. 18A illustrates a close-up view of the electro-active material mixture 211 (shown in FIG. 18A as element 1802) being dispensed onto the back substrate 201. As shown in FIG. 18A, the back substrate 201 can be loaded and aligned in a back substrate carrier 1801. The amount of electro-active material mixture 1802 dispensed can be greater than the final volume of electro-active material 211 that can be used to completely fill the surface relief diffractive structure 213. By way of example only, empirical studies by the inventors have shown that approximately 20 μL of the electro-active mixture is sufficient to fill an elliptically shaped surface relief diffractive structure that is approximately 22 mm wide, 14 mm tall and 3.3 μm deep.

At step 1702, a front substrate 202 loaded and aligned in a front substrate carrier 1803 can be placed in initial contact with a carrier mounted back substrate 201. The initial contact between the front and back substrates 201 and 202 can be considered to be a soft assembly. The soft assembly of the front and back substrates 201 and 202 described in step 1702 is shown in FIG. 18B.

As shown in FIG. 18B, the front substrate 202 can be positioned within a front substrate carrier 1803. The two carriers 1801 and 1803 can be nested together and, as an example, can be aligned with respect to each other by dowels (not illustrated) in the back substrate carrier 1801 that fit into holes in the front substrate carrier 1803.

Steps 1701 and 1702 can be completed in a vacuum. If a vacuum is not used, then after step 1702, the soft assembly of the front and back substrates 201 and 202 shown in FIG. 18B can be degassed at step 1703 before proceeding with further assembly steps.

At step 1704, the soft assembly can be loaded into a press (not shown). The soft assembly can be loaded into the press such that the front substrate 202 is brought into contact with the back substrate 201. As an example, the press can be equipped with a pneumatically actuated piston for the purpose of bringing the front substrate 202 into contact with the back substrate 201. FIG. 18C illustrates the front substrate 202 being brought into contact with the back substrate 201.

At step 1705, a conformal compression pad can be placed over an area overlapping with the surface relief diffractive structure 213 as shown in FIG. 18C. Specifically, prior to applying pressure to the assembly, a first conformal pad 1804 can be placed on the front substrate 201 over the area of the surface relief diffractive structure 213. Further, a second conformal pad 1805 can be placed under the back substrate 201 to support the entire assembly. The conformal pad 1804 can be the shape of the surface relief diffractive structure 213 (e.g., elliptical). The conformal pad 1804 can also be slightly larger than the surface relief diffractive structure 213 such that it overhangs the electro-active material 211 seal feature 103 by approximately 1 mm on all sides as shown in FIG. 18C.

At step 1706, compressed air can be applied to the pneumatic piston. Applying compressed air to the pneumatic piston can bring the front and back substrates 201 and 202 into contact as shown in FIG. 18C. As shown in FIG. 18C, pressure can be applied to the conformal pad 1804. As an example, empirical studies by the inventors have shown that using a piston with a diameter of approximately 32 mm, with applied compressed air at a pressure of approximately 1 Bar, can achieve contact between the two substrates using an approximately 24 mm wide and 16 mm tall elliptically shaped conformal pad 1804 designed for an elliptically shaped surface relief diffractive structure approximately 22 mm wide and 14 mm tall. In addition to applying a force to the conformal pad 1804, additional force 1806 can be applied via a second piston and a third conformal pad (neither shown) in the region above the adhesive seal feature 105.

When the two substrates 201 and 202 are in contact, the electro-active material seal feature 103 and the adhesive seal feature 105 can be touching the concave, posterior surface of the front substrate 202. At this point, a desirable volume of electro-active material 211 has been fixed by trapping the dispensed electro-active material 1802 between the surface relief diffractive structure 213 and the front substrate 202. Further, the adhesive cavity 301 can be defined. However, as shown in FIG. 18C, the adhesive cavity can be partially filled with excess electro-active material mixture 1802 expelled from the surface relief diffractive structure 213 during step 1706.

According to an aspect of the present invention, a radius of curvature of the front substrate 202 can be formed to be slightly larger than a radius of curvature of the back substrate 201. By forming the front substrate 202 to have a radius of curvature that is slightly larger than a predetermined design value (e.g., substantially equal to the radius of curvature of the back substrate 201), excess liquid crystal material 1802 can be efficiently expelled from the surface relief diffractive structure 213 during step 1706. Further, by forming the front substrate 202 to have a radius of curvature that is slightly larger than a radius of curvature of the back substrate 201, the amount of air or air bubbles trapped within the desired volume of electro-active material 211 can be minimized or substantially removed.

FIG. 19 illustrates the radius of curvature of the front substrate 202 in more detail. As shown in FIG. 19, curve 1901 represents the concave, posterior surface of the front substrate 202 having a radius of curvature designed such that during assembly the surface comes into contact with the apex points of the electro-active material seal feature 103 and the adhesive seal feature 105 substantially simultaneously. The curve 1901 can represent a radius of curvature that is substantially equal to the radius of curvature of the back substrate 201.

In contrast to the curve 1901, the actual radius of curvature of the front substrate 202 can be slightly larger than this value (as shown by the solid line representing the concave, posterior surface of the front substrate 202 in FIG. 19). When the actual radius of curvature of the front substrate 202 is slightly larger than the value represented by the curve 1901, then the concave, posterior surface 304 can contact dispensed electro-active material 211 at the center of the surface relief diffractive structure 213 first as pressure is applied via a pneumatic piston (i.e., prior to the concave, posterior surface 304 contacting the adhesive seal feature 105). In doing so, excess dispensed electro-active material 1802 can be expelled outward (i.e., from a center to the peripheries of the surface relief diffractive structure 213) as further pressure is applied.

The benefits of such an approach to assembling the EASFLB 100 are numerous. First, the concave, posterior surface 304 of the front substrate 202 can expel most, if not all, of the excess dispensed electro-active mixture 1802 before the concave, posterior surface 304 of the front substrate 202 comes into contact with the electro-active material seal feature 103. This can mitigate the risk of entrapping air bubbles within the desired entrapped volume of electro-active material 211 positioned as desired over the surface relief diffractive structure 213. Second, this approach can mitigate the risk of not expelling enough of the excess dispensed electro-active material 1802.

Empirical studies by the inventors have shown that increasing the radius of curvature of the front substrate 202 by a little as 2 mm, for example, can result in a significant reduction in entrapped air within the volume of electro-active material 211. To implement this approach, extra force may be required to have the concave, posterior surface 304 of the front substrate 202 come into contact with adhesive seal feature 105 on the back substrate 201.

Returning to FIG. 17, steps 1707 through 1715 represent the next major steps in the assembly process. Specifically, steps 1707 through 1715 describe a process for removing excess dispensed electro-active material mixture 1802 from the adhesive cavity 301 and replacing it with an adhesive resin.

At step 1707, a waste collection reservoir can be connected to one of the fill ports 104. At step 1708, a supply of cleaning solvent can be connected to the other fill port 104. FIG. 20A illustrates a supply of cleaning solvent or a waste collection reservoir being connected to a fill port 104. Specifically, FIG. 20A shows tubing 2001 being adhered to a fill port 104 using a UV cure adhesive or adhesive pad 2002.

At step 1709, a solvent (e.g., acetone) can be flushed though the adhesive cavity 301. The solvent can be dispensed through tubing 2001 using a fluid dispensing system such as, for example, the dispensing system available from Engineered Fluid Dispensing (EFD). As will be understood by one skilled in the relevant arts, the solvent can be dispensed through the tubing 2001 to expel any excess electro-active material 1802 from the adhesive cavity 301. In particular, the solvent can push the excess electro-active material 1802 into the waste reservoir connected to the other fill port 104.

Once the excess electro-active material 1802 is sufficiently flushed, at step 1710, the fluid dispensing system can be disconnected from tubing 2001. Further, at step 1710, the source of cleaning solvent can be replaced with a source of clean, dry, compressed air or other inert gas. At step 1711, the selected gas can be flushed through the adhesive cavity 301 to remove excess solvent introduced from step 1709.

At step 1712, the source of clean, dry, compressed air or other inert gas can be disconnected from the tubing 2001. Further, at step 1712, a second fluid dispensing system for dispensing adhesive resin 1003 can be connected to the tubing 2001. At step 1713, the adhesive cavity 301 can be filled with a selective adhesive resin 1003. The adhesive cavity 301 can be filled with the adhesive resin 1003 under pressure. FIG. 20B illustrates the adhesive resin 1003 from the tubing 2001 filling the adhesive cavity 301.

The refractive index of the adhesive resin 1003 in a cured state can substantially match the refractive index of the material used to generate the back substrate 201. As an example, if the back substrate 201 comprises Mistsui MR-10 with a refractive index of 1.67, then the refractive index of the adhesive resin 1003 in a cured state can vary from this value by less than 0.04. In general, any optically clear adhesive resin that can bond the front substrate 202 and the back substrate 201 can be used. For example, OP-21 (Dymax) with a refractive index of 1.505 in a cured state can be used. Further, the OP-21 resin can be dispensed with a compressed air actuated dispensing syringe equipped with a 23 gauge (0.013" inner diameter) dispensing needle (not shown) connected to the tubing 2001. For a dispensing syringe with a plunger approximately 22 mm in diameter, compressed air at a pressure between 0.3 and 1.0 Bar is sufficient to fill the adhesive cavity 301 with the OP-21 resin. To accelerate the resin filling process, vacuum may be applied to the fill port 104 not connected to the fluid dispensing system supplying the resin.

At steps 1714 and 1715, the waste collection reservoir and the fluid dispensing system for dispensing the adhesive resin 1003 can be exchanged. Further, the adhesive resin 1003 can be flushed through the adhesive cavity 301 in the reverse direction. Implementing steps 1714 and 1715 can increase the likelihood that the adhesive cavity 301 is uniformly filled with the adhesive resin 1003. In accordance with an aspect of the present invention, the adhesive resin 1003 can be used to flush the excess dispensed electro-active material mixture 1802 from the adhesive cavity 301 such that steps 1708-1711 can be eliminated.

At step 1716, once the adhesive cavity 301 is substantially filled, the adhesive resin 1003 can be cured. In doing so, the front substrate 202 and the back substrate 201 can be adhered together. FIG. 20C shows the front substrate 202 and the back substrate 201 adhered together and the adhesive resin 1003 being cured.

The adhesive 1003 can be cured using ultraviolet and/or visible light 2003. The adhesive 1003 can also be cured with heat, or a combination of heat and optical radiation. As an example, for OP-21 adhesive, cure may be achieved by exposing the resin to the output of a BlueWave 50 curing lamp for approximately 1.5 minutes through the front substrate 202. To cure the adhesive 1003 using optical radiation, then at least one of the front and back substrates 201 and 202 can be at least partially transparent to the wavelength(s) required to cure the resin.

At step 1717, after the adhesive 1003 has cured, pressure can be removed from the pneumatic piston and the assembled EASFLB 100 can be removed from the carriers 1801 and 1803.

The aforementioned process(es) enable the fabrication of an electro-active lens having an improved liquid crystal seal feature. In particular, the positioning of the electro-active material seal feature 103 and the manner in which liquid crystal is encapsulated therein (and removed from the adhesive cavity 301) ensure the manufacture of a viable lens having robust structural integrity and reduced visibility of the electro-active material seal feature 103. Visibility of the electro-active material seal feature 103 can be further reduced by matching an index of refraction of the material used to form the electro-active material seal feature 103 with an index of refraction of the electro-active material 211 and/or the index of refraction of other components of the EASFLB 100.

According to an aspect of the present invention, the electro-active material 211 can be dispensed onto the front substrate 202 during assembly of the EASFLB 100. Consequently, the back substrate 201 can be positioned over the front substrate 202 for soft assembly of the EASFLB 100 and during subsequent assembly steps.

Embodiments of the invention include various other processes for manufacturing a lens. Flow charts for some of these embodiments are shown in FIGS. 49-54.

In some embodiments, the surface containing the diffractive structures is cast from a Ni mold that has been replicated from a diamond turned master. In some such embodiments, the master consists of an aluminum or stainless steel substrate that has been plated with a layer of Ni suitable for diamond machining FIG. 55 shows a drawing of a concave surface master used for technology development. Once the master substrate has been Ni coated, surfaces are generated with a Moore Nanotech 250UPL ultra-precision diamond turning lathe (Moore Nanotech 250UPL) with a resolution of 34 pm. This lathe is routinely capable of generating surfaces with a roughness of less than 2 nm (average roughness).

Ni molds generated from this master may be created in a two-step process whereby a copy of the master, called a mother, is copied a second time to form the mold. As this is a two-step process, the surface cut into the master represents the surface of the finished mold. The replication process is an aqueous-based Ni plating similar to that used on the master whereby 2-3 mm of Ni is plated onto the surface of the master (or mother) and then separated. Measurements of the replicated molds with a white light, interferometric surface profiler (Zygo NewView 7200) have shown that in some embodiments replication is nearly perfect with no measurable decrease in fidelity.

Ni molds are used in conjunction with conventional glass molds to cast the 1.67 refractive index MR10 parts within a mold assembly. A drawing of a mold assembly 100 is shown in FIG. 56. The Ni mold 101, which preferably has a diffractive structure, rests on a back mold 102, which is preferable featureless and glass. Sealing tape 103 holds the two pieces together.

In some embodiments, mold assemblies are made in a semi-automated machine whereby the user inserts front and back molds and the machine sets the gap between the two molds and applies the tape. Mold assemblies are filled with liquid monomer by hand and then placed into ovens for curing.

In some embodiments, the invention provides a method for making an ITO layer and a rubber layer uniformly in unevenness side of a Fresnel lens. In some embodiments, transparent electrodes (ITO) and electrical insulating/barrier layers ($SiO_2$) are deposited using conventional high vacuum, RF sputtering techniques. In such embodiments, the alignment layer is deposited by spin coating from solution. In some embodiments, these methods of thin-film deposition does not indicate that the surface relief diffractive structure hinders the deposition of uniform films.

In some embodiments, the invention provides a method to rub a rubbing layer uniformly in unevenness side of Fresnel lens. In some embodiments, one can use alignment materials (e.g., from Rolic Technologies, Ltd.) that align liquid crystal molecules when exposed to linearly polarized UV radiation (e.g., Rolic ROP-103). In some such embodiments, the surface relief structures of the diffractive optic do not interfere with achieving proper alignment as would be expected if a more traditional cloth rubbing technique were used.

In some embodiments, the invention provides a method to inject a liquid crystal uniformly in the gap of a Fresnel lens substrate and reference substrate. In some such embodiments, the semi-finished blank is assembled from two substrates where a larger than required volume of liquid crystal is dispensed onto the diffractive region of one substrate prior to assembly and the assembly process forces out any excess liquid crystal.

In some embodiments, the invention provides a method to make a border of a liquid crystal and adhesive precisely in the gap of a Fresnel lens substrate and reference substrate. In some such embodiments, a sealing structure will be used to isolate the liquid crystal from the adhesive used to adhere the two substrates to one another. This sealing structure, along with the diffractive structure itself, will act to set the thickness of the layer of liquid crystal.

In some embodiments, the invention provides an adhesion method of an electo-active cell and a lens blank, preferably, adhesive, pressurization power, and hardening condition. In some such embodiments, the semi-finished blank will be constructed from two substrates that contain the structures and coatings necessary to form the electro-active portion of the lens, so there will be no need to adhere an electro-active lens to a lens blank.

In some embodiments, the invention provides outer electrodes on an electo-active lens and methods of producing such an electrode. In some embodiments, the design of the external electrical connection between the frames and the lenses is still under development but is expected to take on a form similar to what was used for the alpha-prototype spectacles. As illustrated below, the lens is assembled from two substrates, each with a molded or machined recess. Each recess is designed to accept a gold plated pin that makes electrical contact to an ITO trace with conductive adhesive (silver paste was used for the prototypes). For the pin that makes electrical connection to the back substrate, a clearance hole is drilled in the front substrate to ensure that it does not generate an electrical short between the two substrates. The pins are attached before the substrates are assembled into the lens and the recesses are back-filled with optical adhesive to secure the pins in place after lens assembly. FIG. 57 shows an illustration of a lens external electrical connection. In some embodiments, the Au plated pins sit proud of the front surface of the front substrate and connect to the drive electronics in the frame via a compliant elastomeric connector (e.g. Zebra connector). Details of this connection are described in the following sections.

In some embodiments, the invention provides a hinge unit. FIGS. 58A and 58B show illustrations of hinge units for a horizontal switch configuration and a vertical switch configuration, respectively. FIGS. 59-61 show other illustrations of aspects of a horizontal switch assembly. FIGS. 62 and 63 show an illustration of a circuit diagram for a hinge unit.

In some embodiments, the invention provides for use of a driving waveform. In some such embodiments, the driving waveform drives continuously when the lens is active. In some such embodiments, one can clamp the voltage to zero when transitioning to an "off" state. In some such embodiments, the voltage and frequency can be dependent on lens parameters. In some such embodiments, the device may employ a dual-voltage drive to reduce power. FIG. 64 shows an illustration of a driving waveform.

In some embodiments, the invention provides for battery control. For example, an MS518S lithium rechargeable battery can be used. In some such embodiments, there can be a 320 µA drain current with the lens operating, with a 1 mA peak. In some other embodiments, less power is required. In some embodiments, the drain current is about 200 nA when the lens is in the off state. In some embodiments, the battery is charged inductively. In some embodiments, the battery is regulated to 3.3 V. In some embodiments, the charge current limit is provided by a 1k resistor. FIG. 65 shows a sample charge circuit.

In some embodiments, the invention provides for connecting the structure of the elect-active lens outer electrodes and the hinge electrodes. In some such embodiments, the zebra strip is compressed between the open pads on the flex cable and the lens pins when the nut is tightened on the bolt. FIG. 66 shows an illustration of such a connection.

The aforementioned process(es) for fabricating the EASFLB 100 can include multiple steps that may be accomplished manually or in a semi-automated or fully-automated manner. In a fully automated system for example, a human technician may only be required to load substrates into racks or to perform other handling prior to the cleaning at step 502. Robotic equipment could then move substrates through all the remaining processing steps, with each processing step carried out by a dedicated piece of equipment for example. At points in the process where alignment of the substrates is desired, the robotic equipment can work in conjunction with machine vision systems and other substrate manipulation means (e.g., multi-axis linear and rotational motorized translation stages) to achieve proper alignment. In a semi-automated process for example, human technicians may be required to transfer substrates between processing steps and/or load substrates into pieces of equipment. Each processing step, however, could be automated in that it the pieces of equipment would require little or no input from a human technician to complete its task.

In accordance with an aspect of the present invention, an electro-active lens of the present invention can comprise two or more substrates. Further, in accordance with an aspect of the present invention, an electro-active lens of the present invention can comprise substrates arranged or configured in a manner that is different from the configuration shown in FIG. 3 for example.

FIG. 21 illustrates a first exemplary alternative electro-active semi-finished lens blank (EASFLB) 2100 in accordance with an aspect of the present invention. As shown in FIG. 21, the EASFLB 2100 can comprise a back substrate 2101, a front substrate 2103, and an intermediate substrate 2102. Both the back substrate 2101 and the intermediate substrate 2102 can comprise surface relief diffractive structures 2114 and 2115, electro-active material seal features 2106 and 2107, and adhesive seal features 2104 and 2105, respectively. The EASFLB 2100 can comprise a first volume of electro-active material 2110 and a second volume of electro-active material 2111. The EASFLB 2100 can also comprise a first volume of adhesive material 2112 and a second volume of adhesive material 2113. The first volume of adhesive material 2112 can be added via fill ports 2108. The second volume of adhesive material 2113 can be added via fill ports 2109.

As shown in FIG. 21 for the EASFLB 2100 (and as shown in FIG. 3 for the EASFLB 100), physical sealing features for containing the electro-active material and the adhesive material—as well as surface relief diffractive structures—are shown as formed on the convex surfaces of constituent substrates. However, in accordance with an aspect of the present invention and as will be understood by one skilled in the relevant arts, these features can be formed on corresponding concave surfaces of one or more constituent substrates.

FIG. 22 illustrates a second exemplary alternative electro-active semi-finished lens blank (EASFLB) 2200 in accordance with an aspect of the present invention. As shown in the FIG. 22, the EASFLB 2200 can comprise a back substrate 2201. The back substrate 2201 can comprise a surface relief diffractive structure 2206 and an electro-active material seal feature 2204. Electro-active material 2203 can be encapsulated between the surface relief diffractive structure 2206, the electro-active material seal feature 2204, and a thin substrate 2202. The convex surfaces of the back substrate 2201 and thin substrate 2202 can be overmolded with optical material 2205. Optical material 2205 can comprise a third, pre-fabricated substrate adhered in place or, alternatively, can be formed using a layer of liquid resin cured in situ.

The EASFLB 2200 can be assembled without the use of an adhesive seal feature (e.g., the adhesive seal feature 103 of the EASFLB 100). However, in accordance with an aspect of the present invention and as will be understood by one skilled in the relevant arts, an adhesive seal feature can be included in the EASFLB 2200. For example, an adhesive seal feature may be useful for setting a desired distance between the substrates 2201 and 2202 and a concave surface of a mold used when curing a layer of liquid resin to form layer 2205.

FIG. 23 illustrates a third exemplary alternative electro-active semi-finished lens blank (EASFLB) 2300 in accordance with an aspect of the present invention. As shown in FIG. 23, the EASFLB 2300 can comprise a back substrate 2301 and a front substrate 2302. The back substrate 2301 can comprise a surface relief diffractive structure 2308, an electro-active material seal feature 2306 and an adhesive seal feature 2307. The front substrate 2302 can comprise fill ports 2303. The EASFLB 2300 can largely be assembled in a manner similar to that describe above for the EASFLB 100. In particular, liquid adhesive resin can be used to fill adhesive cavity 2304 via fill ports 2303. However, the liquid adhesive resin can fill the adhesive cavity 2304 prior to dispensing electro-active material. Specifically, a desired volume of electro-active material 2305 can be added via one or more electro-active material fill ports 2306 in the back substrate 2301 after the front and back substrates 2301 and 2302 have been adhered together.

Adding the electro-active material 2305 can be done under pressure. For example, the electro-active material 2305 can be added in a manner similar to how adhesive resin is added to fill the adhesive cavity 2304 (e.g., as described in relation to the EASFLB 100 described above). The electro-active material 2305 can also be added via a vacuum filling method. In particular, the EASFLB 2300 can be placed in a vacuum chamber, the chamber can be evacuated and, while still under vacuum, a volume of electro-active material 2305 can be placed over each of the fill ports 2308 on the concave surface of the back substrate 2301. Pressure in the vacuum chamber can then be brought up to ambient pressure. The pressure differential between the ambient and the space above the surface relief diffractive structure 2308 can cause the electro-active material 2305 to flow into and fill a desired volume above the surface relief diffractive structure 2308. Once the desired volume has been substantially filled, the electro-active material fill ports 2308 can be cleaned of excess electro-active material and subsequently sealed with a suitable optical material (e.g., a UV curable index matching resin).

Once assembled, an electro-active lens of the present invention (e.g., the EASFLB 100, 2100, 2200 or 2300—for simplicity, EASFLB 100 will be used as an exemplary design in the following discussion) can be further processed. Returning to FIG. 5, further processing of the EASFLB 100 is illustrated as step 509. At step 509, a diameter of the EASFLB can be reduced to expose the conductive traces 106 and 107. Further, step 509 can include evaluating the cosmetics of the EASFLB 100 and characterizing the optical, electro-active, and electrical performance of the EASFLB 100.

FIG. 24 provides a flowchart 2400 that illustrates operational steps for final processing of the EASFLB 100 in accordance with an aspect of the present invention that is shown more generally as step 509 in FIG. 5. An EASFLB 100 can be examined for its suitability for sale by implementing the steps of FIG. 24. Further, an EASFLB 100 that fails any of the steps illustrated in FIG. 24 can be considered to be of a quality not suited for dispensing to a user.

At step 2401, a cribbing process can be implemented. The cribbing process of step 2401 can reduce the diameter of the EASFLB 100 to establish a new peripheral edge of the EAS-FLB 100. The cribbing process can be accomplished with a machine specifically designed for cribbing spectacle lens blanks or with conventional spectacle lens edging equipment as will be understood by one skilled in the relevant arts. By reducing the diameter of the EASFLB 100, the conductive traces 106 and 107 can be exposed and can be made accessible via the edge of the EASFLB 100. Further, reducing the diameter of the EASFLB 100 can remove the fill ports 104 and the adhesive seal feature 105.

FIG. 25 illustrates the placement of a new peripheral edge 2501 of the EASFLB 100 prior to cribbing. As shown in FIG. 25, the placement of the new peripheral edge 2501 can expose the conductive traces 106 and 107 and can remove lens material comprising the fill ports 104 and the adhesive seal feature 105.

FIG. 26A illustrates the EASFLB 100 having a reduced diameter (i.e., a cribbed EASFLB 100). As shown in FIG. 26A, the conductive traces extend to the new peripheral edge 2501. The new peripheral edge 2501 is shown in FIG. 26A to be concentric with the original diameter (not shown) of the EASFLB 100 but is not so limited. That is, the new peripheral edge 2501 can introduce a new center of the EASFLB 100 that differs from an original center of the EASFLB 100 (i.e., prior to cribbing). As will be appreciated by one skilled in the relevant arts, cribbing semi-finished lens blanks such that a horizontal and/or vertical offset results between the center of the article and the center of a new peripheral edge is routinely used to generate semi-finished lens blanks optimized for making into spectacle lenses for either the right or left eye of a patient.

At step 2402, conductive material can be applied to the peripheral edge of the EASFLB 100 at the point(s) where the conductive traces 106 and 107 are exposed as a result of the cribbing process of step 2401. The conductive material can be a conductive paint, ink, or adhesive. Applying the conductive material at step 2402 can facilitate electrical connection at the edge of the EASFLB 100 via blunt contact pins or conductive elastomer pads for activation of dynamic, electro-active, diffractive optical power region 102.

FIG. 26B illustrates a side view of the EASFLB 100 depicted in FIG. 26A. As shown in FIG. 26B, conductive material 2601 can be applied over the exposed conductive trace 106-B and conductive material 2602 can be applied over the exposed conductive trace 106-B.

After step 2402, inspection and characterization of the cribbed EASFLB 100 can be implemented. At step 2403, a cosmetic inspection can be implemented. The cosmetic inspection can include an inspection to reveal cosmetic flaws introduced during the assembly process. Flaws that can cause an article to be rejected include, but are not limited to, scratches and digs, excessive tinting from the internal coating layers (e.g., ITO), incomplete removal of the dispensed electro-active material 1802 from outside the electro-active seal feature 103 and poorly aligned electro-active material 211 within the dynamic, electro-active, diffractive optical power region 102.

At step 2404, the optical characteristics of the dynamic, electro-active, diffractive optical power region 102 can be tested and characterized. In this step, the manufactured article can be characterized in terms of its diffraction efficiency (activated and deactivated states), optical power, haze, clarity, transmission, switching and clearing times (described below) and alignment with respect to the progressive optical power region 101, for example.

At step 2405, the electrical characteristics of the dynamic, electro-active, diffractive optical power region 102 can be tested and characterized. In this step, the article can be characterized for its parallel resistance, series resistance, and capacitance in both the activated and deactivated states. Articles that pass tests and inspections implemented in steps 2403 through 2405 can then be considered suitable for dispensing to a user. For example, at step 2406, an article that meets the quality requirements verified in steps 2403 through 2405 can be shipped to a customer.

The EASFLB 100 can be further processed into a finished spectacle lens. Specifically, the EASFLB 100 can be modified to meet the optical power requirements of a specific user and can be edged in a manner suitable for mounting in a spectacle frame. The spectacle frame can be equipped with corresponding electronics for governing operation of the dynamic, electro-active, diffractive optical power region 102.

As a first step, a specific user's distance vision prescription can be formed into the back surface of the EASFLB 100. The user's distance prescription can be formed into the back surface using known methods including conventional grinding and polishing or digital surfacing and polishing (i.e., free forming). When a user's distance prescription is formed into the back surface of the EASFLB 100, the EASFLB 100 can be considered to be an electro-active finished lens blank or EAFLB in accordance with an aspect of the present invention.

In accordance with an aspect of the previous invention (and as described previously), the convex surface of the front substrate 202 of the EASFLB 100 may not comprise the progressive optical power region 101. Instead, a progressive optical power region 101 can be introduced on the back surface of the EASFLB 100 via free forming (e.g., along with the user's distance vision prescription) as will be appreciated by one skilled in the relevant arts. Further, in accordance with an aspect of the present invention, the EASFLB 100 can include a first progressive optical power region on a front surface of the EASFLB 100 (e.g., formed by mold or by free-forming) and a second progressive optical power region formed on a back surface of the EASFLB 100 (e.g., formed by mold or by free-forming).

After surfacing and polishing the posterior surface of EAS-FLB 100 to form an EAFLB in accordance with the present invention, both surfaces of the EAFLB can receive a series of coatings including, but not limited to, scratch resistance coatings, anti-reflection coatings, anti-soiling coatings and cushion coatings, for example.

The surfaced, polished, and coated EASFLB 100—as an EAFLB—can subsequently be edged to fit into a spectacle frame. FIG. 27 illustrates a top view of a cribbed, surfaced, and coated EASFLB 100. An outline 2701 illustrates the perimeter of an edged spectacle lens for the right eye of a user that can be formed from the cribbed, surfaced and coated EASFLB 100. As shown in FIG. 27, a portion of the conductive traces 106-A and 107-A can remain after edging to allow electrical connection to the dynamic, electro-active, diffractive optical power region 102. In contrast, the conductive traces 106-B and 107-B can be completely removed.

Note that the cribbed, surfaced, and coated EASFLB 100 can be edged for either a right-eye or a left-eye lens since conductive traces 106 and 107 (shown as conductive traces 106-A, 106-B, 107-A and 107-B) can be positioned on each side of the EASFLB 100 during assembly. However, in accordance with an aspect of the present invention, the EASFLB 100 can be assembled with only one set of conductive traces (i.e., with either traces 106-A and 107-A only or with traces 106-B and 107-B only). When assembled as such, the EAS-FLB 100 can be fabricated for edging as a right-eye lens or a left-eye lens exclusively, depending upon which pair of traces are included in the EASFLB 100 and which pair of traces are omitted during assembly The cribbed, surfaced, and coated EASFLB 100 depicted in FIG. 27 can be edged using standard spectacle lens edging equipment. During edging, the edge of the lens can be ground, polished, beveled or grooved, for example, and the lens may also be drilled to allow for a rimless or 3-piece spectacle frame.

FIG. 28 shows a finished, edged spectacle lens 2700 of the present invention. The finished spectacle lens 2700 can comprise a perimeter 2701 and can be generated from the initially assembled EASFLB 100. After edging, as was similarly described in step 2402 of flowchart 2400 in FIG. 24, a conductive paint, ink, or adhesive can be applied to the peripheral edge of the finished lens 2700 at the point(s) where the conductive traces 106-A and 107-A are exposed during the edging process. As described previously, applying the conductive material in this manner can facilitate electrical connection at the edge of the lens 2700 via blunt contact pins or conductive elastomer pads for activation of dynamic, electro-active, diffractive optical power region 102.

In accordance with an aspect of the present invention, the transparent conductors 206 and 207 can be electrically connected to a controller (not shown) via the electrical conductive traces 106 and 107. The controller can be located on a frame holding or containing an EASFLB 100 that has been processed to fit the frame (e.g., the finished lens 2800). The controller can apply voltages to the transparent conductors 206 and 207 predetermined to cause an electric field to form across the electro-active material 211 as well as the alignment layers 209 and 210. The electric field can change the orientation of the molecules of the electro-active material 211, thereby changing the refractive index of the electro-active material 211.

The change in refractive index of the electro-active material 211 contained within the dynamic, electro-active, diffractive optical power region 102 of the EASFLB 100 is predetermined to cause a change in optical power via modulation of diffraction efficiency. When no voltage is applied to the conductors 206 and 207, the refractive index of the electro-active material 211 can match the refractive index of the surface relief diffractive structures 213. Accordingly, no optical phase delay is generated and no light is focused (i.e., the diffraction efficiency at the designed focal length or corresponding optical power is zero). When a predetermined voltage is applied to the conductors 206 and 207, the refractive index of the electro-active material 211 can be different from the refractive index of the surface relief diffractive structures 213. Accordingly, an optical phase delay is generated for focusing approximately all incident light to the designed optical power (i.e., approximately 100% diffraction efficiency at the design focal length or corresponding optical power). Thus, by switching the voltage applied to the conductors 206 and 207 on or off, the optical power of the electro-active element of the EASFLB 100 is likewise switched on or off, thereby modulating the diffraction efficiency of the electro-active element between maximum and minimum values, respectively.

As shown in FIG. 2, the dynamic, electro-active, diffractive optical power region 102 is in optical communication with the progressive addition optical power region 101. The progressive addition optical power region 101 can provide a user with an optical power that is less than the user's total needed near distance optical power correction. The dynamic, electro-active, diffractive optical power region 102 can also provide an optical power (e.g., when turned on) that is less that the user's total needed near distance optical power correction. When used in combination, however, the optical power provided by the dynamic, electro-active, diffractive optical power region 102 can be combined with the optical power provided by the progressive addition optical power region 101 to provide a combined optical power that is substantially equal to the user's total needed near distance optical power correction. As such, the progressive addition optical power region 101 can be considered as providing a first incremental add power and the dynamic, electro-active, diffractive optical power region 102 can be considered as providing a second incremental add power. Accordingly, the first and second incremental add powers can together sum to the user's total needed near distance optical power. Overall, the first incremental add power can be any portion or fraction of the user's total needed near distance optical power and the second incremental add power can be any complementing portion.

Using the dynamic, electro-active, diffractive optical power region 102 to supplement the optical power of the progressive addition optical power region 101 can reduce the overall optical power that is to be provided by the progressive addition optical power region 101. Since unwanted astigmatism from a progressive addition optical power region is known to increases at a greater than linear rate as a function of the total add power of a progressive addition region, supplementing the optical power of the progressive addition optical power region 101 reduces these astigmatic and other unwanted effects, such as, for example, distortion, perceptual blur, and swim.

The EASFLB 100 (and consequently the finished lens 2800) can comprise one or more vision zones. For example, the EASFLB 100 can comprise a distance vision zone, one or more intermediate vision zones, and a near vision zone. The near vision zone can be formed by the overlapping near add power region of the progressive addition optical power region 101 in combination with the optical power provided by the dynamic, electro-active, diffractive optical power region 102. The one or more intermediate vision zones can be formed by the overlapping non-near add power regions of the progressive addition optical power region 101 in combination with the optical power provided by the dynamic, electro-active, diffractive optical power region 102. The distance vision zone can be formed by optical power provided by the front substrate 202 and the back substrate 201 (e.g., such that neither the progressive addition optical power region 101 nor the dynamic, electro-active, diffractive optical power region 102 contributes to the optical power of the distance vision zone).

The EASFLB 100 can be fabricated to only include the dynamic, electro-active, diffractive optical power region 102. One or more progressive addition optical power regions can then be added during subsequent processing and finishing of the EASFLB 100. For example, one or more progressive addition optical regions can be added by free-forming. Additionally, the EASFLB 100 can be fabricated with an electro-active element having a Fresnel structure.

As previously mentioned, a controller can be used to activate and deactivate the dynamic, electro-active, diffractive optical power region 102. The time that elapses between switching the dynamic, electro-active, diffractive optical power region 102 from an off-state to an on-state and from an on-state to an off-state can be considered to be the switch times of the dynamic, electro-active, diffractive optical power region 102 (or the switch time of the EASFLB 100/finished lens 2800 more generally). The off-state to on-state switch time can differ from the on-state to off-state switch time. In the off-state, the dynamic, electro-active, diffractive optical power region 102 can be considered as providing a first optical power value and/or a first diffraction efficiency value. In the on-state, the dynamic, electro-active, diffractive optical power region 102 can be considered as providing a second optical power value and/or a second diffraction efficiency value. The on-state to off-state switching time can include the time that elapses before the dynamic, electro-active, diffractive optical power region 102 is substantially free of any haze (e.g., domain disclinations).

The intrinsic response time of the molecules of the electro-active material 211 to the application and removal of a voltage waveform and the clearing time of domain disclinations (e.g., haze) formed during the switching process can largely determine the switching speed of the dynamic, electro-active, diffractive optical power region 102. The intrinsic response time of the electro-active material 211 and the clearing time of domain disclinations are not necessarily additive (i.e., these times can run or occur in parallel).

Factors that can influence switching speed can include the RC time constant of the dynamic, electro-active, diffractive optical power region 102, the viscosity of the selected electro-active material 211, the concentration of any chiral dopant, the thickness of the layer of electro-active material 211, and the pre-tilt angle of the electro-active material 211. The capacitance of the dynamic, electro-active, diffractive optical power region 102 can be determined by the dielectric constant of the electro-active material 211. The resistance of the dynamic, electro-active, diffractive optical power region 102 can be determined by the resistance of the conductors 206 and 207, the resistance of conductive traces 106 and 107, resistances due to electrical interconnects and resistances internal to the electronics used to activate the lenses.

According to an aspect of the present invention, the pre-tilt angle of the electro-active material 211 can be between and 10° and 20° with respect to the surface of the front substrate 202 and the back substrate 201. As discussed above, the alignment material (e.g., the alignment layers 209 and 210) can be processed to achieve these desired results. The thickness of the electro-active material 211 can be the dominate factor in determining switch speed as, generally, the intrinsic response time of the electro-active material 211 molecules and the clearing time are approximately quadratic with thickness.

A portion of the dynamic, electro-active, diffractive optical power region 102 is shown in FIG. 29. As shown in FIG. 29, the total thickness of the electro-active material 211 is shown as "d." This total thickness can be the sum of the depth, "$d_1$", of the surface relief diffractive structures 213 and any gap, "$d_2$", between the peaks of the surface relief diffractive structures 213 and the alignment layer 209 (not shown in FIG. 29). As an example, the depth $d_1$ of the surface relief diffractive structures 213 can be approximately 3.3 µm and the extra gap $d_2$ can be kept to be 1 µm or less (e.g., zero).

To switch from the off-state to the on-state, a voltage waveform can be applied as described previously. As an example, the voltage waveform can be a zero DC bias square wave with a frequency between 20 Hz and 100 Hz and a peak-to-peak voltage between 10 volts and 30 volts. Based on the above exemplary designed depths, the contributions to switching time due to the intrinsic response time of the electro-active material 211 molecules and the clearing time of domain disclinations can both be less than 100 ms (0.1 s). This can yield a total switching time of less than approximately 100 ms. This result can be achieved in accordance with an aspect of the present invention where the depth $d_1$ of the surface relief diffractive structures 213 is approximately 3.3 µm and the electro-active material 211 is MDA-98-1602 with 2.25 wt. % ZLI-4571.

To switch from the on-state to the off-state, the voltage waveform can be removed and the conductors 206 and 207 can be electrically shorted via the drive electronics to dissipate stored electrical charge. Under this scenario, the intrinsic response time of the molecules of the electro-active material 211 to the removal of the voltage waveform can still be less than 100 ms. However, the clearing time of domain disclinations may be longer (generally due to no applied voltage driving the electro-active material 211) and is generally the limiting factor that determines the on-state to off-state switching time. This clearing time can depend strongly on the thickness, d, of the electro-active material 211 and the concentration of chiral dopant in the electro-active material 211. According to an aspect of the present invention, the clearing time may be kept shorter than approximately 250 ms by keeping the depth of the surface relief diffractive structures $d_1$ less than 3.3 µm (generally less than 4.0 µm) and the concentration of chiral dopant less than 2.5 wt. %.

The clearing time can be decreased by reducing the depth of the surface relief diffractive structures 213 (i.e., by reducing $d_1$ depicted in FIG. 29). Methods for reducing the depth of the surface relief diffractive structures 213 can include smoothing discontinuities and sloping side walls comprising the surface relief diffractive structure 213 as described in U.S. patent application Ser. No. 12/054,313, filed on Mar. 24, 2008, which is hereby incorporated by reference in its entirety.

FIG. 30A illustrates an exemplary, ideal surface relief diffractive structure 3001 having a local grating period Λ and a depth $d_1$. The ideal surface relief diffractive structure 3001 can theoretically provide 100% diffraction efficiency. The ideal surface relief diffractive structure 3001 comprises discontinuities that cause optical scatter due to poor liquid crystal alignment at these discontinuities. By smoothing these discontinuities, and by further sloping the vertical side walls of the ideal surface relief diffractive structure 2001, liquid crystal alignment can be improved and optical scatter can be reduced.

FIG. 30B illustrates a smoothed surface relief diffractive structure 3002 having smoothed discontinuities and sloped vertical side walls. The smoothed surface relief diffractive structure 3002 can exhibit improved liquid crystal alignment and reduced optical scatter with respect to the structure depicted in FIG. 30A. The improved performance is obtained at a slight cost to diffraction efficiency due to the region of width δ which introduces a non-ideal phase profile. However, this smoothing can reduce the depth from $d_1$ to $d_1'$. As a result, clearing time can be reduced. FIG. 30C illustrates the ideal surface relief diffractive structure 3001 in comparison to the smoothed surface relief diffractive structure 3002 to clearly illustrate the differences in each design approach.

FIG. 31A illustrates a second smoothed surface relief diffractive structure 3102. With respect to the first smoothed surface relief diffractive structure 3002, the degree of smoothing and/or sloping of side walls of the second smoothed surface relief diffractive structure 3102 can be reduced and flat regions 3103 can be introduced in the troughs of the surface relief profile.

FIG. 31B illustrates the ideal surface relief diffractive structure 3001 in comparison to the smoothed surface relief diffractive structure 3102 to clearly illustrate the differences in each design approach. For the surface relief diffractive structures depicted in FIGS. 30 and 31, $d_1''<d_1'<d_1$. As a result, the surface relief diffractive structure 3102 can lead to an even further decrease in switching and clearing time. Further, δ'>δ for the surface relief diffractive structures depicted in FIGS. 30 and 31 (i.e., the width of the region of non-ideal phase profile is larger for the surface relief diffractive structure 3102 in comparison to the surface relief diffractive structure 3002). Overall, however, the decrease in diffraction efficiency experienced by the surface relief diffractive structure 3102 can be less than the decrease in diffraction efficiency experienced by the surface relief diffractive structure 3002

CONCLUSION

While various embodiments of the present invention have been described above, it should be understood that they have been presented by way of example and not limitation. It will be apparent to one skilled in the pertinent art(s) that various changes in form and detail can be made therein without departing from the spirit and scope of the invention. Therefore, the present invention should only be defined in accordance with the following claims and their equivalents.

Overall, the present invention can be embodied as an unfinished lens blank, a semi-finished lens blank, a finished lens blank, an edged lens, a contact lens, an intra-ocular lens, a corneal inlay or a corneal onlay.

The invention is not limited to the operational descriptions provided by the included flowcharts. Rather, it will be apparent to persons skilled in the relevant art(s) from the teachings herein that other operational control flows are within the scope and spirit of the present invention. Control steps can be added or eliminated as will be understood by one skilled in the relevant art(s).

What is claimed is:

1. A method, comprising:
   forming a first transparent substrate;
   forming a second transparent substrate comprising a surface relief diffractive structure and an electro-active material seal structure;
   positioning the first substrate and the second substrate to form an adhesive cavity and to contain electro-active material over the surface relief diffractive structure;
   filling the adhesive cavity with an adhesive; and
   curing the adhesive to adhere the first substrate to the second substrate to form a lens.

2. The method of claim 1, further comprising forming the first substrate to comprise a progressive addition optical power region.

3. The method of claim 1, further comprising dispensing electro-active material onto the surface relief diffractive structure prior to positioning the first substrate and the second substrate.

4. The method of claim 1, wherein positioning further comprises forming the adhesive cavity between the first substrate, the second substrate, the electro-active material seal structure and the adhesive seal structure.

5. The method of claim 1, wherein positioning further comprises containing the electro-active material between the surface relief diffractive structure, the first substrate and the electro-active material seal structure.

6. The method of claim 1, wherein forming the first substrate comprises forming the first substrate to have a radius of curvature that is at least 2 mm larger than a radius of curvature of the second substrate.

7. The method of claim 1, further comprising edging the lens to expose one or more electrical contacts on an edge of the lens and positioned between the first and second substrates.

8. A lens, comprising:
   a first transparent substrate;
   a second transparent substrate comprising a surface relief diffractive structure, and an electro-active material seal structure around the surface relief diffractive structure;
   electro-active material contained by the surface relief diffractive structure, the first substrate and the electro-active material seal structure; and
   adhesive material adhering the first substrate to the second substrate and contained by the first substrate, the second substrate, the electro-active material seal structure.

9. The lens of claim 8, wherein the first substrate comprises a progressive addition optical power region.

10. The lens of claim 8, wherein the first substrate is in physical contact with the second substrate only at the electro-active material seal structure and the adhesive material seal structure.

11. The lens of claim 8, wherein one of the first and second substrates comprises one or more fill ports.

12. The lens of claim 8, wherein a radius of curvature of the first substrate is at least 2 mm larger than a radius of curvature of the second substrate.

13. The lens of claim 8, wherein the lens comprises one or more electrical contacts on an edge of the lens positioned between the first and second substrates.

14. The method of claim 1, wherein the method forms a lens that is configured to allow light to pass fully therethrough.

15. The method of claim 1, wherein the method forms an ophthalmic lens.

16. The lens of claim 8, wherein the lens is configured to allow light to pass fully therethrough.

17. The lens of claim 8, wherein the lens is an ophthalmic lens.

18. The lens of claim 8, wherein the lens is configured such that there is no refractive power provided when power is not applied to the lens.

* * * * *